(12) United States Patent
Slos et al.

(10) Patent No.: US 12,544,415 B2
(45) Date of Patent: Feb. 10, 2026

(54) IMMUNOTHERAPEUTIC VACCINE AND ANTIBODY COMBINATION THERAPY

(71) Applicant: Transgene SA, Illkirch Graffenstaden (FR)

(72) Inventors: Philippe Slos, Ingwiller (FR); Julie Hortelano, Illkirch (FR); Karola Rittner, Strasbourg (FR); Xavier Preville, Saint Louis (FR)

(73) Assignee: Transgene, Illkirch Graffenstaden (FR)

( * ) Notice: Subject to any disclaimer, the term of this patent is extended or adjusted under 35 U.S.C. 154(b) by 0 days.

(21) Appl. No.: 18/147,627

(22) Filed: Dec. 28, 2022

(65) Prior Publication Data
US 2024/0024437 A1    Jan. 25, 2024

Related U.S. Application Data

(63) Continuation of application No. 15/550,567, filed as application No. PCT/EP2016/052991 on Feb. 12, 2016, now abandoned.

(30) Foreign Application Priority Data

Feb. 13, 2015 (EP) ..................................... 15305215
Apr. 16, 2015 (EP) ..................................... 15305570

(51) Int. Cl.
*A61K 35/768* (2015.01)
*A61K 38/17* (2006.01)
(Continued)

(52) U.S. Cl.
CPC ........ *A61K 35/768* (2013.01); *A61K 38/1709* (2013.01); *A61K 38/2013* (2013.01);
(Continued)

(58) Field of Classification Search
CPC .......... A61K 39/0011; A61K 39/39558; A61K 2039/505; A61K 2039/5256;
(Continued)

(56) References Cited

U.S. PATENT DOCUMENTS 5,457,035 A    10/1995  Baum et al.
5,861,381 A     1/1999  Chambon et al.
(Continued)

FOREIGN PATENT DOCUMENTS

EP         1 907 000 B1    4/2008
WO        WO 92/07000      4/1992
(Continued)

OTHER PUBLICATIONS

Brun et al. Regression of high-grade cervical intraepithelial neoplasia with TG4001 targeted immunotherapy. Am J Obstet Gynecol 2011; 204:169.e1-8. (Year: 2011).*

(Continued)

*Primary Examiner* — Gary B Nickol
*Assistant Examiner* — Bailey M Morgan
(74) *Attorney, Agent, or Firm* — Panitch Schwarze Belisario & Nadel LLP; Erin M. Dunston; Christopher L. North

(57) ABSTRACT

The present invention relates to a combination product, composition(s) and kit of parts comprising at least (i) a therapeutic vaccine and (ii) one or more immune checkpoint modulator(s). The present invention also concerns a method for treating a proliferative or an infectious disease as well as a method for eliciting or stimulating and/or re-orienting an immune response, wherein said methods comprise administering to a subject in need thereof said combination product or said composition(s).

14 Claims, 8 Drawing Sheets

Specification includes a Sequence Listing.

(51) Int. Cl.
| | |
|---|---|
| *A61K 38/20* | (2006.01) |
| *A61K 39/00* | (2006.01) |
| *A61K 39/12* | (2006.01) |
| *A61K 39/395* | (2006.01) |
| *A61P 35/00* | (2006.01) |
| *C07K 16/30* | (2006.01) |
| *C12N 7/00* | (2006.01) |

(52) U.S. Cl.
CPC .......... *A61K 39/00* (2013.01); *A61K 39/0011* (2013.01); *A61K 39/00114* (2018.08); *A61K 39/12* (2013.01); *A61K 39/39558* (2013.01); *A61P 35/00* (2018.01); *C07K 16/30* (2013.01); *C12N 7/00* (2013.01); *A61K 2039/505* (2013.01); *A61K 2039/5256* (2013.01); *A61K 2039/545* (2013.01); *A61K 2039/55533* (2013.01); *C07K 2317/73* (2013.01); *C07K 2317/76* (2013.01); *C12N 2710/24143* (2013.01); *C12N 2710/24171* (2013.01)

(58) Field of Classification Search
CPC .... A61K 2039/55533; A61K 2039/575; A61K 38/2013; A61K 39/12; C07K 16/2818; C07K 16/3046; C07K 2317/76; C07K 2317/73; C12N 7/00; C12N 2710/24143; C12N 2710/24171
See application file for complete search history.

(56) References Cited

U.S. PATENT DOCUMENTS

| | | | |
|---|---|---|---|
| 6,984,720 | B1 | 1/2006 | Korman et al. |
| 7,109,003 | B2 | 9/2006 | Hanson et al. |
| 7,291,331 | B1 | 11/2007 | Croft et al. |
| 7,622,444 | B2 | 11/2009 | Weinberg |
| 8,017,114 | B2 | 9/2011 | Korman et al. |
| 8,143,379 | B2 | 3/2012 | Hanson et al. |
| 8,491,895 | B2 | 7/2013 | Hanson et al. |
| 2012/0189617 | A1 | 7/2012 | Takayanagi et al. |
| 2016/0130345 | A1* | 5/2016 | Fotin-Mleczek ....... A61P 33/00 424/172.1 |
| 2016/0271239 | A1 | 9/2016 | Foy |
| 2017/0266270 | A1 | 9/2017 | Foy |

FOREIGN PATENT DOCUMENTS

| | | | |
|---|---|---|---|
| WO | WO 97/20574 | 6/1997 | |
| WO | WO 99/03885 | 1/1999 | |
| WO | WO 99/54481 | 10/1999 | |
| WO | WO 03/082919 | 10/2003 | |
| WO | WO 03/106498 | 12/2003 | |
| WO | WO 2004/004771 | 1/2004 | |
| WO | WO 2004/056875 | 7/2004 | |
| WO | WO 2004/058801 | 7/2004 | |
| WO | WO 2004/084841 | 10/2004 | |
| WO | WO-2004084841 A2 * | 10/2004 | ............. C07K 16/18 |
| WO | WO 2004/111082 | 12/2004 | |
| WO | WO 2005/007857 | 1/2005 | |
| WO | WO 2006/121168 | 11/2006 | |
| WO | WO 2007/123737 | 11/2007 | |
| WO | WO 2007/126805 | 11/2007 | |
| WO | WO 2008/156712 | 12/2008 | |
| WO | WO 2009/014708 | 1/2009 | |
| WO | WO 2009/073569 | 6/2009 | |
| WO | WO 2009/114335 | 9/2009 | |
| WO | WO 2012/038606 | 3/2012 | |
| WO | WO 2013/043569 | 3/2013 | |
| WO | WO 2014/009438 | 1/2014 | |
| WO | WO 2014/047350 | 3/2014 | |
| WO | WO 2014/053571 | 4/2014 | |
| WO | WO 2015/069571 | 5/2014 | |
| WO | WO-2015069541 A1 * | 5/2015 | ......... A61K 31/7056 |
| WO | WO 2015/175334 | 11/2015 | |
| WO | WO-2016009017 A1 | 1/2016 | |

OTHER PUBLICATIONS

Liu et al. Gene-Based Vaccines and Immunotherapeutics. Proceedings of the National Academy of Sciences of the United States of America 2004; 101:14567-71. (Year: 2004).*

Brahmer et al. Safety and Activity of Anti-PD-L1 Antibody in Patients with Advanced Cancer. N Eng J Med. Jun. 28, 2012; 366(26): 2455-2465. (Year: 2012).*

Obar et al. Pathogen-Induced Inflammatory Environment Controls Effector and Memory CD8 T Cell Differentiation. J Immunol. 2011; 187(10):4967-4978. (Year: 2011).*

Riella et al. Role of the PD-1 Pathway in the Immune Response. Am J Transplant. Oct. 2012; 12(10): 2575-2587. (See Figs. 1, 2) (Year: 2012).*

Jun et al. Generation of antagonistic anti-TIM-3 and anti-LAG-3 monoclonal antibodies for potential novel immunotherapy combinations. AnaptysBio. 2014. (Year: 2014).*

Brun et al. Regression of high-grade cervical intraepithelial neoplasia with TG4001 targeted immunotherapy. Am J Obstet Gynecol</i> 2011; 204:169.e1-8. (Year: 2011).*

Brahmer et al. Safety and Activity of Anti-PD-L1 Antibody in Patients with Advanced Cancer. N Eng J Med</i>. Jun. 28, 2012; 366(26): 2455-2465. (Year: 2012).*

Ulmer et al. (2012). "RNA-based vaccines". Vaccine, 30(30):4414-4418. (Year: 2012).*

Cannon and Weissman. (2002). "RNA based vaccines". DNA and Cell Biology, 21(12):953-961. (Year: 2002).*

Remy-Ziller et al. (2018). "Sequential administration of MVA-based vaccines and PD-1/PD-L1-blocking antibodies confers measurable benefits on tumor growth and survival: Preclinical studies with MVA-BGal and MVA-MUC1 (TG4010) in a murine tumor model". Human Vaccines & Immunotherapeutics, 14(1):140-145. (Year: 2018).*

Le Tourneau et al. (2020). "TG4001 (Tipapkinogene sovacivec) and avelumab for recurrent/metastatic (R/M) Human Papilloma Virus (HPV)-16+ cancers: clinical efficacy and immunogenicity". SITC 2020. (Year: 2020).*

Liu et al. Gene-Based Vaccines and Immunotherapeutics. Proceedings of the National Academy of Sciences of the United States of America</i> 2004; 101:14567-71. (Year: 2004).*

Remy-Ziller et al., Sequential administration of MVA-based vaccines and PD-1/PD-L1-blocking antibodies confers measurable benefits on tumor growth and survival: Preclinical studies with MVA-βGal and MVA-MUC1 (TG4010) in a murine tumor model, 14(1) Human Vaccines & Immunotherapeutics 140-145 (2018).

Tourneau et al., Immunogenicity and clinical activity of tipapkinogen sovacivec (TG4001), an HPV-16 cancer vaccine: a randomized phase 2 study in advanced anogenital cancers, ASCO 2023, Transgene Abstract #2630 (2023).

*Transgene presents immunological data demonstrating that TG4001, a novel therapeutic cancer vaccine, can induce T-cell responses against HPV16 antigens in the ongoing Phase II trial at ASCO 2023*, Transgene (Jun. 5, 2023).

Agata et al.,*Expression of the PD-1 antigen on the surface of stimulated mouse T and B lymphocytes*, 8(5) International Immunology 765-772 (1996).

Barber et al., *Restoring function in exhausted CD8 T cells during chronic viral infection*, 439(9) Nature 682-687 (2006).

Bennett et al., *Program Death-1 Engagement Upon TCR Activation Has Distinct Effects on Costimulation and Cytokine-Driven Proliferation: Attenuation of ICOS, IL-4, and IL-21, But Not CD28, IL-7, and IL-15 Responses*, 170 J. Immunol 711-718 (2003).

Blank et al., *Interaction of PD-L1 on tumor cells with PD-1 on tumor-specific T cells as a mechanism of immune evasion: implications for tumor immunotherapy*, 54 Cancer Immunol Immunother 307-314 (2005).

Boukhebza et al., *Comparative analysis of immunization schedules using a novel adenovirus-based immunotherapeutic tarteing hepatits B in naïve and tolerant mouse models*, 32 Vaccines 3256-3263 (2014).

(56) References Cited

OTHER PUBLICATIONS

Boukhebza et al., *Therapeutic vaccination to treat chronic infectious diseases; Current clinical developments using MVA-based vaccines*, 8(12) Human Vaccines & Immunotherapeutics 1746-1757 (Dec. 2012).
Boukhebza et al., *Pre-Clinical Proof-of-Concept Studies Exploring Schedules of Administration of an Adenovirus-based HBV Immunotherapeutic Show Wide Potential for Induction of Robust and Long-Lasting T-Cell Responses*, 58 Journal of Hepatology S63-S227 (2013).
Brunet et al. *A new member of the immunoglobulin sperfamily— CTLA-4*, 328 Nature 267-270 (Jul. 16, 1987).
Carroll et al., *Highly attenuated modified vaccinia virus Ankara (MVA) as an effective recombinant vector: a Murine tumor model*, 15(4) Vaccine 387-394 (1997).
Carter et al., *PD-1:PD-L inhibitory pathway affects both $CD4^+$ and $CD8^+$ T cells and is overcome by IL-2*, 32 Eur. J. Immunol 634-643 (2002).
Cecchinato et al., *Immune Activation Driven by CTLA-4 Blockade Augments Viral Replication at Mucosal Sites in Simian Immunodeficiency Virus Infection*, 180(8) J. Immunol. 5439-5447 (Apr. 15, 2008).
Chakraborty et al., *The combined activation of positive costimulatroy signals with modulation of a negative costimulatory signal for the enhancement of vaccine-mediated T-cell responses*, 56 Cancer Immunol. Immunother 1471-1484 (2007).
Dariavach et al., *Human Ig sperfamily CTLA-r gene: chromosomal localization and identity of protein sequence between murine and human CTLA-r cytoplasmic domains*, 18 Eur. J. Immunol. 1901-1905 (1988).
Declerck et al., *Immunotherapy for lung cancer: ongoing clinical trials*, 10 Future Oncology 91-105 (2013).
Dong et al., *B7-H1 pathway and its role in the evasion of tumor immunity*, 81 J. Mol Med 281-287 (2003).
Dong et al., *Tumor-associated B7-H1 promotes T-cell apoptosis: A potential mechanism of immune evasion*, 8(8) Nature Medicine 793-800 (Aug. 2002).
Dos Santos et al., *Blockade of CTLA-4 promotes the development of effector CD8+ T lymphocytes and the therapeutic effect of vaccination with an attenuated protozoan expressing NY-ESO-1*, 64 Cancer Immunol Immunother 311-323 (2015).
Drexler et al., *Modified vaccinia virus Ankara as antigen delivery system: how can we best use its potential?*, 15 Current Opinion in Biotechnology 506-512 (2004).
Dudareva et al., *Prevalence of serum neutralizing antibodies against chimpanzee adenovirus 63 and human adenovirus 5 in Kenyan Children, in the context of vaccine vector efficacy*, 27 Vaccine 3501-3504 (2009).
Erbs et al., *Modified vaccinia virus Ankara as a vector for suicide gene therapy*, 15 Cancer Gene Therapy 18-28 (2008).
Espenschied et al., *CTLA-4 Blockade Enhances the Therapeutic Effect of an Attenuated Poxvirus Vaccine Targeting p53 in an Established Murine Tumor Model*, 170 The Journal of Immunology 3401-3407 (2003).
Finnefrock et al., *PD-1 Blockade in Rhesus Macaques: Impact on Chronic Infection and Prophylactic Vaccination*, 182 J. Immunol 980-987 (2009).
Fournillier et al., *An accelerated vaccine schedule with a polyantigenic hepatitis C virus MVA-based candidate vaccine induces potent, long lasting and in vivo cross-reactive T cell responses*, 25 Vaccine 7339-7353 (2007).
Freeman et al., *Engagement of the PD-1 Immunoinhibitory Receptor by a Novel B7 Family Member Leads to Negative Regulation of Lymphocyte Activation*, 192(7) J. Exp. Med. 1027-1034 (Oct. 2, 2000).
Girotti et al., *No longer an untreatable disease: How targeted and immunotherapies have changed the management of melanoma patients*, 8 Molecular Oncology 1140-1158 (2014).
Guse et al., *Oncolytic vaccinia virus for the treatment of cancer*, 11(3) Expert Opin. Biol. Ther. 595-608 (2011).

Ha et al., *Enhancing therapeutic vaccination by blocking PD-1-mediated inhibitory signals during chronic infection*, 205(3) JEM 543-555 (Mar. 17, 2008).
Habersetzer et al., *A Poxvirus Vaccine Is Safe, Induces T-Cell Responses, and Decreases Viral Load in Patients With Chronic Hepatitis C*, 141 Gastroenterology 890-899 (2011).
Hardwick et al., Author Manuscript—Clin. Cancer Res. 1-34 (Jul. 1, 2014).
Harrop et al., *Viral Vectors for Cancer Immunotherapy*, 11 Frontiers in Bioscience 804-817 (Jan. 1, 2006).
Inchauspé et al., *Vaccination Against Hepatitis B and C: Towards Therapeutic Application*, 28 International Review of Immunology 7-19 (2009).
Iwai et al., *PD-1 blockade inhibits hematogenous spread of poorly immunogenic tumor cells by enhanced recruitment of effector T cells*, 17(2) International Immunology 133-144 (2004).
Jun et al., *Generation of antagonistic anti-TIM-3 and anti-LAG-3 monoclonal antibodies for potential novel immunotherapy combitnations*, AnaptysBio (2014).
Leach et al., *Enhancement of Antitumor Immunity by CTLA-4 Blockade*, 271 Science 1734-1736 (Mar. 22, 1996).
Limacher et al., *A therapeutic vaccine against MUC1 expressing tumors*, 1(5) OncoImmunology 791-792 (Aug. 2012).
Madan et al., *Ipilimumab and a poxiviral vaccine targeting prostate-specific antigen in metastatic castration-resistant protate cancer: a phase 1 dose escalation trial*, 13(5) The Lancet 501-508 (Feb. 10, 2012).
Madan et al., *Combination of vaccine and immune checkpoint inhibitor is safe with encouraging clinical activity*, 1(7) OncoImmunology 1167-1168 (Oct. 2012).
Maier et al., *PD-1:PD-L1 Interactions Contribute to the Functional Suppression of Virus-Specific CD8+ T Lymphocytes in the Liver*, 178 J. Immunology 2714-2720 (2007).
Massari et al., *PD-1 blockade therapy in renal cell carcinoma: Current studies and future promises*, 41 J. Cancer Treatment Reviews 114-121 (2015).
Moodie et al., *Response definition criteria for ELISPOT assays revisited*, 59 Cancer Immunol Immunother 1489-1501 (2010).
Ngiow et al., *Anti-TIM3 Antibody Promoters T Cell IFN-γ-Mediated Antitumor Immunity and Suppresses Established Tumors*, 71(10) Cancer Res 3540-3551 (May 15, 2011).
Obar et al., *Pathogen-Inducted Inflammatory Environment Controls Effector and Memory CD8+ T Cell Differentiation*, 187 J. Immunol 4967-4978 (2011).
Okazaki et al., *New regulatory co-receptors: Inducible co-stimulator and PD-1*, 17 Autoimmunity 779-782 (2002).
Parra et al., *Development of a Murine Mycobacterial Growth Inhibition Assay for Evaluation Vaccines against Mycobacterium tuberculosis*, 16(7) Clinical and Vaccine Immunology 1025-1032 (Jul. 2009).
Peruzzi et al., *A novel Chimpanzee serotype-based adenoviral vector as delivery tool for cancer vaccines*, 27 Vaccine 1293-1300 (2009).
Qureshi et al., *Trans-endocytosis of CD80 and CD86: a molecular basis for the cell extrinsic function of CTLA-4*, 332(6029) Science 600-603 (2011).
Ramlau et al., *A Phase II Study of Tg4010 (Mva-Muc1-II2) in Association with Chemotherapy I Patients with Stage III/IV Non-small Cell Lung Cancer*, 3 Journal Thoracic Oncology 735-244 (2008).
Reyes-Sandoval et al., *DNA Vaccines*, 1 Current Molecular Medicine 217-243 (2001).
Reyes-Sandoval et al., *Viral Vector vaccines make memory T cells against malaria*, 121 Immunology 158-165 (2007).
Rochlitz et al., *Phase I immunotherapy with a modified vaccinia virus (MVA) expressing human MUC1 as antigen-specific immunotherapy in patients with MUC1-positive advanced cancer*, 5 J. Gene Med. 690-699 (2003).
Sarkar et al., *Functional and genomic profiling of effector CD8 T cell subsets with distinct memory fates*, 205(3) JEM 625-640 (Mar. 17, 2008).

(56) References Cited

OTHER PUBLICATIONS

Seetharamu, *The State of the Art in Non-Small Cell Lung Cancer Immunotherapy*, 26(1) Seminars in Thoracic and Cardiovascular Surgery 26-35 (2014).

Sutter et al., *A recombinant vector derived from the host range-restricted and highly attenuated MVA strain of vaccinia virus stimulates protective immunity in mice to influenza virus*, 12(11) Vaccine 1032-1040 (1994).

Topalian et al., *Targeting the PD-1/B7-H1(PD-L1) pathway to activate anti-tumor immunity*, 24(2) Curr Opin Immunol. 207-212 (Apr. 2012).

Torresi et al., *Progress in the development of preventive and therapeutic vaccines for hepatitis C virus*, 54 Journal of Hepatology 1273-1285 (2011).

Transgene: TG4010. Summary Notification Information Format for the Release of Genetically Modified Organisms Other Than Higher Plants in Accordance with Article 11 of Directive 2001/18/EC Transgene 1-25 (May 25, 2011).

Transgene: Reports on Combination Trial of TG4010, Chemotherapy and Nivolumab in Non-Small Lung Cancer, pp. 1-5 (Dec. 12, 2019).

Transgene: Clinical Study Protocol, *A Phase IIb Multicentric Controlled Study Evaluating the Therapeutic Vaccine TG41010 (MVA-MUC1-IL2) as an Adjunct to Standard Chemotherapy in Advanced Non Small Cell Lung Cancer* (Jul. 8, 2005).

Tzeng et al., *PD-1 Blockage Reverses Immune Dysfunction and Hepatitis B viral Persistence in a Mouse Animal Model*, 7(6) PLoS ONE 1-9 (Jun. 2012).

Weber et al., *Safety, Efficacy, and Biomarkers of Nivolumab With Vaccine in Ipilimumab-Refractory or -Naïve Melanoma*, 31(34) Journal of Clinical Oncology 4311-4318 (Dec. 1, 2013).

Woo et al., *Immune inhibitory molecules LAG-3 and PD-1 synergistically regulate T cell function to promote tumoral immune escape*, 72(4) Cancer Res. 917-927 (Feb. 15, 2012).

Yamazaki et al., *Blockade of B7-H1 on Macrophages Suppresses CD4+ T Cell Proliferation by Augmenting IFN-γ-Inducted Nitric Oxide Production*, 175 J. Immunol 1586-1592 (2005).

International Search Report mailed Jun. 24, 2016, and Written Opinion in corresponding PCT Application No. PCT/EP2016/052991.

Cannon et al., *RNA Based Vaccines*, 21(12) DNA and Cell Biology 953-961 (2002).

Ulmer et al., *RNA-based vaccines*, 30 Vaccine 4414-4418 (2012).

Le Tourneau, et al., TG4001 (Tipapkinogene sovacivec) and avelumab for recurrent/metastatic (R/M) Human Papilloma Virus (HPV)-16+ cancers: clinical efficacy and immunogenicity, Abstract ID 793, SITC 35th Anniversary Annual Meeting during SITC 2020.

Ji, *Role of PD-1/PD-L in regulating immune responses*, 22(4) Infect. Dis. Info. 240-243 (2009) (English abstract).

Office Action issued in counterpart Chinese Patent Application No. 2024090302543890 (English translation) (Sep. 3, 2024).

* cited by examiner

IMMUNOTHERAPEUTIC VACCINE AND ANTIBODY COMBINATION THERAPY

CROSS-REFERENCE TO RELATED APPLICATIONS

This application is a Continuation Application of U.S. patent application Ser. No. 15/550,567, filed on Aug. 11, 2017, which is a U.S. National Stage Application pursuant to 35 U.S.C. § 371 of International Patent Application PCT/EP2016/052991, filed on Feb. 12, 2016, and published as WO 2016/128542 on Aug. 18, 2016, which claims priority to European Patent Application 15305570.2, filed on Apr. 16, 2015, and European Patent Application 15305215.4, filed on Feb. 13, 2015, all of which are incorporated herein by reference in their entireties for all purposes.

REFERENCE TO SEQUENCE LISTING SUBMITTED ELECTRONICALLY

The Sequence Listing associated with this application is provided in XML format, and is hereby incorporated by reference into the specification. The name of the XML file containing the Sequence Listing is "689513_0124_8U1 2493546.XML." The XML file is 10,274 bytes, was created on Dec. 28, 2022, and is being submitted electronically, concurrently with the filing of the specification.

TECHNICAL FIELD OF THE INVENTION

The present invention generally relates to novel combinations comprising of one or more immune checkpoint modulator(s) and at least a therapeutic vaccine (more specifically a vectorized vaccine encoding antigen(s)). Embodiments also include compositions and kits comprising such components as well as methods for treating, preventing or inhibiting proliferative and infectious diseases. The invention is of very special interest in the field of immunotherapy, specifically for enhancing host's immune response and in particular for disrupting immune tolerance.

BACKGROUND ART

Using the host's immune system to eradicate persistent infectious organisms and malignant cells is a promising approach. This specific type of vaccine strategy is generally referred to as immunotherapy. Widely used in traditional vaccination, immunotherapy has shown some promise results in therapy for treating severe, chronic and life-threatening diseases.

Numerous research groups have investigated immunotherapy as a potential modality for treating cancer in an attempt to stimulate the immune system and thus reject and destroy tumors. A vast number of immunotherapeutic treatments have been described in the literature for decades using various approaches, for example cancer cells, parts of cells, purified antigens and vectorized antigens. Cell vaccines are generally made up of cancer cells that have been removed from the patient during surgery and altered in lab to make them more amenable to be attacked by the patient's immune system before being reintroduced in the patient. Alternatively, one may use immune cells obtained from the patient's blood that have been exposed to cancer cells or associated antigens, cultured in the presence of chemokines that turn them into dendritic cells before being given back to the patient by intravenous infusion in order to help other immune system cells to attack the cancer cells. The dendritic cell-based vaccine Provenge® (sipuleucel-T), was tested in advanced clinical trials to treat advanced prostate cancer and received FDA approval in 2010. However, such cell-based vaccines require to be made individually for each patient and the process used to produce them is thus complex and expensive.

Antigen vaccines are made up of only one or a few protein or peptide antigen(s) that are specific for a certain type of cancers or pathogens. Once administered, they will be able to induce specific immunological responses against these antigens and boost the patient's immune system. Several candidate peptide vaccines reached clinical development. For example, the liposomal vaccine Stimuvax® incorporates lipopeptides generated from the mucin 1 (MUC1) glycoprotein that is widely expressed by common cancers. Although it did not provide in clinical trials a significant improvement in overall survival in patients with advanced non-small cell lung cancer (NSCLC), effects were nevertheless seen in some subgroups of patients.

Vector-based vaccines have shown great promise and play an important role in the development of new therapeutic strategies. Vectors are used to deliver the targeted antigen into the body. Typically, vectors originate from virus, bacteria, yeast cells, or other structures that have been altered to make them no longer harmful for the patient (e.g. inactivated, attenuated, etc). The ideal viral vector should be safe and enable efficient antigen presentation of the encoded antigens to the immune system. Furthermore, the vector system must meet criteria that enable its production on a large-scale basis. Live viral vectors are attractive for their ability to both express antigens from a variety of pathogens and tumoral tissue and to facilitate antigen presentation through the endogenous pathway which has been shown to be important for efficient induction of cellular immune responses (Reyes-Sandoval, 2007, Immunology 121(2): 158-65). Several viral vectors have thus emerged to date, all of them having relative advantages and limits depending on the proposed application (see for example Harrop and Carroll, 2006, Front Biosci., 11, 804-817; Inchauspé et al., 2009, Int Rev Immunol 28(1): 7-19; Torresi et al., 2011, J. Hepatol. 54(6): 1273-85). Significant research efforts have also been undertaken to develop antigen-coding DNA plasmids and associated delivery device to stimulate protective immune responses (e.g. see Reyes-Sandoval and Ertl, 2001, Curr Mol Med 1(2): 217-43).

For example, replication-defective adenovirus (Ad) vectors have been extensively used because Ad infects replicating and non-replicating cells, has a broad tissue tropism, propagates efficiently in suitable packaging cell lines and production process is scalable and affordable (Boukhebza et al., 2014, Vaccine 32(26): 3256-63). The attenuated non-replicative vaccinia virus Ankara strain (MVA) is also an attractive candidate since it has been shown to induce robust cellular immune responses with an excellent safety profile both in the cancer and infectious diseases fields (Boukhebza et al., 2012, Hum Vaccin Immunother 8(12): 1746-57; Habersetzer et al., 2011, Gastroenterology 141(3): 890-99; Fournillier et al., 2007, Vaccine 25(42): 7339-53; Drexler et al., 2004, Curr Opin Biotechnol 15(6): 506-12). MVA has been attenuated by more than 570 passages in chicken embryo fibroblasts resulting in the loss of 15% of its genome. Consequently, MVA is unable to produce mature virions in most mammalian cells that result in a reduced risk of dissemination and an increased immunogenicity due to the loss of several anti-immune defense genes (Sutter et al., 1994, Vaccine 12(11): 1032-40).

However, there are limits on the immune system's ability to fight chronic infectious diseases and cancers. Sometimes the immune system doesn't detect the cancer or infected cells as foreign because the cells are not different enough from normal cells. In other cases, the response might not be strong enough to destroy the diseased cells, especially in immuno-compromised patients. Finally, the immune system might be ineffective due to the fact that diseased cells have evolved different ways of eluding the immune system.

One of the major mechanisms of immune suppression is a process known as "T-cell exhaustion", which results from chronic exposure to antigens and is characterized by the upregulation of inhibitory receptors. These inhibitory receptors serve as immune checkpoints in order to prevent uncontrolled immune reactions. Various immune checkpoints acting at different levels of T cell immunity have been described in the literature, including programmed cell death protein 1 (PD-1), cytotoxic T-lymphocyte associated protein-4 (CTLA-4), Lymphocyte-activation gene 3 (LAG3), B and T lymphocyte attenuator, T-cell immunoglobulin, mucin domain-containing protein 3 (TIM-3), and V-domain immunoglobulin suppressor of T cell activation (VISTA). It has also been reported that the interaction of PD-1 with its ligands PDL-1 and PDL-2 plays a critical role in T cell exhaustion (Maier et al., 2007, J. Immunol. 178: 2714-20; Tzeng et al., 2012, PLOS One 7: e39179).

Whatever the mechanism of action, these immune checkpoints can inhibit the development of an efficient immune response. There is an increasing interest of blocking such immune checkpoints as a means of inhibiting immune system tolerance and thus rescue exhausted T cells (Leach et al., 1996, Science 271: 1734-6). A vast number of antagonistic antibodies have been developed during the last decade (e.g. anti LAG3, -PD-L1, -CTLA-4, -PD1, etc) and three are already marketed. The first to reach the market was the monoclonal-CTLA-4-specific antibody ipilimumab (Yervoy trade name, Bristol-Myers Squibb (BMS)) that has been approved for unresectable or metastatic melanoma. BMS reported that from 1861 melanoma patients treated with ipilimumab 22% and 17% are still alive 3 and 7 years later, respectively. Anti-PD1 nivolumab antibody (Opdivo trade name, BMS) was approved in Japan in July 2014 for malignant melanoma. Interim phase II data showed a 32% response rate in pretreated metastatic melanoma with lower high grade adverse events than Ipilimumab. Anti-PD-1 pembrolizumab (Keytruda trade name, Merck), gained accelerated FDA approval for the treatment of unresectable or metastatic melanoma. The marketed antibodies are also in clinical trials for other indications including NSCLC (non-small cell lung cancer) as well as a variety of other immune checkpoint inhibitors targeting PD-1 (e.g. pidilizumab, CureTech), CTLA-4 (e.g. Tremelimumab (AstraZeneca), PD-L1 (e.g. MPDL3280A, Roche), KIR (lirilumab, BMS), IDO1 (e.g. indoximod, NewLink genetics) and others.

Preclinical studies with antagonist antibodies are also pursuing in infectious disease field (see e.g. Barber et al., 2006, Nature 439: 682-7; Cecchinato et al., 2008, J. Immunol 180: 5439-47) and combinations with different vector platforms (DNA, MVA, lentivirus, vaccinia, etc.) were envisaged. In particular, the combination of PD-L1 blockade with a vaccinia virus expressing LMCV (Lymphocytic Chronomeningitis Virus) epitope was shown to improve the function of epitope-specific CD8+ T cells during persistent viral infection (Ha et al., 2008, JEM 205: 543-55). Administration of anti-PD-1 antibodies together with a SIV gag adenovirus vector in naive macaques caused increased in Gag-specific T cells (Finnefrock et al., 2009, J. Immunol. 182: 980-7). WO2004/058801 relates to the treatment of cancer using a recombinant MVA vector encoding p53 oncogenic polypeptide in combination with anti-CTLA4 antibodies and CpG oligodeoxynucleotide immunomodulators.

One may expect that cancer and infectious diseases will continue to be a serious global health threat for many years. Although availability of antibiotics and vaccines, infectious diseases cause 100.000 deaths per year throughout the world (data WHO 2002). On the other hand, malignant and especially metastatic tumors are often resistant to conventional therapies explaining the significant morbidity of some cancers. The above-description clearly illustrate that designing effective therapies is a difficult task due to the numerous mechanisms set up by the host's body to escape immune effector cells.

SUMMARY OF THE INVENTION

In the context of the invention, the inventors identified a combination product able to potentiate the patient's immune responses and/or restore exhausted T cell-mediated immunity. Essential elements of such a combination product are a therapeutic vaccine and an immune checkpoint inhibitor. The inventors surprisingly found that administrations of a MVA vector encoding a model antigen (βGal) in combination with anti-CTLA4 or anti-PD-1 antibody are surprisingly effective to reduce the volume of tumors implanted in a human cancer animal model and increase the survival rate of those animals. The ability of such combinations to provide antitumor effects is a good indication that the present invention can be useful for treating human subjects against a variety of diseases, and especially infectious and proliferative diseases.

In a first aspect the invention provides a combination product comprising at least a therapeutic vaccine and one or more immune checkpoint modulator(s). Preferably, the therapeutic vaccine comprises a viral vector and more preferably a recombinant viral vector encoding an antigenic polypeptide. Preferably the immune checkpoint modulator is a monoclonal antibody capable of antagonizing at least partially the activity of immune checkpoint such as CTLA-4 or PD-1.

The present invention also provides a composition comprising the therapeutic vaccine and the one or more immune checkpoint modulator(s) as well as the use or method of treatment using such a composition or combination, especially for treating infectious and proliferative diseases such as cancer.

Other and further aspects, features and advantages of the present invention will be apparent from the following description of the presently preferred embodiments of the invention. These embodiments are given for the purpose of disclosure.

DETAILED DESCRIPTION OF THE INVENTION

As described above, the inventors identified a combination product comprising at least (i) a therapeutic vaccine and (ii) one or more immune checkpoint modulator(s).

As used throughout the entire application, the terms "a" and "an" are used in the sense that they mean "at least one", "at least a first", "one or more" or "a plurality" of the referenced components or steps, unless the context clearly dictates otherwise. For example, the term "a therapeutic vaccine" includes a plurality of therapeutic vaccines, including mixtures thereof.

The term "one or more" refers to either one or a number above one (e.g. 2, 3, 4, 5, etc).

The term "and/or" wherever used herein includes the meaning of "and", "or" and "all or any other combination of the elements connected by said term".

The term "about" or "approximately" as used herein means within 10%, preferably within 8%, and more preferably within 5% of a given value or range.

As used herein, when used to define products, compositions and methods, the term "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are open-ended and do not exclude additional, unrecited elements or method steps. Thus, a polypeptide "comprises" an amino acid sequence when the amino acid sequence might be part of the final amino acid sequence of the polypeptide. "Consisting essentially of" means excluding other components or steps of any essential significance. Thus, a composition consisting essentially of the recited components would not exclude trace contaminants and pharmaceutically acceptable carriers. A polypeptide "consists essentially of" an amino acid sequence when such an amino acid sequence is present with optionally only a few additional amino acid residues. "Consisting of" means excluding more than trace elements of other components or steps. For example, a polypeptide "consists of" an amino acid sequence when the polypeptide does not contain any amino acids but the recited amino acid sequence.

The terms "polypeptide", "peptide" and "protein" refer to polymers of amino acid residues which comprise at least nine or more amino acids bonded via peptide bonds. The polymer can be linear, branched or cyclic and may comprise naturally occurring and/or amino acid analogs and it may be interrupted by non-amino acids. As a general indication, if the amino acid polymer is more than 50 amino acid residues, it is preferably referred to as a polypeptide or a protein whereas if it is 50 amino acids long or less, it is referred to as a "peptide".

Within the context of the present invention, the terms "nucleic acid", "nucleic acid molecule", "polynucleotide" and "nucleotide sequence" are used interchangeably and define a polymer of any length of either polydeoxyribonucleotides (DNA) (e.g. cDNA, genomic DNA, plasmids, vectors, viral genomes, isolated DNA, probes, primers and any mixture thereof) or polyribonucleotides (RNA) (e.g. mRNA, antisense RNA, SIRNA) or mixed polyribo-polydeoxyribonucleotides. They encompass single or double-stranded, linear or circular, natural or synthetic, modified or unmodified polynucleotides. Moreover, a polynucleotide may comprise non-naturally occurring nucleotides and may be interrupted by non-nucleotide components.

The term "analog", "mutant" or "variant" as used herein refers to a component (polypeptide or nucleic acid) exhibiting one or more modification(s) with respect to its native counterpart. Any modification(s) can be envisaged, including substitution, insertion and/or deletion of one or more nucleotide/amino acid residue(s). When several mutations are contemplated, they can concern consecutive residues and/or non-consecutive residues. Mutation(s) can be generated by a number of ways known to those skilled in the art, such as site-directed mutagenesis (e.g. using the Sculptor™ in vitro mutagenesis system of Amersham, Les Ullis, France), PCR mutagenesis, DNA shuffling and by chemical synthetic techniques (e.g. resulting in a synthetic nucleic acid molecule). Preferred are analogs that retain a degree of sequence identity of at least 80%, preferably at least 85%, more preferably at least 90%, and even more preferably at least 98% identity with the sequence of the native counterpart.

In a general manner, the term "identity" refers to an amino acid to amino acid or nucleotide to nucleotide correspondence between two polypeptide or nucleic acid sequences. The percentage of identity between two sequences is a function of the number of identical positions shared by the sequences, taking into account the number of gaps which need to be introduced for optimal global alignment and the length of each gap. Various computer programs and mathematical algorithms are available in the art to determine the percentage of identity between amino acid sequences, such as for example the algorithm of Needleman et Wunsch. J. Mol. Biol. 48,443-453, 1970, the Blast program available at NCBI or ALIGN in Atlas of Protein Sequence and Structure (Dayhoffed, 1981, Suppl., 3: 482-9) or the needle software available from ebi.ac.uk world wide under the name «Align». Programs for determining identity between nucleotide sequences are also available in specialized data base (e.g. Genbank®, the Wisconsin Sequence Analysis Package, BESTFIT, FASTA and GAP programs). For illustrative purposes, "at least 80% identity" means 80%, 81%, 82%, 83%, 84%, 85%, 86%, 87%, 88%, 89%, 90%, 91%, 92%, 93%, 94%, 95%, 96%, 97%, 98%, 99% or 100%.

As used herein, the term "isolated" refers to a component (e.g. a polypeptide, peptide, polynucleotide, vector, etc.), that is removed from its natural environment (i.e. separated from at least one other component(s) with which it is naturally associated or found in nature). An isolated component refers to a component that is maintained in a heterologous context or purified (partially or substantially). For example, a nucleic acid molecule is isolated when it is separated of sequences normally associated with it in nature (e.g. dissociated from a chromosome or a genome) but it can be associated with heterologous sequences (e.g. within a recombinant vector).

The term "obtained from", "originating" or "originate" is used to identify the original source of a component (e.g. a polypeptide, peptide, polynucleotide, vector, etc.) but is not meant to limit the method by which the component is made which can be, for example, by chemical synthesis or recombinant means.

The term "combination" as used herein refers to any arrangement possible of two or more entities (e.g. at least the therapeutic vaccine and the one or more immune checkpoint modulator(s) described herein).

A "therapeutic vaccine" as used herein refers to any substance (e.g. polypeptide, polysaccharide, nucleic acid, etc.), including complex substance (e.g. cells, cell mixtures, live or dead organisms such as bacteria, viruses, and other microorganisms, etc . . . ), part thereof (e.g. immunogenic fragment, epitope, cell wall, flagella, etc) or analogs thereof, that is capable of being the target of an immune response. The term encompasses "antigens" (i.e. native antigens as well as fragments and analogs thereof).

The term "immune checkpoint modulator" refers to a molecule capable of modulating the function of an immune checkpoint protein in a positive or negative way (in particular the interaction between an antigen presenting cell (APC) and an immune T effector cell).

The term "subject" generally refers to an organism for whom any product and method of the invention is needed or may be beneficial. Typically, the organism is a mammal, particularly a mammal selected from the group consisting of domestic animals, farm animals, sport animals, and primates. Preferably, the subject is a human who have been diagnosed as being or at risk of having a pathological condition such as an infectious disease caused by or associated with a pathogenic organism or a proliferative disease such as cancer. The terms "subject" and "patients" may be used interchangeably when referring to a human organism and encompasses male and female. The subject to be treated may be a newborn, an infant, a young adult or an adult.

DETAILED DESCRIPTION OF THE INVENTION

In a first aspect the present invention provides a combination product comprising at least (i) a therapeutic vaccine and (ii) one or more immune checkpoint modulator(s).
Combination Product In the context of the present invention, such an arrangement includes a mixture of the individual entities (e.g. a single composition) meaning that the individual entities making up the combination are placed together in a common container before administration to the subject. By contrast, distinct combinations refer to the case where the individual entities are not mixed together meaning that they are into separate containers (e.g. distinct compositions) for administration in conjunction with one another either concomitantly, sequentially or in an interspersed manner.

Exemplary combinations include, but are not limited to, combination of polypeptides (e.g. peptide or protein-based therapeutic vaccine and one or more immune checkpoint modulator(s) in the form of recombinant polypeptide) or combination of nucleic acid molecule(s) (e.g. a vectorized therapeutic vaccine and one or more vector(s) engineered for encoding and expressing immune checkpoint modulator(s)) as well as combination of both polypeptide(s) and nucleic acid molecule(s) (e.g. a vectorized therapeutic vaccine and one or more recombinant immune checkpoint modulator polypeptide(s)). For illustrative purposes, a single composition can be in the form of a) a mixture of the therapeutic vaccine with one or more immune checkpoint modulator polypeptide(s); b) a mixture of the therapeutic vaccine with vector(s) encoding of the one or more immune checkpoint modulator(s) or c) a specific design (e.g. the therapeutic vaccine encodes both polypeptide(s) of therapeutic interest and the one or more immune checkpoint modulator(s)). The present invention encompasses combinations comprising equal molar concentrations of each entity as well as combinations with very different concentrations of the different entities. It is appreciated that optimal concentration of each entity of the combination can be determined by the artisan skilled in the art. Preferably, the combination is synergistic providing higher efficacy (e.g. an increased survival) than each entity alone.

In the context of the invention, the combination product of the present invention can be used for prophylaxis (e.g. to reduce the risk of having a given disease or pathological condition) and/or therapy (e.g. in a subject diagnosed as having a given disease or pathological condition). Therapeutic use is preferred.
Therapeutic Vaccine In one embodiment, the "therapeutic vaccine" as used herein is a biological product designed to elicit or increase immunity to a particular target (e.g. cancerous or infected cells, etc.) through the presence or expression of a polypeptide of interest which is expected to cause a beneficial effect on the course or a symptom of the disease or pathological condition when administered appropriately to a subject.

Several types of therapeutic vaccines can be used in the context of the invention including, but not limited to, cell-based vaccines, peptide or polypeptide-based vaccines and vector-based vaccines.

Representative examples of cell based vaccines can be obtained for example
From stem cells (such as SL-701 developed by Stemline Therapeutics for treating glioblastoma);
From specialized cells such as immune cells that are reprogramed in vitro to attack cancer cells (e.g. the Dendritic cell vaccine developed by Immunocellular Therapeutics targeting six tumor-associated antigens (TAA) involved in glioblastoma, and Provenge vaccine approved for treating advanced prostate cancer);
From patient's cancer cells altered in lab to make them more amenable to be attacked by the patient's immune system; or
From microorganisms that have been engineered for being avirulent or attenuated by disabling their virulent properties and optionally for expressing polypeptides of interest. Well-known examples of such microorganisms include without limitation bacterium (e.g. *Mycobacterium; Lactobacillus* (e.g. *Lactococcus lactis*); *Listeria* (e.g. *Listeria monocytogenes*) *Salmonella* and *Pseudomona*), and yeast (e.g. *Saccharomyces cerevisiae, Schizosaccharomyces pombe, Pichia pastoris*). Representative examples of bacterium and yeast therapeutic vaccines include *Mycobacterium bovis* BCG and Tarmogens® developed by GlobeImmune made from genetically-modified yeast that express one or more disease-associated antigens.

Typically, peptide or polypeptide vaccine includes antigenic peptide(s)/polypeptide(s) optionally mixed to an adjuvant. One may cite for illustrative purpose Newax E75 developed by Galena and Genentech for breast cancer.

Vector-based vaccines are preferred in the context of the invention. The term "vector" as used herein refers to a vehicle, preferably a nucleic acid molecule or a viral particle that contains the elements necessary to allow delivery, propagation and/or expression of biological molecules within a host cell or subject. For the purpose of the invention, the vectors may be of naturally occurring genetic sources, synthetic or artificial, or some combination of natural and artificial genetic elements. This term encompasses extrachromosomal vectors (e.g. that remain in the cell cytosol or nucleus) and integration vectors (e.g. designed to integrate into the cell genome) as well as cloning and expression vectors.

In one embodiment, the therapeutic vaccine comprises a recombinant plasmid or viral vector. A "plasmid vector" as used herein refers to a replicable DNA construct. Usually plasmid vectors contain selectable marker genes that allow host cells carrying the plasmid vector to be selected for or against in the presence of a corresponding selective drug. A variety of positive and negative selectable marker genes are known in the art. By way of illustration, an antibiotic resistance gene can be used as a positive selectable marker gene that allows selection of the plasmid-containing cells in the presence of the corresponding antibiotic. Suitable plasmid vectors include, without limitation, pREP4, pCEP4 INVITROGEN®, pCI (Promega), pCDM8 (Seed, 1987, Nature 329: 840), pMT2PC (Kaufman et al., 1987, EMBO J. 6:187-95), pVAX (Invitrogen®) and pgWiz (Gene Therapy System Inc; Himoudi et al., 2002, J. Virol. 76: 12735-46).

The term "viral vector" or "virus" or "virions" or "therapeutic virus" as used herein refers to a nucleic acid vector that includes at least one element of a virus genome allowing packaging into a viral particle. In the context of the present invention, these terms have to be understood broadly as including nucleic acid vector (e.g. vector DNA) as well as viral particles generated thereof, and especially infectious viral particles. The term "infectious" refers to the ability of a viral vector to infect and enter into a host cell or subject.

Viral vectors can be replication-competent or selective (e.g. engineered to replicate better or selectively in specific host cells), or can be genetically disabled so as to be replication-defective or replication-impaired. In a preferred embodiment, the therapeutic vaccine comprised in the combination of the invention is a replication-defective or replication-impaired viral vector which means that it cannot replicate to any significant extent in normal cells, especially in normal human cells. The impairment or defectiveness of replication functions can be evaluated by conventional means, such as by measuring DNA synthesis and/or viral titer in non-permissive cells. The viral vector can be rendered replication-defective by partial or total deletion or inactivation of regions critical to viral replication. Such replication-defective or impaired viral vectors typically require for propagation, permissive cell lines which bring up or complement the missing/impaired functions.

Viral vectors can be engineered from a variety of viruses and in particular from the group of viruses consisting of adenovirus, adenovirus-associated virus (AAV), poxvirus, herpes virus, measles virus, foamy virus, alphavirus, vesicular stomatis virus, Newcastle disease virus, picorna virus, Sindi virus, etc). One may use either parental strains as well as derivatives thereof (i.e. a virus that is modified compared to a parental strain of said virus, e.g. by truncation, deletion, substitution, and/or insertion of one or more nucleotide(s) contiguous or not within the viral genome). Modification(s) can be within endogenous viral genes (e.g. coding and/or regulatory sequences) and/or within intergenic regions. Moreover, modification(s) can be silent or not (e.g. resulting in a modified viral gene product). Modification(s) can be made in a number of ways known to those skilled in the art using conventional molecular biology techniques.

Preferably, the modifications encompassed by the present invention affect, for example, virulence, toxicity, or pathogenicity of the virus compared to a virus without such modification, but do not completely inhibit infection and production of new virus at least in permissive cells. Said modification(s) preferably lead(s) to the synthesis of a defective protein (or lack of synthesis) so as to be unable to ensure the activity of the protein produced under normal conditions by the unmodified gene. Exemplary modifications are disclosed in the literature with a specific preference for those altering viral genes involved in DNA metabolism, host virulence and IFN pathway (see e.g. Guse et al., 2011, Expert Opinion Biol. Ther. 11(5):595-608). Other suitable modifications include the insertion of exogenous gene(s) (e.g. nucleic acid molecule(s) of interest) as described hereinafter.

A particularly suitable viral vector to be comprised in the therapeutic vaccine in use herein is obtained from a poxvirus. As used herein the term "poxvirus" refers to a virus belonging to the Poxviridae family with a preference for the Chordopoxvirinae subfamily directed to vertebrate host which includes several genus such as Orthopoxvirus, Capripoxvirus, Avipoxvirus, Parapoxvirus, Leporipoxvirus and Suipoxvirus. Orthopoxviruses are preferred in the context of the present invention as well as the Avipoxviruses including Canarypoxvirus (e.g. ALVAC) and Fowlpoxvirus (e.g. the FP9 vector).

In a preferred embodiment, the therapeutic vaccine comprises a poxviral vector belonging to the Orthopoxvirus genus and even more preferably to the vaccinia virus (VV) species. Vaccinia viruses are large, complex, enveloped viruses with a linear, double-stranded DNA genome of approximately 200 kb in length which encodes numerous viral enzymes and factors that enable the virus to replicate independently from the host cell machinery. Two distinct infectious viral particles exist, the intracellular IMV (for intracellular mature virion) surrounded by a single lipid envelop that remains in the cytosol of infected cells until lysis and the double enveloped EEV (for extracellular enveloped virion) that buds out from the infected cell. Any vaccinia virus strain can be used in the context of the present invention including, without limitation, Western Reserve (WR), Copenhagen (Cop), Lister, LIVP, Wyeth, Tashkent, Tian Tan, Brighton, Ankara, MVA (Modified vaccinia virus Ankara), LC16M8, LC16M0 strains, etc. and any derivative thereof.

Engineered poxviruses can be used with modifications aimed at improving safety (e.g. increased attenuation) and/or efficacy (e.g. improved selectivity for cancer cells and/or decreasing toxicity in healthy cells) of the resulting virus. One may cite more particularly defective modifications within the thymidine kinase (J2R; see Weir and Moss, 1983, Genbank® accession number AAA48082), the deoxyuridine triphosphatase (F2L), the viral hemagglutinin (A56R); the small (F4L) and/or the large (I4L) subunit of the ribonucleotide reductase, the serine protease inhibitor (B13R/B14R) and the complement 4b binding protein (C3L). Representative examples of suitable VV for use in this invention include NYVAC (U.S. Pat. No. 5,494,807) as well as TK-defective, TK- and F2L-defective (WO2009/065547) and TK- and 14L-defective VV (WO2009/065546). The gene nomenclature used herein is that of Copenhagen Vaccinia strain. It is also used herein for the homologous genes of other poxviridae unless otherwise indicated. However, gene nomenclature may be different according to the pox strain but correspondence between Copenhagen and other vaccinia strains are generally available in the literature.

Sequences of the genome of various Poxviridae, are available in the art in specialized databanks such as GENBANK®. For example, the vaccinia virus strains Western Reserve, Copenhagen, Cowpoxvirus and Canarypoxvirus genomes are available in GENBANK® under accession numbers NC_006998, M35027, NC_003663, NC_005309, respectively. A particularly appropriate viral vector in the context of the present invention is MVA due to its highly attenuated phenotype (Mayr et al., 1975, Infection 3: 6-14; Sutter and Moss, 1992, Proc. Natl. Acad. Sci. USA 89: 10847-51), a more pronounced IFN-type 1 response generated upon infection compared to non-attenuated vectors and availability of the sequence of its genome in the literature (Antoine et al., 1998, Virol. 244: 365-96) and in GENBANK® (under accession number U94848).

Other viral vectors appropriate in the context of the invention are morbillivirus which can be obtained from the paramyxoviridae family, with a specific preference for measles virus. Various attenuated strains are available in the art (Brandler et al, 2008, CIMID, 31: 271; Singh et al., 1999, J. Virol. 73(6): 4823), such as and without limitation, the Edmonston A and B strains (Griffin et al., 2001, Field's in Virology, 1401-1441), the Schwarz strain (Schwarz A, 1962, Am J Dis Child, 103: 216), the S-191 or C-47 strains (Zhang et al., 2009, J Med Virol. 81 (8): 1477). One may also use recombinant Newcastle Disease Virus (NDV) (Bukreyev and Collins, 2008, Curr Opin Mol Ther 10: 46-55) with a specific preference for an attenuated strain thereof such as MTH-68 that was already used in cancer patients (Csatary et al., 1999, Anti Cancer Res 19: 635-8) and NDV-HUJ, which showed promising results in glioblastoma patients (isracast-.com Mar. 1, 2006).

Still another suitable viral vector for use in the present invention is an adenoviral vector. It can be derived from a variety of human or animal adenoviruses (e.g. canine, ovine, simian, etc) and any serotype can be employed. It can also be a chimeric adenovirus (WO2005/001103). One of skill will recognize that elements derived from multiple serotypes can be combined in a single adenovirus.

Desirably, the adenoviral vector originates from a human Ad, including those of rare serotypes, or from a primate (e.g. chimpanzee, gorilla). Representative examples of human adenoviruses include subgenus C (e.g. Ad2 Ad5 and Ad6), subgenus B (e.g. Ad3, Ad7, Ad11, Ad14, Ad34, Ad35 and Ad50), subgenus D (e.g. Ad19, Ad24, Ad26, Ad48 and Ad49) and subgenus E (Ad4). Representative examples of chimp Ad include without limitation AdCh3 (Peruzzi et al., 2009, Vaccine 27: 1293-300) and AdCh63 (Dudareva et al, 2009, Vaccine 27: 3501-4) and any of those described in the art (see for example, WO2010/086189; WO2009/105084; WO2009/073104; WO2009/073103; WO2005/071093; and WO03/046124). A number of adenoviruses are now well characterized genetically and biochemically (Hoffmann et al., 2007, Human Gene Ther. 18: 51-62). An exemplary genome sequence of human adenovirus type 5 (Ad5) is found in GenBank® Accession M73260 and in Chroboczek et al. (1992, Virol. 186: 280-5).

Preferably, the adenovirus employed in this invention is replication-defective, e.g. by total or partial deletion of E1 region. An appropriate E1 deletion extends from approximately positions 459 to 3510 by reference to the sequence of the Ad5 disclosed in the GenBank® under the accession number M 73260. Preferably, the virus retains a functional viral pIX gene. The adenoviral genome may comprise additional modification(s) (e.g. deletion of all or part of other essential E2 and/or E4 regions as described in WO94/28152; Lusky et al, 1998, J. Virol 72: 2022). In addition, the non-essential E3 region can also be mutated or deleted.

More preferably, the adenovirus comprised in the therapeutic vaccine of the invention is a human adenovirus of serotype 5 (Ad5), defective for E1 and/or E3 function and comprising a nucleic acid molecule of interest inserted in the E1 region.

The present invention also encompasses vectors or viral particles complexed to lipids or polymers (e.g. polyethylene glycol) to form particulate structures such as liposomes, lipoplexes or nanoparticles as well as vectors or viral particles modified to allow preferential targeting to a specific host cell. A characteristic feature of targeted vectors is the presence at their surface of a ligand capable of recognizing and binding to a cellular and surface-exposed component. Examples of suitable ligands include antibodies or fragments thereof directed to cell-specific, tissue-specific and pathogen-associated markers. Targeting can be carried out by genetically inserting the ligand into a polypeptide present on the surface of the virus (e.g. in the adenoviral fiber or in the poxviral p14 IMV exposed polypeptide, etc.) or by chemically modifying the viral surface envelope. Furthermore, when using a virus-based therapeutic vaccine, said virus can be live, attenuated, inactivated or killed.

Polypeptides of Interest

The therapeutic vaccine comprised in the combination product of the present invention preferably contains or encodes one or more polypeptides of therapeutic interest that can compensate for pathological symptoms, e.g. by acting through toxic effects to limit or remove harmful cells from the body, by improving immunity or by reversing immune exhaustion mechanisms. Such polypeptides may be encoded by native genes or genes obtained from the latter following suitable sequence modification(s). In the context of the invention, the polypeptide of interest can be of mammal origin (e.g. human) or not (e.g. of bacterial or viral origin).

Advantageously, the therapeutic vaccine in use in the present invention comprises or encodes one or more polypeptide(s) selected from the group consisting of suicide gene products, immunostimulatory polypeptides and antigenic polypeptides. Preferred antigenic polypeptides for use herein are tumor-associated antigens and antigens of pathogenic organisms. Preferably, the polypeptide of interest is not an oncogenic transcription factor such as p53.

Suicide Genes

The term "suicide gene" refers to a nucleic acid molecule coding for a protein (e.g. enzyme) able to convert a precursor of a drug into a cytotoxic compound. Appropriate suicide genes for use in this invention are disclosed in the following table with the corresponding prodrug (or drug precursor) and the active (cytotoxic) drug.

TABLE 1

| Enzyme | Prodrug | Active Drug |
| --- | --- | --- |
| Thymidine phosphorylase | 5-FU | 5-FdUMP |
|  | 5'-DFUR | 5-FU |
| Deoxycitidine kinase | Gemcitabine | Gemcitabine monophosphate |
| Cytidine deaminase | 5'-DFCR | 5'-DFUR |
| Cytosine deaminase | 5-FC | 5-FU |
| Uracil phosphoribosyltransferase | 5-FU | 5-FUMP |
| Thymidine phosphorylase | 5-FU | 5-FdUMP |
| Thymidine kinase (HSV) | Ganciclovir | Ganciclovir-triphosphate nucleotide |
| Nitroreductase | CB1954 | 5-(Aziridin-1-yl)-4-hydroxyl-amino-2-nitro-benzamide |
| Cytochrome P450 | Ifosfamide | Isophosphoramide mustard |
|  | Cyclophosmamide | Phosphoramide mustard |

TABLE 1-continued

| Enzyme | Prodrug | Active Drug |
| --- | --- | --- |
| Purine-nucleoside phosphorylase | Fludarabine | 2-Fluoroadenine |
| Alkaline phosphatase | Etoposide phosphate | Etoposide |
| | Mitomycin C phosphate | Mitomycin C |
| | N-(4-phophonooxy-phenylacetyl)doxorubicin | Doxorubicin |
| Carboxypeptidase | Methotrexate-amino acids | Methotrexate |
| Penicillin amidase | N-(phenylacetyl) doxorubicin | Doxorubicin |
| β-Lactamase | C-DOX | Doxorubicin |

Desirably, the therapeutic vaccine comprises or encodes a polypeptide having at least cytosine deaminase (CDase) activity. CDase encoding nucleic acid molecule can be obtained from any prokaryotes and lower eukaryotes such as *Saccharomyces cerevisiae* (FCY1 gene), *Candida albicans* (FCA1 gene) and *Escherichia coli* (codA gene).

Alternatively or in combination, the therapeutic vaccine comprises or encodes a polypeptide having uracil phosphoribosyl transferase (UPRTase) activity. UPRTase-encoding nucleic acid molecule can be obtained from *E. coli* (Andersen et al., 1992, European J. Biochem. 204: 51-56), *Lactococcus lactis* (Martinussen et al., 1994, J. Bacteriol. 176: 6457-63), *Mycobacterium bovis* (Kim et al., 1997, Biochem. Mol. Biol. Internat. 41: 1117-24), *Bacillus subtilis* (Martinussen et al., 1995, J. Bacteriol. 177: 271-4) and yeast (e.g. *S. cerevisiae* FUR1 disclosed by Kern et al., 1990, Gene 88: 149-57).

The nucleotide sequence of such CDase and UPRTase-encoding nucleic acid molecules and amino acids of the encoded enzyme are available in specialized data banks (SWISSPROT EMBL, Genbank®, Medline and the like). Functional analogues may also be used. Such analogues preferably have an amino acid sequence having a degree of identity of at least 70%, advantageously of at least 80%, preferably of at least 90%, and most preferably of at least 95% with the native polypeptide. It is within the reach of the skilled person to engineer analogs from the published data, and test the enzymatic activity in an acellular or cellular system according to conventional techniques (see e.g. EP998568). For illustrative purposes, suitable functional analogues comprise the N-terminally truncated FUR1 mutant described in EP998568 (with a deletion of the 35 first residues up to the second Met residue present at position 36 in the native protein) which exhibits a higher UPRTase activity than that of the native enzyme as well as the FCY1::FUR1 fusions named FCU1 (amino acid sequence represented in the sequence identifier SEQ ID NO: 1 of WO2009/065546) and FCU1-8 described in WO96/16183, EP998568 and WO2005/07857.

Immunostimulatory Polypeptides

As used herein, the term "immunostimulatory polypeptide" refers to a polypeptide which has the ability to stimulate the immune system, in a specific or non-specific way. A vast number of proteins are known in the art for their ability to exert an immunostimulatory effect. Examples of suitable immunostimulatory proteins in the context of the invention include without limitation cytokines, with a specific preference for interleukins (e.g. IL-2, IL-6, IL-12, IL-15, IL-24), chemokines (e.g. CXCL10, CXCL9, CXCL11), interferons (e.g. IFNα, IFNβ, IFNγ), tumor necrosis factor (TNF), colony-stimulating factors (e.g. GM-CSF, C-CSF, M-CSF . . . ), APC (for Antigen Presenting Cell)-exposed proteins (e.g. B7.1, B7.2 and the like), growth factors (Transforming Growth Factor TGF, Fibroblast Growth Factor FGF, Vascular Endothelial Growth Factors VEGF, and the like), major histocompatibility complex (MHC) antigens of class I or II, apoptosis inducers or inhibitors (e.g. Bax, Bcl2, BclX . . . ) and immunotoxins. Preferably, the immunostimulatory protein is an interleukin or a colony-stimulating factor (e.g. GM-CSF).

Antigenic Polypeptides

In one embodiment, the therapeutic vaccine contains or encodes an antigen in connection with the disease to treat. The term "antigenic" refers to the capacity of eliciting or stimulating an immune response (e.g. a cell-mediated and/or humoral immunity). The antigen stimulates the body's immune system to recognize the target as foreign so that the immune system can more easily recognize and destroy it when later encounters. The present invention encompasses native antigenic polypeptides (present in/on live or dead organisms or cells) as well as modified version thereof (analogs, fragments) and combination thereof as described herein.

In the context of the invention, preferred antigens contained in or encoded by the therapeutic vaccine are tumour-specific or tumour-related antigens (i.e. tumor-associated antigens) as well as antigens form pathogenic organisms such as virus, bacteria, parasite and the like as well as allergens.

Viral antigenic polypeptides include for example antigens from hepatitis viruses A, B, C, D and E, immunodeficiency viruses (e.g. HIV), herpes viruses, cytomegalovirus, varicella zoster, papilloma viruses, Epstein Barr virus, influenza viruses, para-influenza viruses, adenoviruses, coxsakie viruses, picorna viruses, rotaviruses, respiratory syncytial viruses, pox viruses, rhinoviruses, rubella virus, papovirus, mumps virus, measles virus. Some non-limiting examples of HIV antigens include gp120 gp40, gp160, p24, gag, pol, env, vif, vpr, vpu, tat, rev, nef tat, nef. Some non-limiting examples of human herpes viruses antigens include gH, gL gM gB gC gK gE or gD or Immediate Early protein such asICP27, ICP47, ICP4, ICP36 from HSV1 or HSV2. Some non-limiting examples of cytomegalovirus antigens include gB. Some non-limiting examples of derived from Epstein Barr virus (EBV) include gp350. Some non-limiting examples of Varicella Zoster Virus antigens include gp1, 11, 111 and IE63. Some non-limiting examples of hepatitis C virus antigens includes env E1 or E2 protein, core protein, NS2, NS3, NS4a, NS4b, NS5a, NS5b, p7. Some non-limiting examples of human papilloma viruses (HPV) antigens include L1, L2, E1, E2, E3, E4, E5, E6, E7. Antigens derived from other viral pathogens, such as Respiratory Syncytial virus (e.g. F and G proteins), parainfluenza virus, measles virus, mumps virus, flaviviruses (e.g. Yellow Fever Virus, Dengue Virus, Tick-borne encephalitis virus, Japanese Encephalitis Virus) and Influenza virus cells (e.g. HA, NP, NA, or M proteins) can also be used in accordance with the present invention.

Bacterial antigenic polypeptides include for example antigens from Mycobacteria causing TB and leprosy, pneumocci, aerobic gram negative bacilli, mycoplasma, staphyloccocus, streptococcus, salmonellae, chlamydiae, neisseriae and the like.

Parasitic antigenic polypeptides include for example antigens from malaria, leishmaniasis, trypanosomiasis, toxoplasmosis, schistosomiasis and filariasis.

Allergenic polypeptides refer to any substance that can induce an allergic or asthmatic response in a susceptible subject. Allergens include pollens, insect venoms, animal dander dust, fungal spores and drugs (e.g. penicillin).

Tumor-associated antigenic polypeptides (TAA) include various categories of antigens, e.g. those which are normally silent (i.e. not expressed) in normal cells, those that are expressed only at low levels or at certain stages of differentiation and those that are temporally expressed such as embryonic and foetal antigens as well as those resulting from mutation of cellular genes, such as oncogenes (e.g. activated ras oncogene), proto-oncogenes (e.g. ErbB family), or proteins resulting from chromosomal translocations. Such tumor-associated antigens also encompasse antigens encoded by pathogenic organisms that are capable to induce a malignant condition in a subject (especially chronically infected subject) such as RNA and DNA tumor viruses (e.g. HPV, HCV, EBV, etc) and bacteria (e.g. *Helicobacter pylori*). Some non-limiting examples of tumor-associated antigens include, without limitation, MART-1/Melan-A, gp100, Dipeptidyl peptidase IV (DPPIV), adenosine deaminase-binding protein (ADAbp), cyclophilin b, Colorectal associated antigen (CRC)-C017-1A/GA733, Carcinoembryonic Antigen (CEA) and its immunogenic epitopes CAP-1 and CAP-2, etv6, aml1, Prostate Specific Antigen (PSA) and its immunogenic epitopes PSA-1, PSA-2, and PSA-3, prostate-specific membrane antigen (PSMA), T-cell receptor/CD3-zeta chain, MAGE-family of tumor antigens (e.g., MAGE-A1, MAGE-A2, MAGE-A3, MAGE-A4, MAGE-A5, MAGE-A6, MAGE-A7, MAGE-A8, MAGE-A9, MAGE-A10, MAGE-A11, MAGE-A12, MAGE-Xp2 (MAGE-B2), MAGE-Xp3 (MAGE-B3), MAGE-Xp4 (MAGE-B4), MAGE-C1, MAGE-C2, MAGE-C3, MAGE-C4, MAGE-C5), GAGE-family of tumor antigens (e.g., GAGE-1, GAGE-2, GAGE-3, GAGE-4, GAGE-5, GAGE-6, GAGE-7, GAGE-8, GAGE-9), BAGE, RAGE, LAGE-1, NAG, GnT-V, MUM-1, CDK4, tyrosinase, p53, MUC family (e.g. MUC1, MUC16, etc; see e.g. U.S. Pat. No. 6,054,438; WO98/04727; or WO98/37095), HER2/neu, p21ras, RCAS1, alpha-fetoprotein, E-cadherin, alpha-catenin, beta-catenin and gamma-catenin, p120ctn, gp100.sup.Pmel117, PRAME, NY-ESO-1, cdc27, adenomatous polyposis coli protein (APC), fodrin, Connexin 37, Ig-idiotype, p15, gp75, GM2 and GD2 gangliosides, Smad family of tumor antigens brain glycogen phosphorylase, SSX-1, SSX-2 (HOM-MEL-40), SSX-1, SSX-4, SSX-5, SCP-1 and CT-7, and c-erbB-2 and viral antigens such as the HPV-16 and HPV-18 E6 and E7 antigens and the EBV-encoded nuclear antigen (EBNA)-1 as well as markers (beta-galactosidase, luciferase . . . ).

The present invention also encompasses therapeutic vaccine comprising/expressing two or more polypeptides of interest as described above, e.g. at least two antigens, at least one antigen and one immunostimulatory polypeptide, at least two antigens and one immunostimulatory polypeptide, etc.

A preferred therapeutic vaccine comprised in the combination product of the invention comprises or encodes one or more polypeptides of interest selected from the group consisting of:
The MUC-1 antigen
HPV E6 and E7 antigens, in particular non-oncogenic variants thereof;
The human IL-2
The human GM-CSF;
The FCU-1 suicide gene;
HBV antigens, in particular HBV pol, HBsAg and/or core;
Mycobacteria (e.g. MtB or *M. bovis*) antigens in particular one or more selected from the group consisting of RpfB, RpfD, Ag85A, Ag85B, ESAT6, CFP10, TB10.4, Rv0111, Rv0287, Rv0569, Rv1733, Rv1813, Rv2029, Rv2626, Rv3407, Rv3477, Rv3478, and
The HCV NS antigens (e.g. NS3, NS4a, NS4b, NS5a, NS5b).

The present invention encompasses the use/expression of native polypeptide(s) of interest as well as analogs thereof (e.g. fragments thereof such as peptides; and modified ones), especially when the native polypeptide exerts undesired properties (e.g. oncogenic or transforming properties, cytotoxicity, etc). For example, to circumvent oncogenicity of HPV E6 and E7 polypeptides, one may use or express non oncogenic analogs displaying reduced capacity to bind p53 and Rb, respectively. Such non oncogenic analogs are described e.g. in Munger et al. (1989, EMBO J. 8: 4099-105); Crook et al. (1991, Cell 67: 547-56); Heck et al. (1992, Proc. Natl. Acad. Sci. USA 89: 4442-6); Munger et al. (1991, J. Virol. 65: 3943-8); Phelps et al. (1992, J. Virol. 66, 2418-27) and WO99/03885. A non-oncogenic HPV-16 E6 variant which is suitable for the purpose of the present invention is deleted of one or more amino acid residues located from approximately position 118 to approximately position 122 (+1 representing the first methionine residue of the native HPV-16 E6 polypeptide), with a special preference for the complete deletion of residues 118 to 122 (CPEEK). A non-oncogenic HPV-16 E7 variant which is suitable for the purpose of the present invention is deleted of one or more amino acid residues located from approximately position 21 to approximately position 26 (+1 representing the first amino acid of the native HPV-16 E7 polypeptide, with a special preference for the complete deletion of residues 21 to 26 (DLYCYE). In one embodiment, it might be advantageous to modify or include additional features to the polypeptide of interest so as to improve its immunogenic activity and/or therapeutic activity. For example, it can be useful to associate (e.g. by mixture, fusion or independent expression) in a same therapeutic vaccine (in particular a vector-based therapeutic vaccine):
A nucleotide sequence encoding an antigen (e.g. a TAA, or an antigen from a pathogenic organism as previously described), and
A nucleotide sequence encoding an immunostimulatory polypeptide such a cytokine or an interleukin (for instance IL-2; tumour necrosis factor (TNF); interferon (IFN); colony stimulating factor (CSF), or granulocyte-macrophage colony-stimulating factor (GMCSF).

One may also use or express with the polypeptide of interest one or more peptides or polypeptides capable of enhancing immunogenicity. Such peptides or polypeptides have been described in the literature and include, without limitation, calreticulin (Cheng et al., 2001, J. Clin. Invest. 108: 669-78), *Mycobacterium tuberculosis* heat shock protein 70 (HSP70) (Chen et al., 2000, Cancer Res. 60: 1035-

42), ubiquitin (Rodriguez et al., 1997, J. Virol. 71: 8497-503), bacterial toxin such as the translocation domain of *Pseudomonas aeruginosa* exotoxin A (ETA(dIII)) (Hung et al., 2001 Cancer Res. 61: 3698-703) as well as $T_H$ Pan-Dr epitope (Sidney et al., 1994, Immunity 1: 751), pstS1 GCG epitope (Vordermeier et al., 1992, Eur. J. Immunol. 22: 2631), tetanus toxoid P2TT (Panina-Bordignon et al., 1989, Eur. J. Immunol. 19: 2237) and P30TT (Demotz et al., 1993, Eur. J. Immunol. 23: 425) peptides, and influenza epitope (Lamb et al., 1982, Nature 300:66; Rothbard et al., 1989, Int. Immunol. 1: 479).

Other suitable structural features are those which are beneficial to the synthesis, processing, stability and solubility of the polypeptide of interest that is used in or expressed by the therapeutic vaccine of the invention; e.g. those aimed to modify potential cleavage sites, potential glycosylation sites and/or membrane anchorage so as to improve MHC class I and/or MHC class II presentation. Membrane presentation can be achieved by incorporating in the polypeptide of interest a membrane-anchoring sequence and a secretory sequence (i.e. a signal peptide) if the native polypeptide lacks it. Briefly, signal peptides usually comprise 15 to 35 essentially hydrophobic amino acids which are then removed by a specific ER (endoplasmic reticulum)-located endopeptidase to give the mature polypeptide. Trans-membrane peptides are also highly hydrophobic in nature and serve to anchor the polypeptides within cell membrane. The choice of the trans-membrane and/or signal peptides which can be used in the context of the present invention is vast. They may be obtained from cellular or viral polypeptides such as those of immunoglobulins, tissue plasminogen activator, insulin, rabies glycoprotein, the HIV virus envelope glycoprotein or the measles virus F protein or may be synthetic. Preferably, the secretory sequence is inserted at the N-terminus of the polypeptide downstream of the codon for initiation of translation and the membrane-anchoring sequence at the C-terminus, preferably immediately upstream of the stop codon.

Recombinant Vector

In a preferred embodiment, the therapeutic vaccine comprises a recombinant vector engineered to express at least one nucleic acid molecule encoding a polypeptide of interest as described herein. It may be easily generated by a number of ways known to those skilled in the art (e.g. cloning, PCR amplification, DNA shuffling). For example, such a nucleic acid molecule can be isolated independently from any available source (e.g. biologic materials described in the art, cDNA and genomic libraries, viral genomes or any prior art vector known to include it) using sequence data available to the skilled person and the sequence information provided herein, and then suitably cloned by conventional molecular biology techniques. Alternatively, they can also be generated by chemical synthesis in automatized process (e.g. assembled from overlapping synthetic oligonucleotides or synthetic gene). Preferably, such a nucleic acid molecule of interest is obtained from cDNA and does not comprise intronic sequences. Modification(s) can be generated by a number of ways known to those skilled in the art, such as chemical synthesis, site-directed mutagenesis, PCR mutagenesis, etc.

In addition, the nucleic acid molecule for use in this invention can be optimized for providing high level expression in a particular host cell or subject. It has been indeed observed that, the codon usage patterns of organisms are highly non-random and the use of codons may be markedly different between different hosts. As the therapeutic gene might be from prokaryote (e.g. bacterial or viral antigen) or lower eukaryote (e.g. the suicide gene) origin, it may have an inappropriate codon usage pattern for efficient expression in higher eukaryotic cells (e.g. human). Typically, codon optimization is performed by replacing one or more "native" codon corresponding to a codon infrequently used by one or more codon encoding the same amino acid which is more frequently used in the subject to treat. It is not necessary to replace all native codons corresponding to infrequently used codons since increased expression can be achieved even with partial replacement.

Further to optimization of the codon usage, expression can also be improved through additional modifications of the nucleotide sequence. For example, the nucleic acid sequence can be modified so as to prevent clustering of rare, non-optimal codons being present in concentrated areas and/or to suppress or modify "negative" sequence elements which are expected to negatively influence expression levels. Such negative sequence elements include without limitation the regions having very high (>80%) or very low (<30%) GC content; AT-rich or GC-rich sequence stretches; unstable direct or inverted repeat sequences; R A secondary structures; and/or internal cryptic regulatory elements such as internal TATA-boxes, chi-sites, ribosome entry sites, and/or splicing donor/acceptor sites.

Moreover, when homologous nucleic acid molecules are to be expressed, such homologous sequences can be degenerated over the full length nucleic acid molecule or portion(s) thereof so as to reduce sequence homology. It is indeed advisable to degenerate the portions of nucleic acid sequences that show a high degree of sequence identity (e.g. the same antigen obtained from various serotypes of a given virus such as HPV-16 and HPV-18 E6 and/or E7 antigens; overlapping antigens such as HBV antigens) so as to avoid homologous recombination problems during production process and the skilled person is capable of identifying such portions by sequence alignment.

The nucleic acid molecule(s) encoding the polypeptide(s) of interest may be inserted in the vector, e.g. within a viral gene, an intergenic region, in a non-essential gene or region or in place of viral sequences. The general conditions for constructing and producing recombinant poxviruses are well known in the art (see for example WO2010/130753; WO03/008533; U.S. Pat. Nos. 6,998,252; 5,972,597 and 6,440, 422). The nucleic acid molecule(s) of interest is/are preferably inserted within the poxviral genome in a non-essential locus. Thymidine kinase gene is particularly appropriate for insertion in Copenhagen vaccinia vectors and deletion II or III for insertion in MVA vector (WO97/02355; Meyer et al., 1991, J. Gen. Virol. 72: 1031-8). The general conditions for constructing and producing recombinant measles viruses are well known in the art. Insertion of the nucleic acid molecule(s) of interest between P and M genes or between H and L genes is particularly appropriate. The general conditions for constructing and producing recombinant adenoviruses are well known in the art (see e.g. Chartier et al., 1996, J. Virol. 70: 4805-10 and WO96/17070). E1 or E3 region is the preferred site of insertion for the nucleic acid molecule(s) to be expressed which can be positioned in sense or antisense orientation relative to the natural transcriptional direction of the region in question.

In a particularly preferred embodiment, the therapeutic vaccine is selected from the group consisting of:
A MVA virus encoding the MUC-1 TAA and human IL-2 as represented by TG4010 described in WO92/07000, U.S. Pat. No. 5,861,381 and Limacher and Quoix (2012, OncoImmunology 1(5): 791-2);

A MVA virus encoding a fusion of NS3 and NS4 HCV antigens and NS5b antigen (as represented by TG4040 described in WO2004/111082);

A MVA virus encoding membrane anchored HPV-16 non-oncogenic E6 and E7 antigens and human IL-2 as represented by TG4001 described in WO99/03885;

A MVA virus encoding the FCU1 gene as represented by TG4023 (WO99/54481); and

A MVA virus encoding a combination of TB antigens (as described in WO2014/009438).

Expression of the Nucleic Acid Molecule(s) Encoding the Polypeptide(s) of Interest In accordance with the present invention, the nucleic acid molecule(s) expressed by the therapeutic vaccine for use in the invention is/are operably linked to suitable regulatory elements for expression in a desired host cell or subject.

As used herein, the term "regulatory elements" or "regulatory sequence" refers to any element that allows, contributes or modulates the expression of the nucleic acid molecule(s) in a given host cell or subject, including replication, duplication, transcription, splicing, translation, stability and/or transport of the nucleic acid(s) or its derivative (i.e. m RNA). As used herein, "operably linked" means that the elements being linked are arranged so that they function in concert for their intended purposes. For example, a promoter is operably linked to a nucleic acid molecule if the promoter effects transcription from the transcription initiation to the terminator of said nucleic acid molecule in a permissive host cell.

It will be appreciated by those skilled in the art that the choice of the regulatory sequences can depend on factors such as the nucleic acid molecule(s) itself, the vector from which it is expressed, the level of expression desired, etc. The promoter is of special importance. In the context of the invention, it can be constitutive directing expression of the nucleic acid molecule(s) in many types of cells or specific to certain types of cells or tissues or regulated in response to specific events or exogenous factors (e.g. by temperature, nutrient additive, hormone, etc) or according to the phase of a viral cycle (e.g. late or early). One may also use promoters that are repressed during the production step in response to specific events or exogenous factors, in order to optimize production of the therapeutic vaccine and circumvent potential toxicity of the expressed polypeptide(s).

Suitable constitutive promoters for expression in recombinant adenovirus and plasmid vectors include, but are not limited to, the cytomegalovirus (CMV) immediate early promoter (U.S. Pat. No. 5,168,062), the RSV promoter, the adenovirus major late promoter, the phosphoglycero kinase (PGK) promoter (Adra et al., 1987, Gene 60: 65-74), the thymidine kinase (TK) promoter of herpes simplex virus (HSV)-1 and the T7 polymerase promoter (WO98/10088). Vaccinia virus promoters are particularly adapted for expression in recombinant poxviruses. Representative examples include without limitation the vaccinia 7.5K, H5R, 11K7.5 (Erbs et al., 2008, Cancer Gene Ther. 15(1): 18-28), TK, pB2R, p28, p11 and K1L promoter, as well as synthetic promoters such as those described in Chakrabarti et al. (1997, Biotechniques 23: 1094-7; Hammond et al, 1997, J. Virol Methods 66: 135-8; and Kumar and Boyle, 1990, Virology 179: 151-8) as well as early/late chimeric promoters. Promoters suitable for measles viruses include without limitation any promoter directing expression of measles transcription units (Brandler and Tangy, 2008, CIMID 31: 271).

Those skilled in the art will appreciate that the regulatory elements controlling the expression of the nucleic acid molecule(s) of interest may further comprise additional elements for proper initiation, regulation and/or termination of transcription (e.g. polyA transcription termination sequences), mRNA transport (e.g. nuclear localization signal sequences), processing (e.g. splicing signals), and stability (e.g. introns and non-coding 5' and 3' sequences), translation (e.g. an initiator Met, tripartite leader sequences, IRES ribosome binding sites, signal peptides, etc.) and purification steps (e.g. a tag). In a preferred embodiment, the therapeutic vaccine for use in the invention comprises a MVA vector which contains inserted into its genome (preferably in deletion II) a nucleic acid molecule encoding a tumor-associated antigen such as MUC-1 (preferably under the transcriptional control of the early/late vaccinia pH5R promoter) and a nucleic acid molecule encoding an immunostimulatory polypeptide such as the human IL-2 (preferably under the transcriptional control of the early/late vaccinia p7.5 promoter). More preferably, the encoded MUC1 antigen comprises an amino acid sequence that is at least 90% identical to SEQ ID NO: 1. Even more preferably, the MUC1 antigen is encoded by a nucleotide sequence that is at least 80% identical to SEQ ID NO: 2.

Production of Virus-Based Therapeutic Vaccine

In a preferred embodiment, the therapeutic vaccine present in the combination product of the present invention is a viral vector. Typically, viral vectors are produced into a suitable host cell line using conventional techniques including a) preparing a producer (e.g. permissive) host cell, b) transfecting or infecting the prepared producer host cells, c) culturing the transfected or infected host cell under suitable conditions so as to allow the production of the vector (e.g. infectious viral particles), d) recovering the produced vector from the culture of said cell and optionally e) purifying said recovered vector.

As used herein, the term "host cell" should be understood broadly without any limitation concerning particular organization in tissue, organ, or isolated cells. Such cells may be of a unique type of cells or a group of different types of cells such as cultured cell lines, primary cells and dividing cells. In the context of the invention, the term "host cells" include prokaryotic cells, lower eukaryotic cells such as yeast, and other eukaryotic cells such as insect cells, plant and mammalian (e.g. human or non-human) cells as well as producer cells capable of producing the plasmid or virus-based therapeutic vaccine and/or the immune checkpoint modulator(s) for use in the invention. This term also includes cells which can be or has been the recipient of the combination product described herein as well as progeny of such cells.

In step a), suitable producer cells depend on the type of viral vector to be amplified. Replication-defective recombinant adenoviruses are typically propagated and produced in a cell that supplies in trans the adenoviral protein(s) encoded by those genes that have been deleted or inactivated in the replication-defective adenovirus, thus allowing the virus to replicate in the cell. Suitable cell lines for complementing E1-deleted adenoviruses include the HEK-293 cells (Graham et al., 1997, J. Gen. Virol. 36: 59-72) as well as the HER-96 and PER-C6 cells (e.g. Fallaux et al., 1998, Human Gene Ther. 9: 1909-1917; WO97/00326) and E1 A549 (Imler et al., 1996, Gene Ther. 3: 75-84) or any derivative of these cell lines. But any other cell line described in the art can also be used in the context of the present invention, especially cell lines approved for producing products for human use. The infectious adenoviral particles may be recovered from the culture supernatant and/or from the cells after lysis. They can be further purified according to standard techniques (ultracentrifugation in a cesium chloride gradient, chromatography, etc. as described for example in WO96/27677, WO98/00524, WO98/22588, WO98/26048, WO00/40702, EP1016711 and WO00/50573).

MVA is strictly host-restricted and is typically amplified on avian cells, either primary avian cells (such as chicken embryo fibroblasts (CEF) prepared from chicken embryos obtained from fertilized eggs) or immortalized avian cell lines, and in particular a *Cairina moschata* cell line immortalized with a duck TERT gene (see e.g. WO2010/130756 and WO2012/001075); avian cell line produced according to the process described in WO2007/077256 or WO2009/004016; avian cell line immortalized with a combination of viral and/or cellular genes (see e.g. WO2005/042728); a spontaneously immortalized cell (e.g. the chicken DF1 cell line disclosed in U.S. Pat. No. 5,879,924); or immortalized cells which derive from embryonic cells by progressive severance from growth factors and feeder layer (e.g. Ebx chicken cell lines disclosed in WO2005/007840 and WO2008/129058).

For other vaccinia virus or other poxvirus strains, in addition to avian primary cells (such as CEF) and avian cell lines, many other non-avian cell lines are available for production, including human cell lines such as HeLa (ATCC-CRM-CCL-2™ or ATCC-CCL-2.2™), MRC-5, HEK-293; hamster cell lines such as BHK-21 (ATCC CCL-10), and Vero cells. In a preferred embodiment, vaccinia virus other than MVA is amplified in Hela cells (see e.g. WO2010/130753).

Producer cells are preferably cultivated in a medium free from animal- or human-derived products, using a chemically defined medium with no product of animal or human origin. In particular, while growth factors may be present, they are preferably recombinantly produced and not purified from animal material. An appropriate animal-free medium may be easily selected by those skilled in the art depending on selected producer cells. Such media are commercially available. In particular, when CEFs are used as producer cells, they may be cultivated in VP-SFM cell culture medium (Invitrogen®). Producer cells are preferably cultivated at a temperature comprised between +30° C. and +38° C. (more preferably at about +37° C.) for between 1 and 8 days (preferably for 1 to 5 days for CEF and 2 to 7 days for immortalized cells) before infection. If needed, several passages of 1 to 8 days may be made in order to increase the total number of cells.

In step b), producer cells are infected by the viral vector under appropriate conditions (in particular using an appropriate multiplicity of infection (MOI) to permit productive infection of producer cells. In particular, when the therapeutic vaccine is based on MVA and is amplified using CEF, it may be seeded in the cell culture vessel containing CEFs at a MOI which is preferably comprised between 0.001 and 0.1 (more preferably about 0.05). Infection step is also preferably performed in a medium (which may be the same as or different from the medium used for culture of producer cells) free from animal- or human-derived products, using a chemically defined medium with no product of animal or human origin.

In step c), infected producer cells are then cultured under appropriate conditions well known to those skilled in the art until progeny viral vector (e.g. infectious virus particles) is produced. Culture of infected producer cells is also preferably performed in a medium (which may be the same as or different from the medium used for culture of producer cells and/or for infection step) free from animal- or human-derived products (using a chemically defined medium with no product of animal or human origin) at a temperature between +30° C. and +37° C., for 1 to 5 days.

In step d), the viral vector produced in step c) is collected from the culture supernatant and/or the producer cells. Recovery from producer cells (and optionally also from culture supernatant), may require a step allowing the disruption of the producer cell membrane to allow the liberation of the vector from producer cells. The disruption of the producer cell membrane can be induced by various techniques well known to those skilled in the art, including but not limited to: freeze/thaw, hypotonic lysis, sonication, microfluidization, or high speed homogenization.

Viral vectors may then be further purified, using purification steps well known in the art. Various purification steps can be envisaged, including clarification, enzymatic treatment (e.g. endonuclease, protease, etc), chromatographic and filtration steps. Appropriate methods are described in the art (e.g. WO2007/147528; WO2008/138533, WO2009/100521, WO2010/130753, WO2013/022764).

Immune Checkpoint Modulator(s)

Immune checkpoints and modulators thereof as well as methods of using such compounds are described in the literature. "Immune checkpoint" proteins are directly or indirectly involved in an immune pathway that under normal physiological conditions is crucial for preventing uncontrolled immune reactions and thus for the maintenance of self-tolerance and/or tissue protection. But under pathological conditions, they play a critical role in T cell exhaustion.

The one or more immune checkpoint modulator(s) in use herein may independently act at any step of the T cell-mediated immunity including clonal selection of antigen-specific cells, T cell activation, proliferation, trafficking to sites of antigen and inflammation, execution of direct effector function and signaling through cytokines and membrane ligands. Each of these steps is regulated by counterbalancing stimulatory and inhibitory signals that in fine tune the response. In the context of the present invention, the term encompasses (i) immune checkpoint modulator(s) capable of down-regulating at least partially the function of an inhibitory immune checkpoint (e.g. by direct binding or inhibition of a ligand binding to said targeted immune checkpoint) so as to exert an antagonist function and, thus antagonize an immune checkpoint-mediated inhibitory signal as well as (ii) immune checkpoint modulator(s) capable of up-regulating at least partially the function of a stimulatory immune checkpoint so as to exert an agonist function and, thus, amplify an immune checkpoint-mediated stimulatory signal.

The one or more immune checkpoint modulator(s) in use herein may independently be a polypeptide or a nucleic acid molecule; with a specific preference for peptide ligands, soluble domains of natural receptors, RNAi, antisense molecules, antibodies and protein scaffolds.

In a preferred embodiment, the immune checkpoint modulator is an antibody. In the context of the invention, "antibody" ("Ab") is used in the broadest sense and encompasses naturally occurring and engineered by man as well as full length antibodies or functional fragments or analogs thereof that are capable of binding the target immune checkpoint or epitope (thus retaining the target-binding portion). The antibody in use in the invention can be of any origin, e.g. human, humanized, animal (e.g. rodent or camelid antibody) or chimeric. It may be of any isotype (e.g. IgG1, IgG2, IgG3, IgG4, IgM, etc.). In addition, it may be glycosylated or non-glycosylated. The term antibody also includes bispecific or multispecific antibodies so long as they exhibit the binding specificity described herein.

For illustrative purposes, full length antibodies are glycoproteins comprising at least two heavy (H) chains and two light (L) chains inter-connected by disulfide bonds. Each heavy chain is comprised of a heavy chain variable region (VH) and a heavy chain constant region which is made of three CH1, CH2 and CH3 domains (optionally with a hinge between CH1 and CH2). Each light chain is comprised of a light chain variable region (VL) and a light chain constant region which comprises one CL domain. The VH and VL regions comprise hypervariable regions, named complementarity determining regions (CDR), and interspersed with more conserved regions named framework regions (FR). Each VH and VL is composed of three CDRs and four FRs in the following order: FR1-CDR1-FR2-CDR2-FR3-CDR3-FR4. The CDR regions of the heavy and light chains are determinant for the binding specificity.

As used herein, a "humanized antibody" refers to a non-human (e.g. murine, camel, rat, etc) antibody whose protein sequence has been modified to increase its similarity to a human antibody (i.e. produced naturally in humans). The process of humanization is well known in the art (see e.g. Pestra et al., 1997, Cancer Res. 57 (20): 4593-9; U.S. Pat. Nos. 5,225,539; 5,530,101; 6,180,370; WO2012/110360). For example, a monoclonal antibody developed for human use can be humanized by substituting one or more residue of the FR regions to look like human immunoglobulin sequence whereas the vast majority of the residues of the variable regions (especially the CDRs) are not modified and correspond to those of a non-human immunoglobulin. For general guidance, the number of these amino acid substitutions in the FR regions is typically no more than 20 in each variable region VH or VL.

As used herein, a "chimeric antibody" refers to an antibody comprising one or more element(s) of one species and one or more element(s) of another species, for example, a non-human antibody comprising at least a portion of a constant region (Fc) of a human immunoglobulin.

Antibody fragments can be engineered for use in the combination of the invention. Representative examples include without limitation Fab, Fab', F(ab')2, dAb, Fd, Fv, scFv, di-scFv, diabody and any other artificial antibody. More specifically:
(i) a Fab fragment is represented by a monovalent fragment consisting of the VL, VH, CL and CH1 domains;
(ii) a F(ab')2 fragment is represented by a bivalent fragment comprising two Fab fragments linked by at least one disulfide bridge at the hinge region;
a Fd fragment consists of the VH and CH1 domains; (iii)
(iv) a Fv fragment consists of the VL and VH domains of a single arm of an antibody,
(v) a dAb fragment consists of a single variable domain fragment (VH or VL domain);
(vi) a single chain Fv (scFv) comprises the two domains of a Fv fragment, VL and VH, that are fused together, optionally with a linker to make a single protein chain (see e.g. Bird et al., 1988, Science 242:423-6; Huston et al., 1988, Proc. Natl. Acad. Sci. USA 85:5879-83; U.S. Pat. Nos. 4,946,778; 5,258,498); and
(vii) any other artificial antibody.

Methods for preparing antibodies, fragments and analogs thereof are known in the art (see e.g. Harlow and Lane, 1988, Antibodies—A laboratory manual; Cold Spring Harbor Laboratory, Cold Spring Harbor NY). In one embodiment, such an antibody can be generated a host animal with the targeted immune checkpoint modulator. Alternatively, it can be produced from hybridomas (see e.g. Kohler and Milstein, 1975, Nature 256: 495-7; Cote et al., 1983, Proc. Natl. Acad. Sci. USA 80: 2026-30; Cole et al. in Monoclonal antibodies and Cancer Therapy; Alan Liss pp 77-96), recombinant techniques (e.g. using phage display methods), peptide synthesis and enzymatic cleavage. Antibody fragments can be produced by recombinant technique as described herein. They may also be produced by proteolytic cleavage with enzymes such as papain to produce Fab fragments or pepsin to produce F(ab')2 fragments as described in the literature (see e.g. Wahl et al., 1983, J. Nucl. Med. 24: 316-25). Analogs (or fragment thereof) can be generated by conventional molecular biology methods (PCR, mutagenesis techniques). If needed, such fragments and analogs may be screened for functionality in the same manner as intact antibodies (e.g. by standard ELISA assay).

In a preferred embodiment, at least one of the one or more immune checkpoint modulator(s) for use in the present invention is a monoclonal antibody, with a specific preference for a human (in which both the framework regions are derived from human germline immunoglobin sequences) or a humanized antibody according to well-known humanization process.

Desirably, the one or more immune checkpoint modulator(s) in use in the present invention antagonizes at least partially (e.g. more than 50%) the activity of inhibitory immune checkpoint(s), in particular those mediated by any of the following PD-1, PD-L1, PD-L2, LAG3, Tim3, BTLA, SLAM, 2B4, CD160, KLRG-1 and CTLA4, with a specific preference for a human or humanized monoclonal antibody that specifically binds to any of such target proteins. The term "specifically binds to" refers to the capacity to a binding specificity and affinity for a particular target or epitope even in the presence of a heterogeneous population of other proteins and biologics. Thus, under designated assay conditions, the antibody in use in the invention binds preferentially to its target and does not bind in a significant amount to other components present in a test sample or subject. Preferably, such an antibody shows high affinity binding to its target with an equilibrium dissociation constant equal or below $1\times10^{-6}$M (e.g. at least $0.5\times10^{-6}$, $1\times10^{-7}$, $1\times10^{-8}$, $1\times10^{-9}$, $1\times10^{-10}$, etc). Alternatively, the one or more immune checkpoint modulator(s) in use in the present invention exerts an agonist function in the sense that it is capable of stimulating or reinforcing stimulatory signals, in particular those mediated by CD28 with a specific preference for any of ICOS, CD137 (4-1BB), OX40, CD27, CD40 and GITR immune checkpoints. Standard assays to evaluate the binding ability of the antibodies toward immune checkpoints are known in the art, including for example, ELISAs, Western blots, RIAs and flow cytometry. The binding kinetics (e.g., binding affinity) of the antibodies also can be assessed by standard assays known in the art, such as by Biacore analysis.

In a preferred embodiment, at least one of the one or more checkpoint modulator(s) for use in this invention is an antibody capable of antagonizing at least partially the protein Programmed Death 1 (PD-1), and especially an antibody that specifically binds to human PD-1. PD-1 is part of the immunoglobulin (Ig) gene superfamily and a member of the CD28 family. It is a 55 kDa type 1 transmembrane protein expressed on antigen-experienced cells (e.g. activated B cells, T cells, and myeloid cells) (Agata et al., 1996, Int. Immunol. 8: 765-72; Okazaki et al., 2002, Curr. Opin. Immunol. 14: 391779-82; Bennett et al., 2003, J. Immunol 170: 711-8). In normal context, it acts by limiting the activity of T cells at the time of inflammatory response, thereby protecting normal tissues from destruction (Topalian, 2012, Curr. Opin. Immunol. 24: 207-12). Two ligands have been identified for PD-1, respectively PD-L1 (programmed death ligand 1) and PD-L2 (programmed death ligand 2) (Freeman et al., 2000, J. Exp. Med. 192: 1027-34; Carter et al., 2002, Eur. J. Immunol. 32: 634-43). PD-L1 was identified in 20-50% of human cancers (Dong et al., 2002, Nat. Med. 8: 787-9). The interaction between PD-1 and PD-L1 resulted in a decrease in tumor infiltrating lymphocytes, a decrease in T-cell receptor mediated proliferation, and immune evasion by the cancerous cells (Dong et al., 2003, J. Mol. Med. 81: 281-7; Blank et al., 2005, Cancer Immunol. Immunother. 54: 307-314). The complete nucleotide and amino acid PD-1 sequences can be found under GenBank® Accession No U64863 and NP_005009.2. A number of anti PD1 antibodies are available in the art (see e.g. those described in WO2004/004771; WO2004/056875; WO2006/121168; WO2008/156712; WO2009/014708; WO2009/114335; WO2013/043569; and WO2014/047350). Preferred anti PD-1 antibodies in the context of this invention are FDA approved or under advanced clinical development and one may use in particular an anti-PD-1 antibody selected from the group consisting of Nivolumab (also termed BMS-936558 under development by Bristol Myer Squibb), Lanbrolizumab (also termed MK-3475 under development by Merck), and Pidilizumab (also termed CT-011 under development by CureTech).

Another preferred example of immune checkpoint modulator is represented by a modulator capable of antagonizing at least partially the PD-1 ligand termed PD-L1, and especially an antibody that recognizes human PD-L1. A number of anti PD-L1 antibodies are available in the art (see e.g. those described in EP1907000). Preferred anti PD-L1 antibodies are FDA approved or under advanced clinical development (e.g. MPDL3280A under development by Genentech/Roche and BMS-936559 under development by Bristol Myer Squibb).

Still another preferred example of immune checkpoint modulator is represented by a modulator capable of antagonizing at least partially the CTLA-4 protein, and especially an antibody that recognizes human CTLA-4. CTLA4 (for cytotoxic T-lymphocyte-associated antigen 4) also known as CD152 was identified in 1987 (Brunet et al., 1987, Nature 328: 267-70) and is encoded by the CTLA4 gene (Dariavach et al., Eur. J. Immunol. 18: 1901-5). It is expressed on the surface of T cells where it primarily regulates the amplitude of the early stages of T cell activation. Recent work has suggested that CTLA-4 may function in vivo by capturing and removing B7-1 and B7-2 from the membranes of antigen-presenting cells, thus making these unavailable for triggering of CD28 (Qureshi et al., Science, 2011, 332: 600-3). The complete CTLA-4 nucleic acid sequence can be found under GenBank® Accession No LI 5006. A number of anti CTLA-4 antibodies are available in the art (see e.g. those described in U.S. Pat. No. 8,491,895). Preferred anti CTLA-4 antibodies in the context of this invention are FDA approved or under advanced clinical development. One may cite more particularly ipilimumab marketed by Bristol Myer Squibb as Yervoy (see e.g. U.S. Pat. Nos. 6,984,720; 8,017, 114), tremelimumab under development by Pfizer (see e.g. U.S. Pat. Nos. 7,109,003 and 8,143,379) and single chain anti-CTLA4 antibodies (see e.g. WO97/20574 and WO2007/123737).

Immune checkpoint modulator for antagonizing the TIM3 receptor may also be used in the combination product of the present invention (see e.g. Ngiow et al., 2011, Cancer Res. 71: 3540-51; US2012-0189617).

Another Immune checkpoint modulator for antagonizing the LAG3 receptor may also be used in the combination of the present invention (see e.g. Toni-Jun et al., 2011, 2014, ACCR poster LB266; Woo et al., 2012, Cancer Res. 72: 917-27).

Still another example of immune checkpoint modulator is represented by an OX40 agonist such as agonist ligand of OX40 (OX40L) (see e.g. U.S. Pat. Nos. 5,457,035, 7,622, 444; WO03/082919) or an antibody directed to the OX40 receptor (see e.g. U.S. Pat. No. 7,291,331 and WO03/106498).

Other examples of immune checkpoint modulators are represented by anti-KIR or anti-CD96 antibody targeting the inhibitory receptors harboured by CD8+ T cells and NK cells.

The present invention encompasses a combination comprising more than one immune checkpoint modulator(s). A preferred example includes without limitation using an anti-CTLA-4 antibody with an anti-PD-1 or an anti-PD-L1 antibody in combination with the therapeutic vaccine described herein.

Nucleic acid molecules encoding the relevant portion(s) of the desired immune checkpoint modulator can be obtained by standard molecular biology techniques using sequence data accessible in the art and the information provided herein. For example, cDNAs encoding the light and heavy chains of the antibody or their CDRs can be isolated from the producing hybridoma, immunoglobulin gene libraries or any available source.

In one embodiment, the one or more immune checkpoint modulator(s) for use in this invention can be comprised in the therapeutic vaccine described herein. For example, the encoding nucleic acid molecule can be inserted in a vector-based therapeutic vaccine (e.g. in an antigen-encoding viral vector). In this context, the nucleic acid molecules encoding the polypeptide(s) of interest and the immune checkpoint modulator(s) are preferably expressed independently using distinct regulatory elements. Alternatively, the one or more immune checkpoint modulator(s) for use in this invention can be expressed from an independent vector system such as one of those described herein in connection with the therapeutic vaccine for separate or concomitant administration to the subject in need thereof.

Still alternatively, the one or more immune checkpoint modulator(s) for use in this invention can be produced by recombinant means using suitable expression vectors and host cells for administration as recombinant polypeptide to the subject in need thereof.

Production of Immune Checkpoint Modulator

Insertion into the expression vector can be performed by routine molecular biology, e.g. as described in Sambrook et al. (2001, Molecular Cloning-A Laboratory Manual, Cold Spring Harbor Laboratory). Insertion into a virus-based therapeutic vaccine can be performed through homologous recombination as described in Chartier et al. (1996, J. Virol. 70: 4805-10) and Paul et al. (2002, Cancer Gene Ther. 9: 470-7).

A variety of host-vector systems may be used or constructed to express the one or more immune checkpoint modulator(s) for use in the present invention, including prokaryotic organisms such as bacteria (e.g. *E. coli* or *Bacillus subtilis*); yeast (e.g. *Saccharomyces cerevisiae, Saccharomyces pombe, Pichia pastoris*); insect cell systems (e.g. Sf 9 cells and baculovirus); plant cell systems (e.g. cauliflower mosaic virus CaMV; tobacco mosaic virus TMV) and mammalian cell systems (e.g. cultured cells). Typically, such vectors are commercially available (e.g. in Invitrogen®, Stratagene, Amersham Biosciences, Promega, etc.) or available from depositary institutions such as the American Type Culture Collection (ATCC, Rockville, Md.) or have been the subject of numerous publications describing their sequence, organization and methods of producing, allowing the artisan to apply them. For general purposes, such vectors usually comprise one or more element(s) enabling maintenance, propagation or expression of the nucleic acid molecule in the host cell. Representative elements include without limitation marker gene(s) in order to facilitate identification and isolation of the recombinant host cells (e.g. by complementation of a cell auxotrophy or by antibiotic resistance), stabilizing elements (e.g. DAP system as described in U.S. Pat. No. 5,198,343), and integrative elements (e.g. LTR viral sequences and transposons).

Suitable plasmid vectors for use in prokaryotic systems include without limitation pBR322 (Gibco BRL), pUC (Gibco BRL), pbluescript (Stratagene), p Poly (Lathe et al., 1987, Gene 57: 193-201), pTrc (Amann et al., 1988, Gene 69: 301-15); pET lid (Studier et al., 1990, Gene Expression Technology: Methods in Enzymology 185: 60-89); pIN (Inouye et al., 1985, Nucleic Acids Res. 13: 3101-9; Van Heeke et al., 1989, J. Biol. Chem. 264: 5503-9); and pGEX vectors where the nucleic acid molecule can be expressed in fusion with glutathione S-transferase (GST) (Amersham Biosciences Product). Suitable vectors for expression in yeast (e.g. *S. cerevisiae*) include, but are not limited to pYepSec1 (Baldari et al., 1987, EMBO J. 6: 229-34), pMFa (Kujan et al., 1982, Cell 30: 933-43), pJRY88 (Schultz et al., 1987, Gene 54: 113-23), pYES2 (Invitrogen Corporation) and pTEF-MF (Dualsystems Biotech Product). Plasmid and viral vectors such as those described herein in connection with the therapeutic vaccine may also be used to produce the immune checkpoint modulator(s) by recombinant means.

Recombinant DNA technologies can also be used to improve expression of the nucleic acid molecule encoding the immune checkpoint modulator in the host cell, e.g. by using high-copy number vectors, substituting or modifying one or more transcriptional regulatory sequences (e.g. promoter, enhancer and the like), optimizing the codon usage and suppressing negative sequences that may destabilize the transcript as described herein in connection with the nucleic acid molecule(s) encoding the polypeptide(s) of interest).

As before, the nucleic acid molecule encoding the immune checkpoint modulator is in a form suitable for its expression in a host cell, which means that the nucleic acid molecule is placed under the control of one or more regulatory sequences, appropriate to the vector, the host cell and/or the level of expression desired as described above. Constitutive promoters (e.g. PGK, CMV promoters, etc), inducible eukaryotic promoters regulated by exogenously supplied compounds (e.g. TRP and IPTG-inducible pTAC promoters, zinc-inducible metallothionein (MT) promoter, dexamethasone (Dex)-inducible mouse mammary tumor virus (MMTV) promoter, tetracycline-repressible and rapamycin-inducible promoter, etc) can be used as well as any of the promoters described hereinafter for expression of nucleic acid molecule encoding the polypeptide of interest.

The methods for the recombinant production of the immune checkpoint modulator are conventional in the art. Typically such methods comprise (a) introducing the expression vector described herein into a suitable producer cell to produce a transfected or infected producer cell, (b) culturing in-vitro said transfected or infected producer cell under conditions suitable for its growth, (c) recovering the immune checkpoint modulator from the cell culture, and (d) optionally, purifying the recovered immune checkpoint modulator.

In the context of the invention, producer cells include prokaryotic cells, lower eukaryotic cells such as yeast, and other eukaryotic cells such as insect cells, plant and mammalian (e.g. human or non-human) cells. Preferred *E. coli* cells include without limitation *E. coli* BL21 (Amersham Biosciences). Preferred yeast producer cells include without limitation *S. cerevisiae, S. pombe, Pichia pastoris*. Preferred mammalian producer cells include without limitation BHK-21 (baby hamster kidney), CV-1 (African monkey kidney cell line), COS (e.g. COS-7) cells, Chinese hamster ovary (CHO) cells, mouse NIH/3T3 cells, Hela cells, Vero cells, HEK293 cells and PERC.6 cells as well as the corresponding hybridoma cells.

Transfection/infection of producer host cells is conventional and may use additional compounds so as to improve the transfection efficiency and/or stability of the vector. These compounds are widely documented in the literature such as polycationic polymers (e.g. chitosan, polymethacrylate, PEI, etc), cationic lipids (e.g. DC-Chol/DOPE, transfectam lipofectin now available from Promega) and liposomes.

The producer cells can be cultured in conventional fermentation bioreactors, flasks, and petri plates. Culturing can be carried out at a temperature, pH and oxygen content appropriate for a given host cell. No attempts to describe in detail the various methods known for the production of proteins in prokaryote and eukaryote cells will be made here. Production of the immune checkpoint modulator can be periplasmic, intracellular or preferably secreted outside the producer cell (e.g. in the culture medium). If necessary, especially when the immune checkpoint modulator is not secreted outside the producer cell or where it is not secreted completely, it can be recovered by standard lysis procedures, including freeze thaw, sonication, mechanical disruption, use of lysing agents and the like. If secreted, it can be recovered directly from the culture medium.

Optionally, the immune checkpoint modulator can then be purified by well-known purification methods including ammonium sulfate precipitation, acid extraction, gel electrophoresis, filtration and chromatographic methods (e.g. reverse phase, size exclusion, ion exchange, affinity, phosphocellulose, hydrophobic-interaction or hydroxylapatite chromatography, etc). The conditions and technology used to purify a particular protein will depend on factors such as net charge, molecular weight, hydrophobicity, hydrophilicity and will be apparent to those having skill in the art. Moreover, the level of purification will depend on the intended use. It is also understood that depending upon the producer cell, the immune checkpoint modulator proteins can have various glycosylation patterns, or may be non-glycosylated (e.g. when produced in bacteria) as described herein.

Desirably, the immune checkpoint modulator in use in the present invention is at least partially purified in the sense that it is substantially free of other antibodies having different antigenic specificities and/or other cellular material. Further, the immune checkpoint modulator may be formulated according to the conditions conventionally used in the art (e.g. WO2009/073569).

In accordance with the present invention, a variety of modifications can be introduced in the immune checkpoint inhibitor so as to increase its biological half-life, its affinity, its stability and/or its production. For example, a signal peptide may be included for facilitating secretion of the immune checkpoint modulator in a cell culture as described herein. As an additional example, a tag peptide (typically a short peptide sequence able to be recognized by available antisera or compounds) may also be added for facilitating purification of the recombinant immune checkpoint modulator. A vast variety of tag peptides can be used in the context of the invention including, without limitation, PK tag, FLAG octapeptide, MYC tag, HIS tag (usually a stretch of 4 to 10 histidine residues) and e-tag (U.S. Pat. No. 6,686,152). The tag peptide(s) may be independently positioned at the N-terminus of the protein or alternatively at its C-terminus or alternatively internally or at any of these positions when several tags are employed. Tag peptides can be detected by immunodetection assays using anti-tag antibodies.

Another approach that may be pursued in the context of the present invention is coupling of the immune checkpoint modulator to an external agent such as a radiosensitizer agent, a cytotoxic agent and/or a labelling agent. The coupling can be covalent or not. As used herein, the term "radiosensitizer" refers to a molecule that makes cells more sensitive to radiation therapy. Radiosensitizer includes, but are not limited metronidazole, misonidazole, desmethylmisonidazole, pimonidazole, etanidazole, nimorazole, mitomycin C, RSU 1069, SR 4233, E09, RB 6145, nicotinamide, 5-bromodeoxyuridine (BUdR), 5-iododeoxyuhdine (IUdR), bromodeoxycytidine, fluorodeoxyuridine (FUdR), hydroxyurea and cisplatin. As used herein, the term "cytotoxic agent" refers to a compound that is directly toxic to cells, preventing their reproduction or growth such as toxins (e. g. an enzymatically active toxin of bacterial, fungal, plant or animal origin, or fragments thereof). As used herein, "a labeling agent" refers to a detectable compound. The labeling agent may be detectable by itself (e. g., radioactive isotope labels or fluorescent labels) or, in the case of an enzymatic label, may catalyze chemical modification of a substrate compound which is detectable.

Another modification is pegylation for example to increase the biological half-life of the antibody. Methods for pegylating proteins are known in the art (see e.g. EP154316; EP401384; WO98/15293, WO01/23001, etc).

Combination Product and Therapy

The term "combination therapy" and any variation such as "combined use" refers to the action of administering in the same subject at least the two entities being an object of the invention and described herein.

In one embodiment, the present invention relates to a combination product in the form of a composition comprising a therapeutically effective amount of at least the therapeutic vaccine and one or more immune checkpoint modulator entities described herein and a pharmaceutically acceptable vehicle. In another embodiment, the present invention relates to distinct compositions for combined use, one comprising at least a therapeutically effective amount of the therapeutic vaccine and a pharmaceutically acceptable vehicle and another comprising a therapeutically effective amount of the one or more immune checkpoint modulator and a pharmaceutically acceptable vehicle. One may proceed with one or more administration(s) of each entity (or composition(s) thereof) which can be concomitant, sequential or interspersed via the same or different routes.

A "therapeutically effective amount" corresponds to the amount of each of the active entities (therapeutic vaccine and the one or more immune check point modulator(s)) comprised in the combination or composition(s) of the invention that is sufficient for producing one or more beneficial results. Such a therapeutically effective amount may vary as a function of various parameters such as the mode of administration; the age and weight of the subject; the nature and extent of symptoms; the ability of the subject to respond to the treatment, kind of concurrent treatment; the frequency of treatment and/or the need for prevention or therapy, etc.

When "prophylactic" use is concerned, the combination is administered at a dose sufficient to prevent or to delay the onset and/or establishment and/or relapse of a pathologic condition, especially in a subject at risk. For "therapeutic" use, the therapeutic vaccine and the immune checkpoint modulator(s) are both administered to a subject diagnosed as having a disease or pathological condition with the goal of treating it, optionally in association with one or more conventional therapeutic modalities.

The term "pharmaceutically acceptable vehicle" is intended to include any and all carriers, solvents, diluents, excipients, adjuvants, dispersion media, coatings, antibacterial and antifungal agents, absorption agents and the like compatible with administration in mammals and in particular human subjects.

Each of the therapeutic vaccine and the one or more immune check point modulator(s) or composition(s) thereof can independently be placed in a solvent or diluent appropriate for human or animal use. In particular, each or both may be formulated so as to ensure its stability in particular under the conditions of manufacture and long-term storage (i.e. for at least 6 months, with a preference for at least two years) at freezing (e.g. −70° C., −20° C.), refrigerated (e.g. 4° C.) or ambient (e.g. 20-25° C.) temperature. Such formulations generally include a liquid carrier such as aqueous solutions. Physiological saline solution, Ringer's solution, Hank's solution, saccharide solution (e.g. glucose, trehalose, saccharose, dextrose, etc) and other aqueous physiologically balanced salt solutions may be used (see for example the most current edition of Remington: The Science and Practice of Pharmacy, A. Gennaro, Lippincott, Williams&Wilkins). Animal or vegetable oils, mineral or synthetic oils are also suitable. Advantageously, the formulation appropriate for the therapeutic vaccine and the one or more immune check point modulator(s) or composition(s) thereof is suitably buffered for human use, preferably at physiological or slightly basic pH (e.g. from approximately pH 7 to approximately pH 9 with a specific preference for a pH comprised between 7 and 8 and more particularly close to 7.5). Suitable buffers include without limitation TRIS (tris(hydroxymethyl)methylamine), TRIS-HCl (tris(hydroxymethyl)methylamine-HCl), HEPES (4-2-hydroxyethyl-1-piperazineethanesulfonic acid), phosphate buffer (e.g. PBS), ACES (N-(2-Acetamido)-aminoethanesulfonic acid), PIPES (Piperazine-N,N'-bis(2-ethanesulfonic acid)), MOPSO (3-(N-Morpholino)-2-hydroxypropanesulfonic acid), MOPS (3-(N-morpholino) propanesulfonic acid), TES (2-{[tris(hydroxymethyl)methyl]amino}ethanesulfonic acid), DIPSO (3-[bis(2-hydroxyethyl)amino]-2-hydroxypropane-1-sulfonic acid), MOBS (4-(N-morpholino) butanesulfonic acid), TAPSO (3-[N-Tris(hydroxymethyl) methylamino]-2-hydroxypropanesulfonic Acid), HEPPSO (4-(2-Hydroxyethyl)-piperazine-1-(2-hydroxy)-propane-sulfonic acid), POPSO (2-hydroxy-3-[4-(2-hydroxy-3-sulfopropyl) piperazin-1-yl]propane-1-sulfonic acid), TEA (triethanolamine), EPPS (N-(2-Hydroxyethyl)-piperazine-N'-3-propanesulfonic acid), and TRICINE (N-[Tris(hydroxymethyl)-methyl]-glycine). Preferably, said buffer is selected from TRIS-HCl, TRIS, Tricine, HEPES and phosphate buffer comprising a mixture of $Na_2HPO_4$ and $KH_2PO_4$ or a mixture of $Na_2HPO_4$ and $NaH_2PO_4$. Said buffer (in particular those mentioned above and notably TRIS-HCl) is preferably present in a concentration of 10 to 50 mM. It might be beneficial to also include in such formulations a monovalent salt so as to ensure an appropriate osmotic pressure. Said monovalent salt may notably be selected from NaCl and KCl, preferably said monovalent salt is NaCl, preferably in a concentration of 10 to 500 mM.

The formulation appropriate for use in the context of the present invention, and especially liquid or frozen formulation, may also include a cryoprotectant so as to protect the therapeutic vaccine and/or the one or more immune check point modulator(s) (in particular virus-based composition) at low storage temperature, such as at about +5° C. and lower. Suitable cryoprotectants include without limitation sucrose (or saccharose), trehalose, maltose, lactose, mannitol, sorbitol and glycerol, preferably in a concentration of 0.5 to 20% (weight in g/volume in L, referred to as w/v). For example, sucrose is preferably present in a concentration of 5 to 15% (w/v), with a specific preference for about 10%.

The formulation appropriate for use in the present invention and especially liquid formulation may further comprise a pharmaceutically acceptable chelating agent, and in particular an agent chelating dications for improving stability. The pharmaceutically acceptable chelating agent may notably be selected from ethylenediaminetetraacetic acid (EDTA), 1,2-bis(o-aminophenoxy)ethane-N,N,N',N'-tetraacetic acid (BAPTA), ethylene glycol tetraacetic acid (EGTA), dimercaptosuccinic acid (DMSA), diethylene triamine pentaacetic acid (DTPA), and 2,3-Dimercapto-1-propanesulfonic acid (DMPS). The pharmaceutically acceptable chelating agent is preferably present in a concentration of at least 50 µM with a specific preference for a concentration of 50 to 1000 µM. Preferably, said pharmaceutically acceptable chelating agent is EDTA present in a concentration close to 150 µM.

Additional compounds may further be present to increase stability of the formulated therapeutic vaccine and/or immune check point modulator(s) or composition(s) thereof. Such additional compounds include, without limitation, $C_2$-$C_3$ alcohol (desirably in a concentration of 0.05 to 5% (volume/volume or v/v)), sodium glutamate (desirably in a concentration lower than 10 mM), non-ionic surfactant (Evans et al. 2004, J Pharm Sci. 93:2458-75, Shi et al., 2005, J Pharm Sci. 94:1538-51, U.S. Pat. No. 7,456,009, US2007/0161085) such as Tween 80 (also known as polysorbate 80) at low concentration below 0.1%. Divalent salts such as $MgCl_2$ or $CaCl_2$) have been found to induce stabilization of various biological products in the liquid state (see Evans et al. 2004, J Pharm Sci. 93:2458-75 and U.S. Pat. No. 7,456,009). Amino acids, and in particular histidine, arginine or methionine, have been found to induce stabilization of various viruses in the liquid state (see Evans et al., 2004, J Pharm Sci. 93:2458-75, U.S. Pat. No. 7,456,009, US2007/0161085, U.S. Pat. No. 7,914,979, WO2014/029702 and WO2014/053571).

The presence of high molecular weight polymers such as dextran or polyvinylpyrrolidone (PVP) is particularly suited for freeze-dried formulations. Lyophilized formulations are generally obtained by a process involving vacuum drying and freeze-drying (see e.g. WO03/053463; WO2006/0850082; WO2007/056847; WO2008/114021) and the presence of these polymers assists in the formation of the cake during freeze-drying (see EP1418942 and WO2014/053571).

Various formulations available in the art either in frozen, liquid or freeze-dried form can be independently used to preserve the therapeutic vaccine and/or immune check point modulator(s) or composition(s) thereof (e.g. WO98/02522, WO00/29024, WO00/34444, WO01/66137, WO03/053463, WO2006/0850082, WO2007/056847 and WO2008/114021, etc). For illustrative purposes, sterile histidine, acetate citrate or phosphate buffers saline containing surfactant such as polysorbate 80 and protectants such as sucrose or mannitol are adapted to the preservation of recombinant antibodies and buffered formulations including NaCl and/or sugar are particularly adapted to the preservation of vectorised therapeutic vaccine (e.g. Tris-HCl 10 mM pH 8 with saccharose 5% (w/v), Sodium glutamate 10 mM, and NaCl 50 mM or phosphate-buffered saline with glycerol (10%) and NaCl).

Formulation can be adapted according to the mode of administration to ensure proper distribution or delayed release in vivo. Biodegradable, biocompatible polymers can be used, such as ethylene vinyl acetate, polyanhydrides, polyglycolic acid, collagen, polyorthoesters, polylactic acid and polyethylene glycol. Many methods for the preparation of such formulations are described in the art (e.g. J. R. Robinson in "Sustained and Controlled Release Drug Delivery Systems", ed., Marcel Dekker, Inc., New York, 1978; WO01/23001; WO2006/93924; WO2009/53937). Gastroresistant capsules and granules are particularly appropriate for oral administration, suppositories for rectal or vaginal administration, optionally in combination with absorption enhancers useful to increase the pore size of the mucosal membranes. Such absorption enhancers are typically substances having structural similarities to the phospholipid domains of the mucosal membranes (such as sodium deoxycholate, sodium glycocholate, dimethyl-beta-cyclodextrin, lauryl-1-lysophosphatidylcholine).

Each of the therapeutic vaccine and/or the immune check point modulator(s) or composition(s) thereof may also contain pharmaceutically acceptable excipients for providing desirable pharmaceutical or pharmacodynamic properties, including for example osmolarity, viscosity, clarity, colour, sterility, stability, dissolution, release or absorption into the subject, or delivery to a particular organ.

The appropriate dosage of the therapeutic vaccine and the immune checkpoint modulator(s) as well as the optimal ratios of each entity may be determined by techniques well known in the art. Further refinement of the calculations necessary to adapt the appropriate dosage for a subject or a group of subjects may be routinely made by a practitioner, in the light of the relevant circumstances.

Suitable dosage of the immune checkpoint modulator(s) varies from about 0.01 mg/kg to about 50 mg/kg, advantageously from about 0.1 mg/kg to about 30 mg/kg, desirably from about 0.5 mg/kg to about 25 mg/kg, preferably from about 1 mg/kg to about 20 mg/kg, more preferably from about 2 mg/kg to about 15 mg/kg, with a specific preference for doses from about 3 mg/kg to about 10 mg/kg when used by parenteral injection. However, doses may be adapted to the administration route and the subject to be treated by a factor of variation comprised between 1.5 and 100. In some embodiments, two or more monoclonal antibodies with different binding specificities are administered simultaneously, in which case the dosage of each antibody administered falls within the ranges indicated.

Suitable dosage for a virus-based therapeutic vaccine varies from approximately $10^5$ to approximately $10^{13}$ vp (viral particles), iu (infectious unit) or pfu (plaque-forming units) depending on the quantitative technique used. As a general guidance, adenovirus doses from approximately $10^6$ to approximately $5 \times 10^{12}$ vp are suitable, preferably from approximately $10^7$ vp to approximately $10^{12}$ vp, more preferably from approximately $10^8$ vp to approximately $5 \times 10^{11}$ vp; doses of approximately $5 \times 10^8$ vp to approximately $10^{11}$ vp being particularly preferred especially for human use. Individual doses which are suitable for MVA-based therapeutic vaccine comprise from approximately $10^4$ to approximately $10^{12}$ pfu, preferably from approximately $10^5$ pfu to approximately $10^{11}$ pfu, more preferably from approximately $10^6$ pfu to approximately $10^{10}$ pfu; doses of approximately $10^7$ pfu to approximately $10^9$ pfu being particularly preferred especially for human use. Individual doses which are suitable for Vaccinia-based therapeutic vaccine comprise from approximately $10^5$ to approximately $10^{13}$ pfu, preferably from approximately $10^6$ pfu to approximately $10^{11}$ pfu, more preferably from approximately $10^7$ pfu to approximately $10^{10}$ pfu; doses of approximately $10^8$ pfu to approximately $5\times10^9$ vp being particularly preferred especially for human use. The quantity of virus present in a sample can be determined by routine titration techniques, e.g. by counting the number of plaques following infection of permissive cells (e.g. 293 or PER6C6 for Ad, BHK-21 or CEF for MVA, Hela for VV), by measuring the A260 absorbance (vp titers), or still by quantitative immunofluorescence, e.g. using antivirus antibodies (iu titers). Suitable dosage for a plasmid-based therapeutic vaccine varies from 10 µg to 20 mg, advantageously from 100 µg to 10 mg and preferably from approximately 0.5 mg to approximately 5 mg.

Administration

The combination product of the invention is suitable for single administration or a series of administrations. In particular when distinct compositions are contemplated, the therapeutic vaccine and the immune check point modulator(s) may be administered together or separately to the subject and in a single dose or multiple doses. Administrations may be concomitant (e.g. mixed in the same composition or in different compositions administered at approximately the same time), sequential (therapeutic vaccine followed by immune checkpoint modulator or vice versa) or interspersed (intermixed administrations at various intervals) and performed by the same or different routes at the same site or at alternative sites.

Any of the conventional administration routes is applicable in the context of the invention including parenteral, topical or mucosal routes, for the combination product or composition(s) of the invention. Parenteral routes are intended for administration as an injection or infusion and encompass systemic as well as local routes. Parenteral injection types that may be used to administer the combination product of the invention are intravenous (into a vein, such as the portal vein feeding liver), intravascular (into a blood vessel), intra-arterial (into an artery such as hepatic artery), intradermal (into the dermis), subcutaneous (under the skin), intramuscular (into muscle), intraperitoneal (into the peritoneum) and intratumoral (into a tumor or its close vicinity) or still by scarification. Infusions typically are given by intravenous route. Mucosal administrations include without limitation oral/alimentary, intranasal, intratracheal, intrapulmonary, intravaginal or intra-rectal route. Topical administration can also be performed using transdermal means (e.g. patch and the like). Preferred routes of administration for the immune checkpoint modulator(s) include intravenous (e.g. intravenous injection or infusion), and intratumoral. Preferred routes of administration for the therapeutic vaccine include intravenous, intramuscular, subcutaneous and intratumoral. For example, intratumoral inoculations of the therapeutic vaccine could be advantageously combined with intravenous injections of the immune checkpoint modulator(s).

Administrations may use conventional syringes and needles (e.g. Quadrafuse injection needles) or any compound or device available in the art capable of facilitating or improving delivery of the active agent(s) in the subject (e.g. electroporation for facilitating intramuscular administration). An alternative is the use of a needleless injection device to administer at least one of the active entities comprised in the combination product of the invention (e.g. Biojector™ device). Transdermal patches may also be envisaged.

In one embodiment, the therapeutic vaccine and the one or more immune checkpoint modulator(s) or composition(s) thereof are administered sequentially, such as the vaccines being administered first and the immune checkpoint modulator(s) second, or vise-versa (immune checkpoint modulator(s) being administered first and the therapeutic vaccine second). The sequence may vary. For example, the order of the administrations can be reversed or kept in the same order at each time point of administration.

One may also proceed by interspersed administrations of the therapeutic vaccine and the immune checkpoint modulator(s). The period of time between the first administration of the therapeutic vaccine and the first administration of the immune check point modulator(s) may vary from approximately several minutes to several week(s). It is also possible to proceed for each entity via sequential cycles of administrations that are repeated after a rest period. Intervals between each administration can be from one hour to one year (e.g. 24 h, 48 h, 72h, weekly, every two weeks, monthly or yearly). Intervals can also be irregular (e.g. following the measurement of monoclonal antibodies in the patient blood levels). The doses can vary for each administration within the range described above. Preferably, the time interval between each therapeutic vaccine administration can vary from approximately 1 day to approximately 8 weeks, advantageously from approximately 2 days to approximately 6 weeks, preferably from approximately 3 days to approximately 4 weeks and even more preferably from approximately 1 week to approximately 3 weeks with a specific preference for about one week. In combination, the time interval between each administration of immune check point modulator(s) can vary from approximately 2 days to approximately 8 weeks, advantageously from approximately 1 week to approximately 6 weeks, preferably every 3 weeks.

A preferred therapeutic scheme involves from 4 to 15 (4, 5, 6, 7, 8, 9, 10, 11, 12, 13, 14 or 15) administrations of $10^7$ to $10^9$ pfu of a MVA-based therapeutic vaccine at approximately 1 to 3 week intervals interspersed with 2 to 6 administrations of 3 to 10 mg/kg of anti-immune checkpoint antibody(ies)(s) every 2 or 3 weeks. For illustrative purposes, a preferred administration schedule comprises subcutaneous administrations of a MUC1-expressing MVA vector (such as TG4010) at a dose of approximately $10^8$ pfu weekly for 6 weeks and then every three weeks interspersed with intravenous administrations of an anti-CTLA4 antibody such as ipilimumab at a dose of approximately 3 mg/kg every 3 weeks for a total of four doses.

The combination product or composition of the invention is for use for treating or preventing diseases or pathologic condition, especially those caused by a pathogenic organism or an unwanted cell division according to the modalities described herein. A "disease" (and any form of disease such as "disorder" or "pathological condition") is typically characterized by identifiable symptoms. Exemplary diseases include, but are not limited to, infectious diseases that result from an infection with a pathogenic organism (e.g. bacteria, parasite, virus, fungus, etc) and proliferative diseases involving abnormal proliferation of cells such as neoplastic diseases (e.g. cancer), rheumatoid arthritis and restenosis.

The present invention also relates to a method of treatment comprising administering a combination product or composition(s) of therapeutic vaccine and/or one or more immune checkpoint modulator(s) in an amount sufficient to treat or prevent a disease or a pathologic condition in a subject in need thereof or alleviate one or more symptoms related to or associated with the diseases and pathologic condition, according to the modalities described herein. In a preferred embodiment, the disease or pathologic condition to be treated is a proliferative or an infectious disease (e.g. especially a chronic infection). Accordingly, the present invention also relates to a method for inhibiting tumor cell growth comprising administering a combination product or composition(s) of therapeutic vaccine and/or one or more immune checkpoint modulator(s) to a subject in need thereof. In the context of the invention, the methods and use according to the invention aim at slowing down, curing, ameliorating or controlling the occurrence or the progression of the targeted disease.

As used herein, the term "cancer" includes, but is not limited to, solid tumors and blood borne tumors. The term "cancer" encompasses both primary and metastatic cancers. Representative examples of cancers that may be treated using the combination and methods of the invention include, without limitation, carcinoma, lymphoma, blastoma, sarcoma, and leukemia and more particularly bone cancer, gastrointestinal cancer, liver cancer, pancreatic cancer, gastric cancer, colorectal cancer, esophageal cancer, oro-pharyngeal cancer, laryngeal cancer, salivary gland carcinoma, thyroid cancer, lung cancer, cancer of the head or neck, skin cancer, squamous cell cancer, melanoma, uterine cancer, cervical cancer, endometrial carcinoma, vulvar cancer, ovarian cancer, breast cancer, prostate cancer, cancer of the endocrine system, sarcoma of soft tissue, bladder cancer, kidney cancer, glioblastoma and various types of the central nervous system (CNS), etc. The present invention is particularly useful for treatment of cancers that express PD-L1 (Iwai et al., 2005, Int. Immunol. 17: 133-44), especially metastatic ones and those that overexpress MUC1 (especially hypoglycosylated form thereof) such as renal cancer (e.g. clear cell carcinoma), prostate cancer (e.g. hormone refractory prostate adenocarcinoma), breast cancer (e.g. metastatic breast cancer), colorectal cancer, lung cancer (e.g. non-small cell lung cancer) liver cancer (e.g. hepatocarcinoma), gastric cancer, bile duct carcinoma, endometrial cancer, pancreatic cancer and ovarian cancer. Preferably said cancer is non-small cell lung cancer (NSCL).

Representative examples of infectious diseases that may be treated using the combination and methods of the invention include, without limitation, a) viral diseases such as those resulting from infection by an herpes virus (HSV1, HSV2, or VZV), a papillomavirus (HPV), a poxvirus causing variola or chicken pox, an enterovirus, a retrovirus such as HIV causing AIDS, a cytomegalovirus, a flavivirus (e.g. causing Japanese encephalitis, hepatitis C, dengue and yellow fever), an Hepadnavirus (e.g. HBV), an orthomyxovirus (e.g. influenza virus), a paramyxovirus (e.g. parainfluenzavirus, mumps virus, measles virus and respiratory syncytial virus (RSV)), a coronavirus (e.g. SARS), rhabdovirus and rotavirus; b) diseases resulting from infection by bacteria, for example, *Escherichia, Enterobacter, Salmonella, Staphylococcus, Shigella, Listeria, Aerobacter, Helicobacter, Klebsiella, Proteus, Pseudomonas, Streptococcus, Chlamydia, Mycoplasma, Pneumococcus, Neisseria, Clostridium, Bacillus, Corynebacterium, Mycobacterium, Campylobacter, Vibrio, Serratia, Providencia, Chromobacterium, Brucella, Yersinia, Haemophilus,* or *Bordetella*; and (c) fungal diseases including but not limited to candidiasis, aspergillosis, histoplasmosis, cryptococcal meningitis; and d) parasitic diseases including but not limited to malaria, *Pneumocystis* carnii pneumonia, leishmaniasis, cryptosporidiosis, toxoplasmosis, and trypanosome infection.

Typically, upon administration according to the modalities described herein, the combination product of the invention provides a therapeutic benefit to the treated subject over the baseline status or over the expected status if not treated, which can be evidenced by an observable improvement of the clinical status over the baseline status or over the expected status if not treated in combination as described herein. An improvement of the clinical status can be easily assessed by any relevant clinical measurement typically used by physicians or other skilled healthcare staff. In the context of the invention, the therapeutic benefit can be transient (for one or a couple of months after cessation of administration) or sustained (for several months or years). As the natural course of clinical status which may vary considerably from a subject to another, it is not required that the therapeutic benefit be observed in each subject treated but in a significant number of subjects (e.g. statistically significant differences between two groups can be determined by any statistical test known in the art, such as a Tukey parametric test, the Kruskal-Wallis test the U test according to Mann and Whitney, the Student's t-test, the Wilcoxon test, etc).

When the method is aimed at treating a proliferative disease, in particular cancer, a therapeutic benefit can be evidenced by for instance a reduction in the tumor number; a reduction of the tumor size, a reduction in the number or extent of metastases, an increase in the length of remission, a stabilization (i.e. not worsening) of the state of disease, a delay or slowing of disease progression or severity, a prolonged survival, a better response to the standard treatment, an improvement of quality of life, a reduced mortality, etc.

When the method is aimed at treating an infectious disease, a therapeutic benefit can be evidenced by for instance, a decrease of the amount of the infecting pathogenic organism quantified in blood, plasma, or sera of a treated subject, and/or a stabilized (not worsening) state of the infectious disease (e.g. stabilization of conditions typically associated with the infectious disease such as inflammatory status), and/or the reduction of the level of specific seric markers (e.g. decrease of alanine aminotransferase (ALT) and/or aspartate aminotransferase (AST) associated with liver poor condition usually observed in chronic hepatitis C), decrease in the level of any antigen associated with the occurrence of an infectious disease and/or the appearance or the modification of the level of antibodies to the pathogenic organism and/or an improved response of the treated subject to conventional therapies (e.g. antibiotics) and/or a survival extension as compared to expected survival if not receiving the combination treatment.

The appropriate measurements such as blood tests, analysis of biological fluids and biopsies as well as medical imaging techniques can be used to assess a clinical benefit. They can be performed before the administration (baseline) and at various time points during treatment and after cessation of the treatment. For general guidance, such measurements are evaluated routinely in medical laboratories and hospitals and a large number of kits are available commercially (e.g. immunoassays, quantitative PCR assays).

Preferably, the combination product of the invention is used or administered for eliciting or stimulating and/or redirecting an immune response in the treated subject. Accordingly, the present invention also encompasses a method for eliciting or stimulating and/or re-orienting an immune response (e.g. to tumor or infected cells) comprising administering a combination product or composition(s)

of therapeutic vaccine and/or one or more immune checkpoint modulator(s) to a subject in need thereof, in an amount sufficient according to the modalities described herein so as to activate the patient's immunity.

In a particular embodiment, the combination product and method(s) of the invention may be employed according to the modalities described herein to break immune tolerance usually encountered in chronically infected and cancerous subjects.

The elicited, stimulated or redirected immune response can be specific (i.e. directed to epitopes/antigens) and/or non-specific (innate), humoral and/or cellular. In the context of the invention, the immune response is preferably a T cell response CD4+ or CD8+-mediated or both, directed to polypeptide(s)/epitope(s), in particular associated with a tumor or an infecting pathogenic organism.

The ability of the combination product described herein to elicit, stimulate or redirect an immune response can be evaluated either in vitro (e.g. using biological samples collected from the subject) or in vivo using a variety of direct or indirect assays which are standard in the art. For a general description of techniques available to evaluate the onset and activation of an immune response, see for example Coligan et al. (1992 and 1994, Current Protocols in Immunology; ed J Wiley & Sons Inc, National Institute of Health or subsequent editions). The ability to stimulate a humoral response may be determined by antibody binding and/or competition in binding (see for example Harlow, 1989, Antibodies, Cold Spring Harbor Press). Evaluation of non-specific immunity can be performed by for example measurement of the NK/NKT-cells (e.g. representativity and level of activation), as well as, IFN-related cytokine and/or chemokine producing cascades, activation of TLRs and other markers of innate immunity (Scott-Algara et al., 2010 PLOS One 5(1), e8761; Zhou et al., 2006, Blood 107, 2461-2469; Chan, 2008, Eur. J. Immunol. 38, 2964-2968). Evaluation of cellular immunity can be performed for example by quantification of cytokine(s) produced by activated T cells including those derived from CD4+ and CD8+ T-cells using routine bioassays (e.g. characterization and/or quantification of T cells by ELISpot, by multiparameters flow cytometry or ICS, by cytokine profile analysis using multiplex technologies or ELISA), by determination of the proliferative capacity of T cells (e.g. T cell proliferation assays by [$^3$H] thymidine incorporation assay), by assaying cytotoxic capacity for antigen-specific T lymphocytes in a sensitized subject or by immunization of appropriate animal models. For example, techniques routinely used in laboratories (e.g. flow cytometry, histology) may be used to perform tumor surveillance. One may also use various available antibodies so as to identify different immune cell populations involved in anti-tumor response that are present in the treated subjects, such as cytotoxic T cells, activated cytotoxic T cells, natural killer cells and activated natural killer cells.

If desired, the combination product, composition(s) or methods of the invention can be used or carried out in association with one or more conventional therapeutic modalities which are available for treating or preventing the disease or pathological condition to be treated or prevented (e.g. chemotherapy, radiation, and/or surgery). Such conventional therapy may be administered to the subject sequentially or concomitantly with the combination or method according to the invention.

Representative examples of conventional therapeutic drugs that may be useful in association with the combination product, composition or method of the invention include among others nitrosoureas, antibiotics, antimetabolites, antimitotics, antiviral drugs (e.g. interferon alpha), monoclonal antibodies, signaling inhibitors as well as chemotherapeutic drugs routinely used in cancer therapy. One may cite more specifically:

alkylating agents such as e.g. mitomycin C, cyclophosphamide, busulfan, ifosfamide, isosfamide, melphalan, hexamethylmelamine, thiotepa, chlorambucil, or dacarbazine;

antimetabolites such as, e.g. gemcitabine, capecitabine, 5-fluorouracil, cytarabine, 2-fluorodeoxy cytidine, methotrexate, idatrexate, tomudex or trimetrexate;

topoisomerase II inhibitors such as, e.g. doxorubicin, epirubicin, etoposide, teniposide or mitoxantrone;

topoisomerase I inhibitors such as, e.g. irinotecan (CPT-11), 7-ethyl-10-hydroxy-camptothecin (SN-38) or topotecan;

antimitotic drugs such as, e.g., paclitaxel, docetaxel, vinblastine, vincristine or vinorelbine;

platinum derivatives such as, e.g., cisplatin, oxaliplatin, spiroplatinum or carboplatinum;

inhibitors of tyrosine kinase receptors such as sunitinib (Pfizer), sorafenib (Bayer), gefitinib, erlotinib and lapatinib; and antibodies (in particular anti-neoplastic cetuximab, panitumumab, zalutumumab, nimotuzumab, matuzumab) or inhibitors of Human Epidermal Growth Factor Receptor-2 (in particular trastuzumab); and agents that affect angiogenesis such as, e.g. inhibitor of Vascular Endothelial Growth Factor (in particular bevacizumab or ranibizumab);

antibiotics conventionally used against infectious pathogenic organisms such as Aminoglycosides, Ansamycins, Carbapenems, Cephalosporins, Glycopeptides, Macrolides, Penicillins, Qionolones and tetracyclins among others; One may cite in particular antibiotics currently used in first line therapy to treat a Mtb infection such as isoniazid, rifamycins (e.g. rifampin, rifapentine and rifabutin), ethambutol, streptomycin, pyrazinamide and fluoroquinolones as well as those used in "second-line" therapy in Mtb-infected subjects that has demonstrated drug resistance such as ofloxacin, ciprofloxacin, ethionamide, aminosalicylic acid, cycloserine, amikacin, kanamycin and capreomycin;

Antiviral treatment such as interferon-alpha (IFNa and pegylated derivative) and nucleoside/nucleotide analogues (NUCs). For example, lamivudine, entecavir, telbivudine, adefovir and tenofovir are currently used for treating HBV. Other antivirals include protease inhibitors (e.g. serine protease inhibitors such as VX950 of Vertex), polymerase inhibitors and helicase inhibitors that are suitable for treating hepatitis C;

TLR agonists and N-glycosylation inhibitors;

Interleukins (e.g. IL-2, IL-6, IL-15, IL-24, etc), interferons (e.g. IFNα, IFNβ or IFNγ), tumor necrosis factor (TNF), colony-stimulating factors (e.g. GM-CSF, C-CSF, M-CSF, etc) and chemokines (e.g. CXCL10, CXCL9, CXCL11, etc);

siRNA and antisense oligonucleotides that target genes of infectious pathogenic organism or cellular gene associated with the targeted disease.

According to an advantageous embodiment, especially when the therapeutic vaccine is armed with a suicide gene, the combination product or methods according to the present invention may be used in association with the corresponding prodrug (see Table 1). The prodrug is administered in accordance with standard practice (e.g. per os, systematically, etc). Preferably, the prodrug administration takes place subsequent to the administration of the therapeutic vaccine, (e.g. at least 3 days after the administration of the suicide-gene encoding therapeutic vaccine). The oral route is preferred. It is possible to administer a single dose of prodrug or doses which are repeated for a time which is sufficiently long to enable the toxic metabolite to be produced within the subject. By way of illustration, a dose of 50 to 500 mg/kg/day, advantageously, a dose of 200 mg/kg/day or, preferably, a dose of 100 mg/kg/day is appropriate.

The combination product and method of the invention may also be used in combination with one or more adjuvant (s) or "immune stimulant" to enhance immunity (especially a T cell-mediated immunity), e.g. through toll-like receptors (TLR) such as TLR-7, TLR-8 and TLR-9. For illustrative purposes, such adjuvants include, without limitation, alum, mineral oil emulsion such as, Freunds complete and incomplete (IFA), lipopolysaccharides (Ribi et al., 1986, Immunology and Immunopharmacology of Bacterial Endotoxins, Plenum Publ. Corp., NY, p407-419), saponins such as ISCO-MATRIX, AbISCO, QS21 (Sumino et al., 1998, J. Virol. 72: 4931; WO98/56415), imidazo-quinoline compounds such as Imiquimod (Suader, 2000, J. Am Acad Dermatol. 43:S6), S-27609 (Smorlesi, 2005, Gene Ther. 12: 1324) and related compounds such as those described in WO2007/147529; cationic peptides such as IC-31 (Kritsch et al., 2005, J. Chromatogr Anal. Technol. Biomed. Life Sci. 822: 263-70), polysaccharides such as Adjuvax and squalenes such as MF59. Other suitable adjuvants include ds RNA like NAB2 with Lipofectin (Claudepierre et al., 2014, J. Virol 88: 5242-55) or 3pRNA (Hornung et al., 2006, Science 314: 994-7), both stimulating IFNα responses via activation of cytoplasmic helicase MDA-5 and RIG-1.

Alternatively or in combination, the combination or method according to the invention can also be used in association with radiotherapy. Those skilled in the art can readily formulate appropriate radiation therapy protocols and parameters (see for example Perez and Brady, 1992, Principles and Practice of Radiation Oncology, 2nd Ed. JB Lippincott Co; using appropriate adaptations and modifications as will be readily apparent to those skilled in the field). The types of radiation that may be used in cancer treatment are well known in the art and include electron beams, high-energy photons from a linear accelerator or from radioactive sources such as cobalt or cesium, protons, and neutrons.

The present invention also provides kits including the active entities of the combination product of the invention in kit form. A kit is a packaged combination, optionally, including instructions for use optionally with other components. In one embodiment, a kit includes at least the therapeutic vaccine as discussed herein in one container and one or more immune checkpoint modulator(s) as described herein in another container. Such containers are preferably sterile glass or plastic vial. A preferred kit comprises a MVA-based therapeutic vaccine (e.g. a MVA virus expressing the tumor-associated MUC1 antigen and the human IL-2) and an immune checkpoint modulator(s) which specifically binds CTLA-4 (e.g. an anti-CTLA-4 antibody, such as ipilimumab). Another preferred kit comprises a MVA-based therapeutic vaccine (e.g. a MVA virus expressing the tumor-associated MUC1 antigen and the human IL-2) and an immune checkpoint modulator(s) which specifically binds PD-1 (e.g. an anti-PD-1 antibody, such as nivolumab or lanbrolizumab). Another preferred kit comprises a MVA-based therapeutic vaccine (e.g. a MVA virus expressing the tumor-associated MUC1 antigen and the human IL-2) and an immune checkpoint modulator(s) which specifically binds PD-L1 (e.g. an anti-PD-L1 antibody, such as MPDL3280A or BMS936559). Optionally, the kit can include suitable devices for performing the administration of the active agents. The kit can also include a package insert including information concerning the compositions or individual component and dosage forms in the kit.

All of the above cited disclosures of patents, publications and database entries are specifically incorporated herein by reference in their entirety to the same extent as if each such individual patent, publication or entry were specifically and individually indicated to be incorporated by reference.

BRIEF DESCRIPTION OF THE DRAWINGS

FIG. 4A: ConA-induced fold induction of percentage of IFNγ$^+$ $CD8^{dim}CD3^{dim}$ cells upon incubation of lung cells with bmDCs to facilitate activation. FIG. 4B: ConA-induced fold induction of percentage of IFNγ$^+$ $CD8^{dim}CD3^{dim}$ cells upon incubation of lung cells with anti-CD28 to facilitate activation.

FIG. 7A: CT26-MUC1 lung tumor model. CT26-MUC1 cells were injected iv. Day 2 and 9, 5·10⁷ pfu TG4010, empty MVA vector (MVATGN33.1) or buffer (SO8) were injected intravenously. Mice were weighed twice per week and sacrificed when loosing 10% of weight. Percent survival was monitored. FIG. 7B: CT26-MUC1 s.c. tumor model. CT26-MUC1 cells were injected s.c. Day 2 and 9, 1·10⁷ pfu TG4010, empty MVA vector (MVATGN33.1) or buffer (SO8) were injected s.c. in the same flank. Mice were sacrificed when the tumors reached the size of 2000 mm³. Mean tumor volumes with SEM are shown.

EXAMPLES

We set out to combine immune checkpoint blocking approaches with therapeutic MVA vectors with the goal of inducing antigen-specific T cell immune response with MVA and release the brakes from T cell generation with immune checkpoint antibodies. Preclinical evidence for synergistic effects of immune checkpoint blockers combined with viral vectors was to be demonstrated in mouse tumor models. This implies the use of i) murine-specific anti-immune check point antibodies and ii) an antigen-expressing MVA vector.

The MVA vector chosen for these studies (MVATG18124) contains the bacterial LacZ gene encoding the beta-galactosidase Ag model (SEQ ID NO: 3) under the control of poxvirus promoter pH5R (SEQ ID NO: 4). pH5R promoter was isolated by PCR amplification from Vaccinia virus Copenhagen strain using appropriate primers. The *E. coli* LacZ gene was obtained by PCR amplification using primers otg19678 (SEQ ID NO: 5) and otg19679 (SEQ ID NO: 6) with pCMVBeta (Clontech) as DNA template. The pH5R and LacZ genes were cloned into a shuttle plasmid between MVA sequences extending from positions 142006 to 142987 and positions 142992 to 143992 according to GenBank® sequence EF675191.1. MVATG18124 was generated into chicken embryo fibroblast (CEF) cells by transfection of shuttle plasmid into previously MVA-infected CEF, resulting in homologous recombination between shuttle plasmid DNA and MVA genome and insertion of the pH5R-LacZ cassette into deletion III. Recombinant MVA clones were isolated using conventional technology (Lullo et al., 2010, J Virol Methods 163: 195-204) and the selected clones were controlled by PCR, then amplified in CEF cells. Virus stocks were titrated on DF1 cells by plaque assay. Absence of mutation into the inserted DNA and the surrounding region was checked by DNA sequencing.

It was first chosen to target the immune checkpoint blocker murine PD-1 (mPD-1) with an appropriate antibody. The rat anti mPD-1 antibody RMP1-14 (BioXcell) was chosen. This antibody was shown to block the interaction of mPD1 with its ligands (Yamazaki et al., 2005, J. Immunol. 175(3): 1586-92).

The combination of mPD-1 inhibitors with the antigen-expressing MVATG18124 was tested in vivo in two mice models, respectively metastatic and subcutaneous tumor models. The colon carcinoma cell line CT26.CL25 (ATCC CRL-2639), transduced with the LacZ gene and thus stably expressing beta-galactosidase, was either injected subcutaneously to generated palpable tumors (subcutaneous model) or intravenously to generate lung metastasis. Mice were then treated with MVATG18124 expressing beta-galactosidase and murine-specific immune checkpoint blockers like anti PD-1 or anti CTLA-4 antibodies.

Example 1: Combination of MVATG18124 with Anti-PD-1 Mab

Figure 1A:
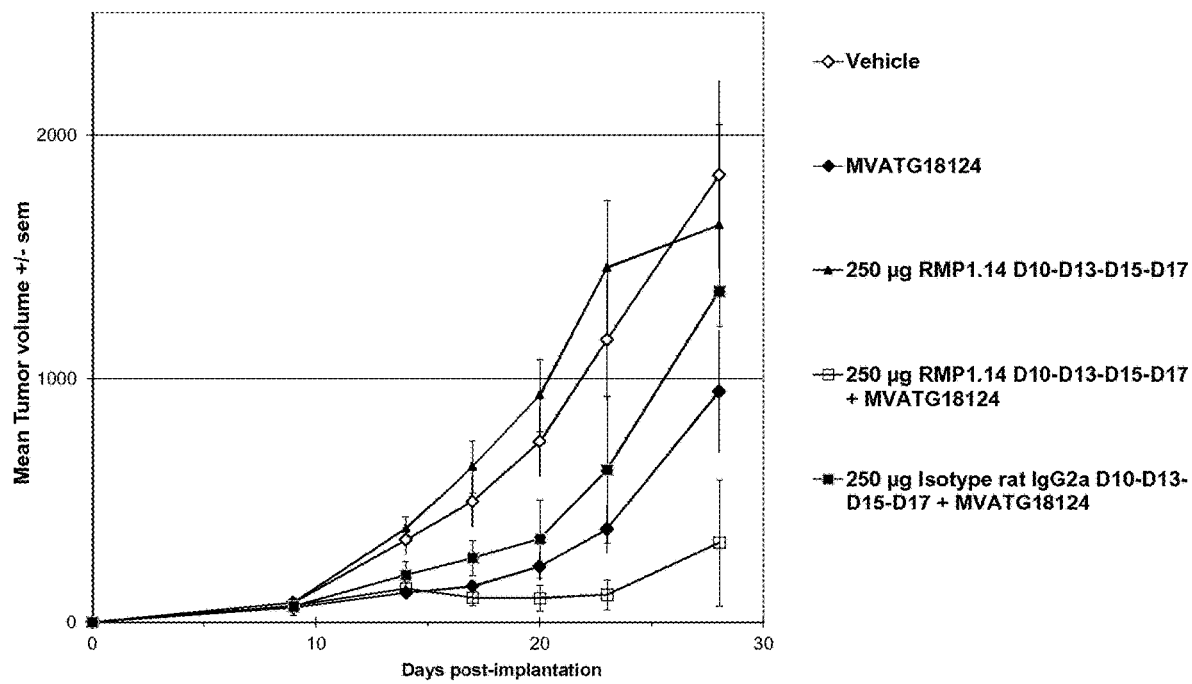
FIGS. 1A and 1B illustrates the effects on tumor volume (FIG. 1A) and mice survival (FIG. 1B) in a subcutaneous CT26-CL25 tumor model of the administration of the formulation buffer (vehicle), MVATG18124 alone, the anti PD-1 clone RMP1.14 alone, a combination of both MVATG18124 and anti PD-1 clone RMP1.14 and a combination of both MVATG18124 and the rat IgG2a isotype control.
Figure 1B:
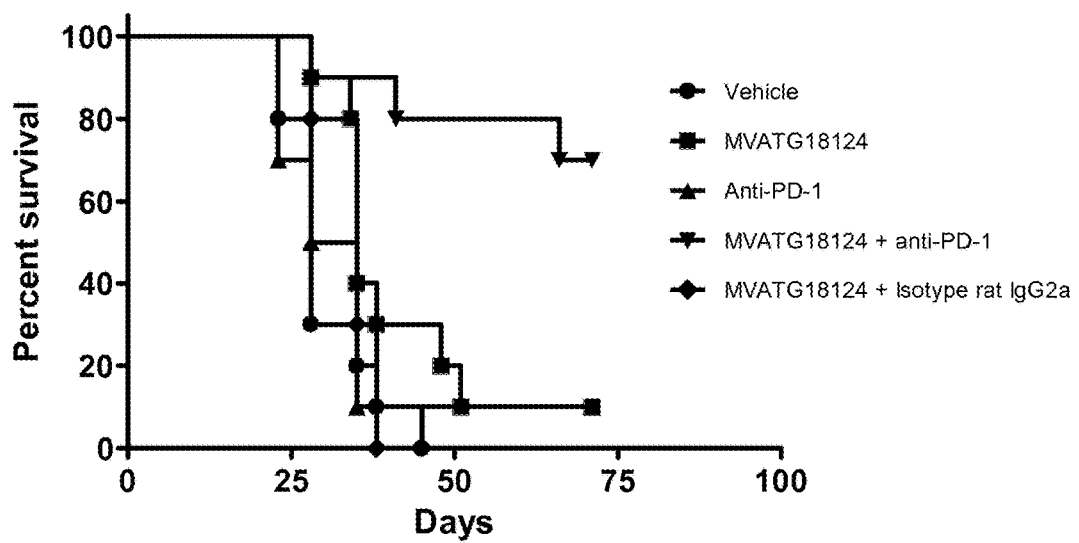

The combination of mPD-1 inhibitor (commercial clone RMP1-14; BioXCell) with beta-gal-expressing MVATG18124 was tested in vivo in a subcutaneous tumor model. Balb/c mice were subcutaneously injected with 2×10⁵ CT26.CL25 cells. Day 2 and 9 after cell implantation, mice were then intravenously immunized with either 1×10⁴ pfu of MVATG18124 or formulation vehicle as negative control in combination with 4 intraperitoneal (ip) administrations at days 10, 13, 15 and 17 of 250 ug of either murine anti PD-1 antibody RMP1.14 (BioXcell) or its isotype control IgG2a (clone 2A3). In other terms, 5 groups of 10 mice were tested; a first group treated with MVATG18124 receiving 2 iv injections (group 1); a second group treated with 4 ip injections of anti-PD-1 antibody (group 2); a third group treated with both MVATG18124 and anti-PD-1 antibody receiving 2 iv injections of the therapeutic MVA and 4 ip injections of anti-PD-1 antibody (group 3); a fourth group receiving 2 iv injections of the therapeutic MVATG18124 and 4 ip injections of isotype antibody (group 4) and a control group receiving the formulation buffer (group 5). Tumor growth and survival were measured over time as illustrated in FIGS. 1A and 1B.

As expected, tumor volume increased very rapidly in control group receiving formulation buffer. Rapid tumour growth was also observed in the group receiving mPD-1 antibody. A slight delay in tumor volume was seen in groups receiving MVATG18124 either alone or in combination with the isotype control. Tumor growth was greatly reduced in the "combination" group injected with both MVATG18124 and mPD-1 antibodies (FIG. 1A). Effects on mice survival are more pronounced since about 70% of mice treated with both MVATG18124 and mPD-1 antibodies are still alive more than 100 days following tumor implantation versus 10% of MVATG18124-treated animal group (significant differences). In contrast, control, antibody-treated and isotype-treated animals died within less than 50 days (FIG. 1B).

Example 2: Combination of MVATG18124 with Anti-CTLA-4 Mab

The combination of CTLA-4 inhibitor (commercial clone 9D9; BioXCell) with antigen-expressing MVATG18124 was tested in vivo in a metastatic CT26-CL25 model. 2×10⁵ CT26.CL25 cells were injected intravenously (iv) in Balb/c mice. Days 2 and 9, MVATG18124 encoding beta-galactosidase or its empty vector control MVAN33.1 was administered iv at the dose of 1·10⁴ pfu. 250 μg of the murine anti-CTLA4 antibody 9D9 (BioXCell) or its IgG2b isotype control (clone MPC-11 BioXCell) were injected intraperitoneally (ip) at days 3 and 10. The survival of mice was followed for more than 60 days. The viral dose of 1·10⁴ pfu was identified as optimal dose to increase survival rates in this tumor model (data not shown).

Figure 2:
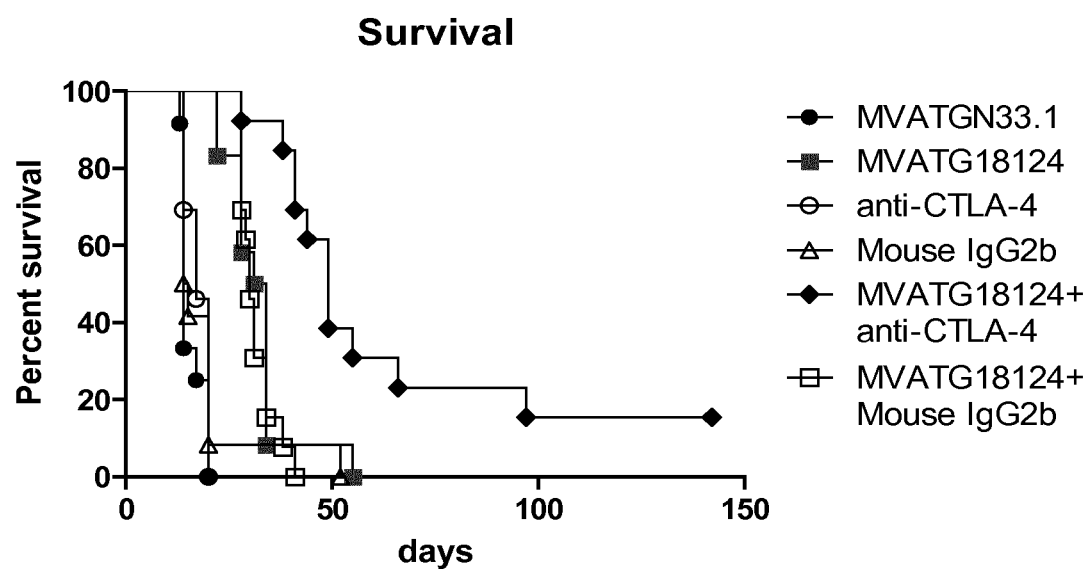
FIG. 2 illustrates the effects on mice survival in metastatic CT26-CL25 tumor model of the administration of an empty MVA (MVATGN33.1), MVATG18124 alone, an anti CTLA-4 antibody alone, its IgG2b isotype control, a combination of both MVATG18124 and anti CTLA-4 and a combination of both MVATG18124 and the IgG2b isotype control.

As illustrated in FIG. 2, treatment with anti CTLA4 antibodies or its isotype control alone showed weak effects comparable to those observed with the empty MVA vector MVATGN33.1 (35% survival at day 20 for all three groups). In contrast, treatment with MVATG18124 alone or in combination with the isotype control increased mice survival (35% survival at day 35 for both groups). The group of mice treated with the combination of MVATG18124 and anti-CTLA4 antibodies greatly increased the percentage of 35% survival to more than 60 days.

Thus, we have clearly demonstrated a clear anti-tumor effect of treating MVA-based immunotherapeutic vaccine and the immune checkpoint blocker anti CTLA4.

Example 3: Lymphoid Cell Population Studies in Dissociated Lungs of Treated Mice Determination of IFNγ Positive CD8dim CD3dim Cells Cellular response was examined in mice treated with either the anti-CTLA-4 antibody the antigen-expressing MVA or both as well as in untreated (i.e. naïve) mice. Five BALB/c mice per group were injected iv with MVATG18124 (1·10⁴ pfu) day 1 and 8 or ip with 250 µg anti CTLA-4 (clone 9D9, BioXCell) day 2 and 9 or both. Mice were sacrificed day 15, and lungs were isolated. Lungs from all 5 mice per group were pooled, cut into small pieces in C-tubes (Miltenyi) and enzymatically dissociated using a tissue dissociation kit (Miltenyi, 130-096-730) using the Gentle OctoMACS (Miltenyi) according to the manufacturer's recommendations.

Lung-derived cells were plated at 2·10⁶ cells/well (96 well plate) in T cell-specific medium (TexMACS, Miltenyi). Cells were activated by co-cultivation with peptide-loaded bone marrow-derived murine dendritic cells (bmDCs): bmDCs from BALB/c mice were generated from bone marrow cells matured in the presence of murine GM-CSF (Peprotech, 100 µg/ml) for 10 days. Alternatively, activation was facilitated by incubation with 1 µg of anti CD28 (clone PV-1). Concanavalin A (ConA, 5 µg/ml) served as non-specific activator. Anti CD107a antibody (clone eBio1D4B) was added to label degranulating cells. Secretion of cytokines was blocked after one hour of incubation by adding GolgiPlug/Brefeldin (1:1000, BD Biosciences). After 5 hours total incubation time, cells were washed and stained for viability (LiveDead, Fixable violet dead cell staining kit) and surface markers CD8a (clone 53-6.7) and CD38 (clone 145-2C11). Cells were stained intracellularly for IFN-γ (clone XMG1.2) using the BD Cytofix/Cytoperm kit (BD Biosciences). Cells were fixed and analyzed by flow cytometry (Navios, Beckman Coulter).

Figure 3A:
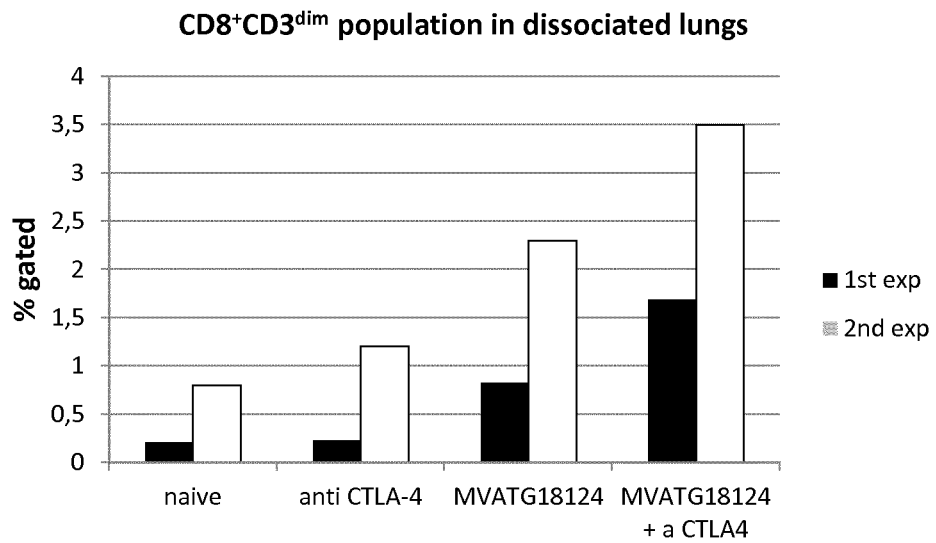
FIG. 3A illustrates the percentage of gated $CD8^+CD3^{dim}$ cells (referred as $CD8^{dim}CD3^{dim}$ herein after) in dissociated lungs obtained from untreated (i.e. naïve) mice or mice treated with MVATG18124, anti-CTLA-4 and both MVATG18124 and anti-CTLA-4.
Figure 3B:
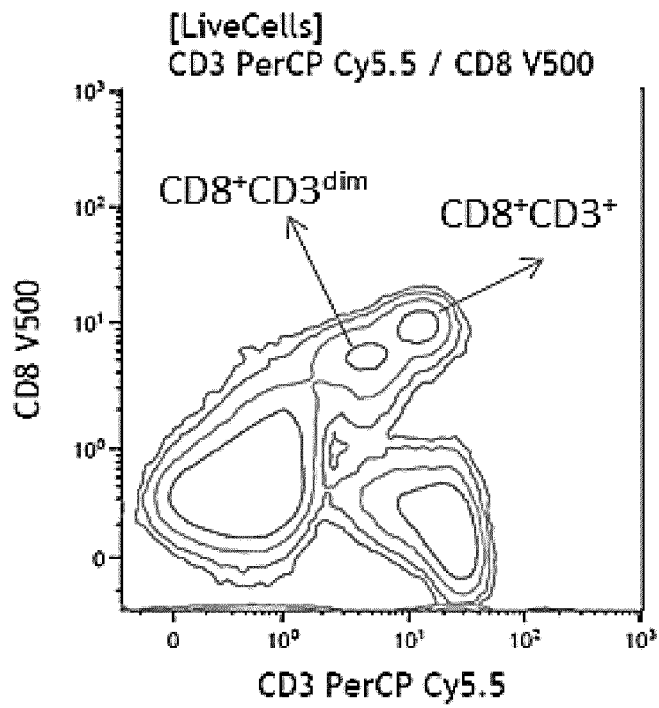
FIG. 3B illustrates an example of $CD8^{dim}CD3^{dim}$ (referred as $CD8^+CD3^{dim}$ in the Fig.) population in CD3/CD8 dot blot lung cells from mice treated with anti CTLA-4 and MVATG18124.

Combinatorial treatment of MVATG18124 and anti CTLA-4 in naïve BALB/c mice leads to the appearance of a sub population of lymphocyte cells named CD8$^{dim}$CD3$^{dim}$ in the lung. FIG. 3B represents an example of CD8$^{dim}$CD3$^{dim}$ population in CD3/CD8 dot blot lung cells from mice treated with anti CTLA-4 and MVATG18124. Gating living lymphocytes, the percentages of gated CD8$^{dim}$CD3$^{dim}$ cells in two independent experiments are illustrated in FIG. 3A. More specifically, the population of CD8$^{dim}$CD3$^{dim}$ was clearly increased after treatment with MVATG18124 and even more after combinatorial treatment with MVATG18124+anti CTLA-4.

Figure 4A:
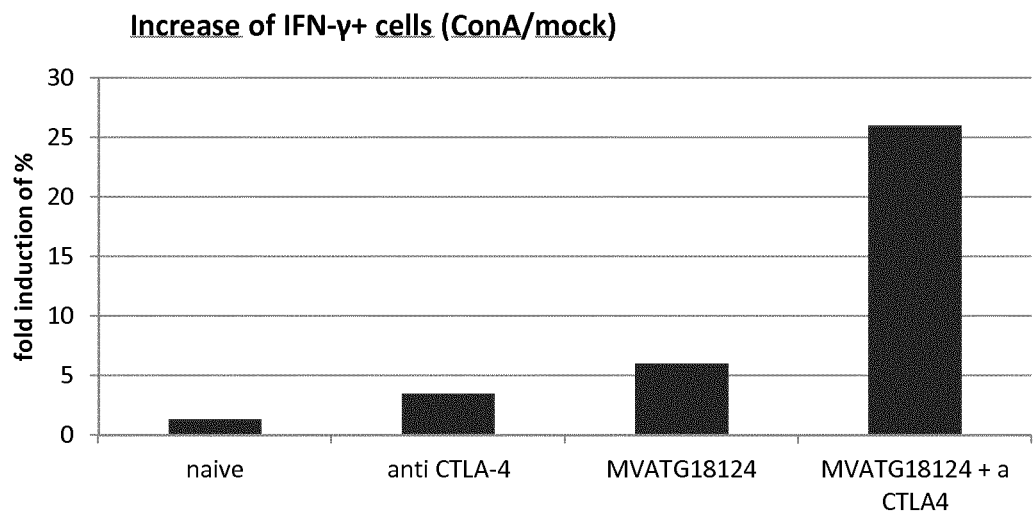
FIGS. 4A and 4B represents the IFN-γ positive $CD8^{dim}CD3^{dim}$ cell population obtained following ConA induction in lung samples obtained from untreated (i.e. naïve) mice or mice treated with MVATG18124, anti-CTLA-4 and both.
Figure 4B:
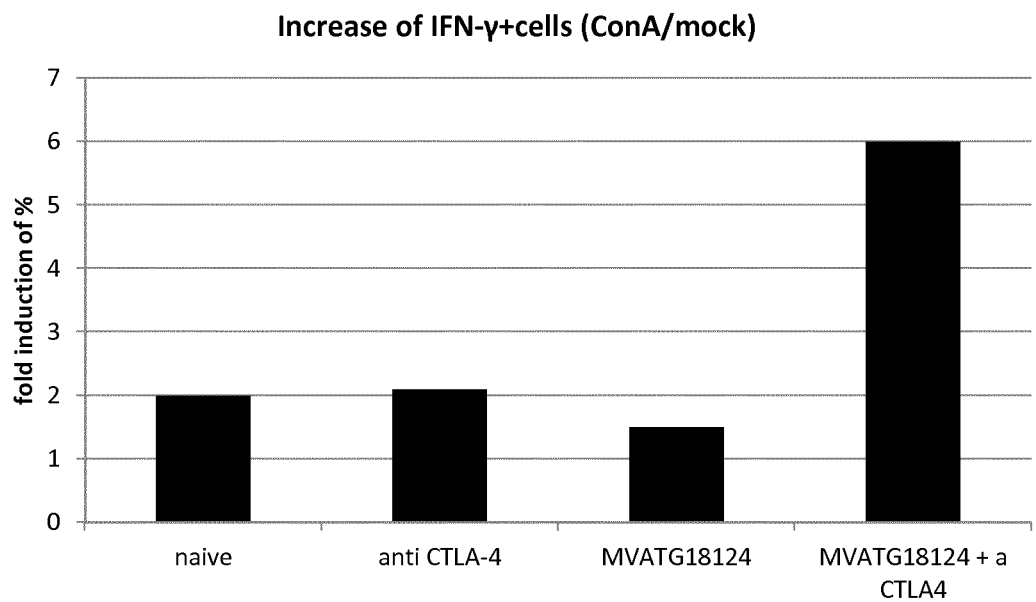

Next, the percentage of intracellular IFN γ⁺ cells was assessed in the CD8$^{dim}$CD3$^{dim}$ population. Within this CD8$^{dim}$CD3$^{dim}$ population, highest induction of IFN-γ+ cells was observed in mice treated with MVATG18124+anti CTLA-4 (FIGS. 4A and 4B).

In summary, combinatorial treatment of MVATG18124 and anti CTLA-4 in naïve BALB/c mice leads to the appearance of a CD8$^{dim}$CD3$^{dim}$ lymphocyte cell population in the lung. Upon stimulation with ConA and a high percentage of CD8$^{dim}$CD3$^{dim}$ from mice treated with MVATG18124+anti CTLA-4 can be induced to secrete IFN-γ.

The CD3$^{dim}$CD8$^{dim}$ cell population was analyzed in greater detail.

In the course of our analyses, we observed that the CD3$^{dim}$CD8$^{dim}$ population was positive for the killer cell lectin like receptor G1 (KLRG1⁺) and negative or low for CD127 (IL-7Rα) (CD127$^{-/flow}$). This phenotype is associated with antigen experienced short lived effector cells (SLECs) (Obar et al., 2011, J Immunol., doi: 10.4049/jimmunol.1102335; Sarkar et al., 2008, J Exp Med 205(3): 625-40).

The CD3$^{dim}$CD8$^{dim}$ KLRG1⁺ population infiltrating/present in the lung of mice treated with MVATG18124 and anti CTLA-4 responds to an antigen-specific stimulus with IFN-γ secretion and degranulation (CD107a).

Determination of IFN-γ, CD107a and KLRG1 Positive Cells in CD8$^{dim}$CD3$^{dim}$ Cell Population As described above, BALB/c mice were injected i.v. with MVA-β-gal or an empty vector MVATGN33.1 at 1·10⁴ pfu. On days 3 and 10, mice received 250 µg anti CTLA-4 i.p. Lungs were taken day 14 and enzymatically dissociated. Lung derived cells were plated at 2·10⁶ cells/well (96 well plate) in T cell-specific medium (TexMACS, Miltenyi), activated by incubation with 1 µg of anti CD28 (clone PV-1) and stimulated with a β-gal specific peptide (T9L-3) or a control peptide (T8G) in the presence of anti CD107a antibody (clone eBio1D4B) to label degranulating cells. Secretion of cytokines was blocked after one hour of incubation by adding GolgiPlug/Brefeldin (1:1000, BD Biosciences). After 5h total incubation time, cells were washed and stained for viability (LiveDead, Fixable violet dead cell staining kit) and for the surface markers CD8a (clone 53-6.7), CD3ε (clone 145-2C11) and KLRG1 (clone 2F1/KLRG1). Cells were stained intracellularly for IFN-γ (clone XMG1.2) using the BD Cytofix/Cytoperm kit (BD Biosciences). Cells were fixed and analyzed by flow cytometry (Navios, Beckman Coulter).. After 5 hours, cells and stained CD8a.

Figure 6:
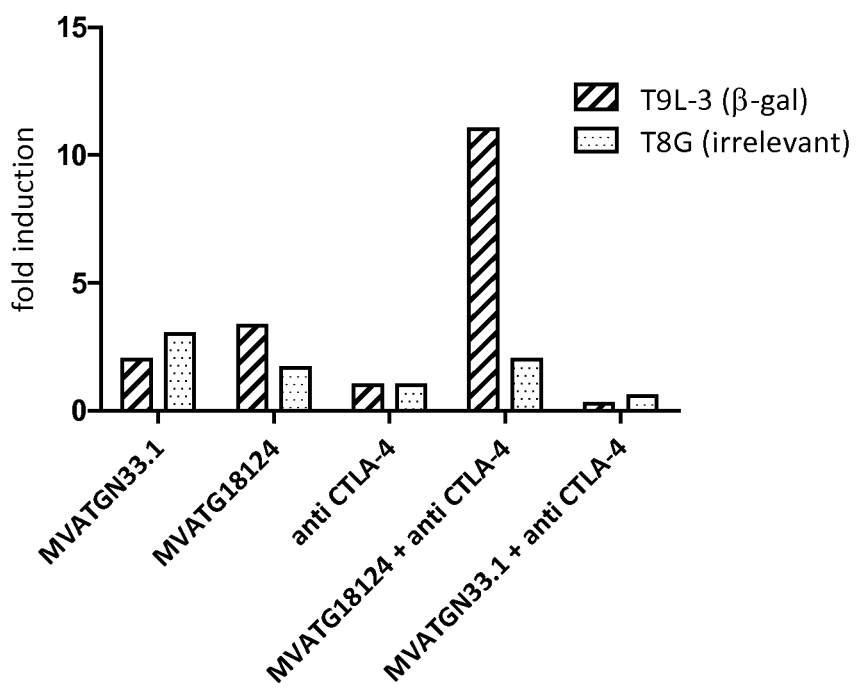
FIG. 6 represents the induction of IFN-γ, CD107a and KLRG1 positive cells in $CD8^{dim}CD3^{dim}$ cell population obtained in lung samples stimulated with T9L-3 peptide (hatched) or irrelevant T8G peptide (dotted) following treatment with an empty vector MVATGN33.1 alone or in combination with anti-CTLA-4, MVATG18124 alone or in combination with anti-CTLA-4 or anti-CTLA-4 alone.

Treatment with MVATG18124 or an empty control vector, and even more the combination of MVATG18124 and anti CTLA-4 in naïve BALB/c mice lead to the appearance of a CD8$^{dim}$CD3$^{dim}$KLRG1⁺ lymphocyte cell population in the lung. Upon ex vivo stimulation with the β-gal peptide T9L-3, this population secreted IFNγ and degranulated (CD107a) and, as illustrated in FIG. 6, the percentage was higher after treatment with MVATG18124 and anti CTLA-4 than in the other groups treated with the control vector (MVATGN33.1 alone or with anti CTLA-4), with MVATG18124 alone or with anti CTLA-4 alone. As expected, stimulation with an irrelevant peptide (T8G peptide) did not yield such induction.

In conclusion, the treatment with MVATG18124 and anti CTLA-4 increases the b-gal specific response in a CD3$^{dim}$CD8$^{dim}$KLRG1⁺ cell population in the lung.

Example 4: Secretion of IFN-γ

Further, the number of IFNγ secreting splenic lymphocytes was investigated following BALB/c mice treatment with MVATG18124 or MVAN33.1 at $1\cdot10^4$ pfu (D1 and 8) and anti CTLA-4 or its isotype control (D2 and D9, 250 µg ip). Measurement was performed at day 14 by ELISpot (Enzyme-linked immunospot) assay.

Plate Preparation

The day preceding the experiments, membrane ELISpot plates (Millipore, ref. MSIPS4W10) were prewetted with 15 µl of 35% ethanol per well with maximum incubation time of 2 min. Plates were washed five times with 200 µl per well of sterile water.

ELISpot plates were coated with a rat anti-mouse IFN-γ monoclonal antibody (AN18 Mabtech, ref. 3321-3-1000) diluted at 15 µg/mL in sterile DPBS (Sigma, ref. D8357) (100 µl/well). The plates were covered and incubated overnight at 4° C. The next day, the plates were washed 3 times with sterile PBS (200 µL/well) and were saturated for 1 h at 37° C. with 200 µL/well of complete RPMI 1640 medium (RPMI1640 medium, (Sigma R0883); L-Glutamine 2 mM, (Sigma G6392); Gentamycin 0.01 g/L (Schering Plough U570036); Fetal Calf Serum 10% (JRH 12003-1000M) 550 µl of a solution $5\times10^{-2}$ M bmercaptoethanol).

Sample Preparation

For ex vivo evaluation of the frequency of the specific CD8+ T cells induced by immunization, euthanized animals were splenectomized 7 days after last immunization. Spleens from the same group were pooled in a cell strainer in a well of a 6-wells culture plate containing 5 mL of complete medium. Spleens were crushed with a syringe piston and the cell strainer discarded. Splenocytes were collected with 8 mL of complete medium and transferred in a 15 ml falcon tube. The splenocytes suspension was laid over 4 mL of Lympholyte®-M separation cell media (Cedarlane, ref. CL5035) and centrifuged (20 min, 1500×g, room temperature). The interphase containing lymphocytes was collected and rinsed three times with 10 ml of PBS. Between each rinse step, cells were centrifuged (4 min at 400×g) and the supernatants were discarded. The remaining red blood cells were lysed by addition on the lymphocyte pellet of 2 mL of RBC lysis buffer 1×(10× solution: BD Pharm Lyse™ lysing solution, ref. 555899) diluted in sterile water. Each tube was gently vortexed immediately after adding the lysis solution and incubated at room temperature for 15 minutes. Lysis was topped by the addition of 10 mL DPBS followed by centrifugation 4 min at 400×g., the cells were resuspended in 10 mL of complete RPMI 1640 medium. The cells were counted with a Z2 Cell Counter (Beckman Coulter) and the cell concentration was adjusted at $1\times10^7$ cells per mL in complete RPMI 1640 medium.

Assay

To perform the ELISpot assay, 100 µL of lymphocyte suspension from each group ($1\times10^6$ cells) were added to each wells of a coated 96-wells plate. One given condition was tested in triplicates or in quadruplicates. One hundred microliter of different indicated peptides (2 µg/ml in complete RPMI 1640 medium) was added to the cell suspension. ConA (Sigma, ref. C5275) was used as positive control (5 µg/mL final concentration) MVA-specific peptide (S9L-8) was used for immunization control. The plates were then incubated at 37° C. in 5% $CO_2$ for 16 to 20 hours. Then, plates were washed three times with DPBS (200 µL). Biotinylated rat anti-mouse IFN-γ monoclonal antibody (Mabtech, ref. 3321-6-1000) was diluted at 1 µg/mL in antibody mix buffer (PBS, 0.5% SVF) and distributed at 100 µl/well. Plates were incubated 2 hours at room temperature in darkness, and then washed three times in DPBS (200 µL). One hundred microliter of Extravidin-Phosphatase alkaline (SIGMA, ref. E2636) (Diluted 1/5000 in antibody mix buffer) was added to each well and the plates were incubated for 1 hour at room temperature in darkness. Plates were finally washed three times in DPBS (200 µL). One hundred microliter of BCIP/NBT (Sigma, ref. B5655, one caps in 10 mL MilliQ water) was added to each well until blue spots develop and then plates were washed thoroughly in tap water and dried.

Data Acquisition

Spots were counted with an ELISpot reader (CTL Immunospot reader, S5 UV). A visual quality control (comparing machine scans and plates) was performed on each well to ensure that the counts provided by the ELISpot reader match the reality of the picture. Results were expressed as number of spot forming units (sfu) per $1\times10^6$ splenic lymphocytes (mean) for each triplicate or quadruplicate. Specific ELISpot response was determined either with the DFR (eq) method (Moodie et al., Cancer Immunol Immunother. 2010 October; 59(10):1489-501) or with an empirical cut-off calculated as the mean number of spots from blank wells plus two times the standard deviation of this mean number of spots.

Figure 5:
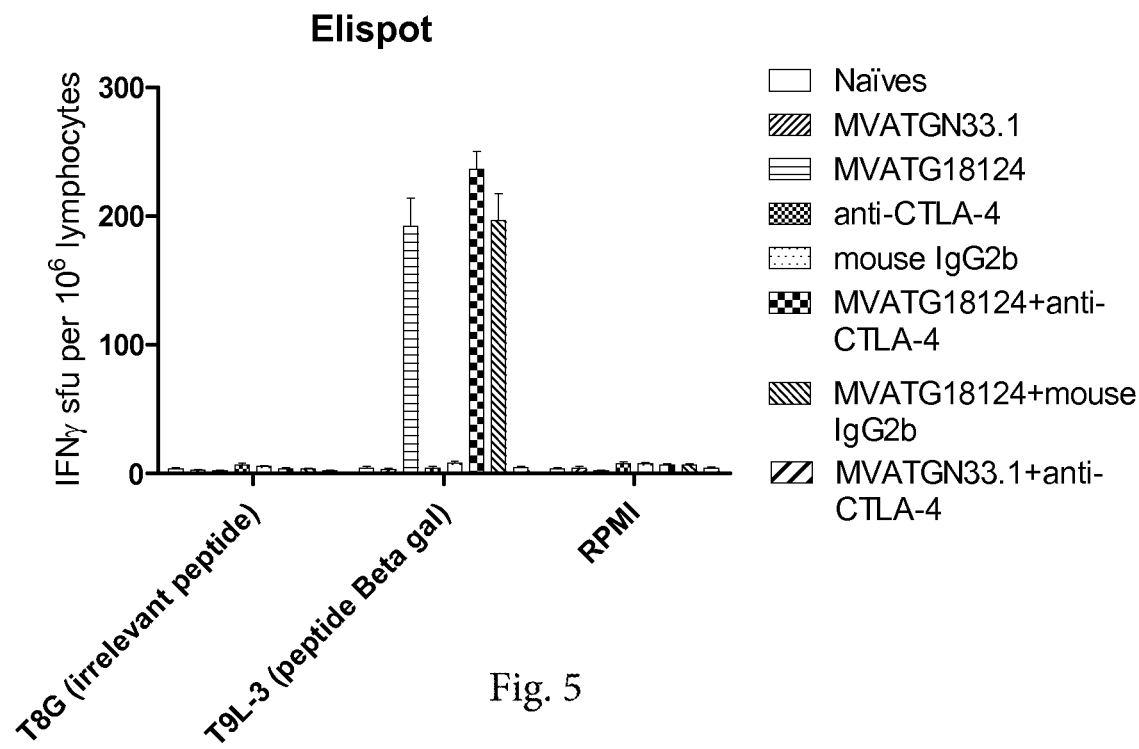
FIG. 5 illustrates ELispot analysis of splenic lymphocytes stimulated with the β-gal-specific peptide T9L3 showed β-gal specific response in splenic lymphocytes treated with MVATG18124. The raw data was transformed into histogram graph. Results are expressed as number of spot forming units (sfu) per $1×10^6$ splenocytes (mean) for each triplicate or quadruplicate.

As shown in FIG. 5, ELIspot analysis of splenic lymphocytes stimulated with the β-gal-specific peptide T9L3 showed β-gal specific response in splenic lymphocytes treated with MVATG18124. The specific responses increased further after combinatorial treatment with anti CTLA-4 but not with its isotype control. Stimulation with the non-specific peptide T8G showed no increase of IFN-γ secreting cells.

Example 5: Combinatorial Effect of TG4010 (MVA-MUC1-IL-2) and Anti PD-1 (RMP1.14) in a MU1-Positive CT26-Based Tumor Model TG4010 is a MVA vector encoding the full cDNA sequence of human MUC1 and human IL-2. Anti-tumoral efficacy provided by this vector was tested in a CT26-based MUC1-positive cell line which gives rise to MUC1-positive tumors after s.c. injection, as well as lung tumors after i.v. injection.

Generation of CT26-MUC1 Cell Line

The murine colon carcinoma cell line CT26 WT (ATCC CRL-2638) was stably transfected with the plasmid pTG5077 encoding the full cDNA sequence of human MUC1 under the control of the CMV promoter as well as a G418-resistance gene under the control of the SV40 promoter. CT26 cells were transfected by means of Lipofectamine LTX with pTG5077, and cultivated in the presence of 0.4 mg/ml G418 to select for stable transfectants. After 14 days, living cells were labeled with a monoclonal antibody against MUC1 (H23+second antibody Goat anti mouse-FITC). Positive cells were sorted (FACS ARIA), transferred in 96 well plates at 1 cell/well. Outgrowing clones were analyzed for stable MUC1 expression by flow cytometry up to day 60 after transfection. Four stably MUC1-expressing clones were then tested for their ability to induce tumor growth in BALB/c mice after sc injection and after iv injection. One clone was retained after verification that s.c.-implanted tumors and lung tumors obtained after iv injection were MUC1-positive.

Figure 7A:
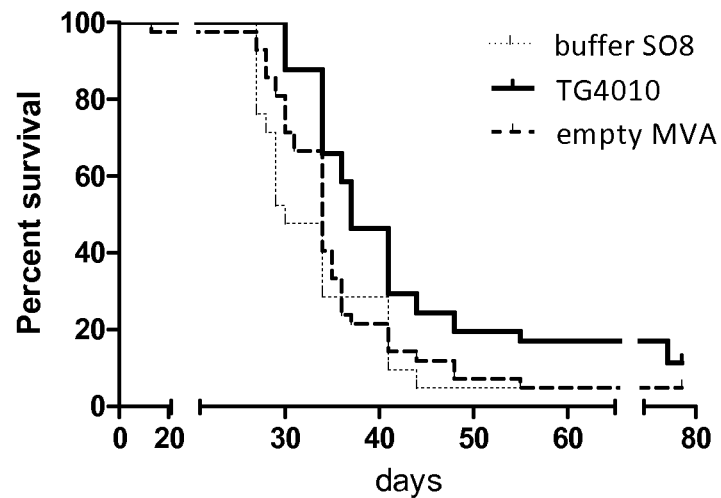
FIGS. 7A and 7B illustrates the effect provided by TG4010 treatment on mice survival and tumor volume in a CT26-MUC1 tumor model.
Figure 7B:
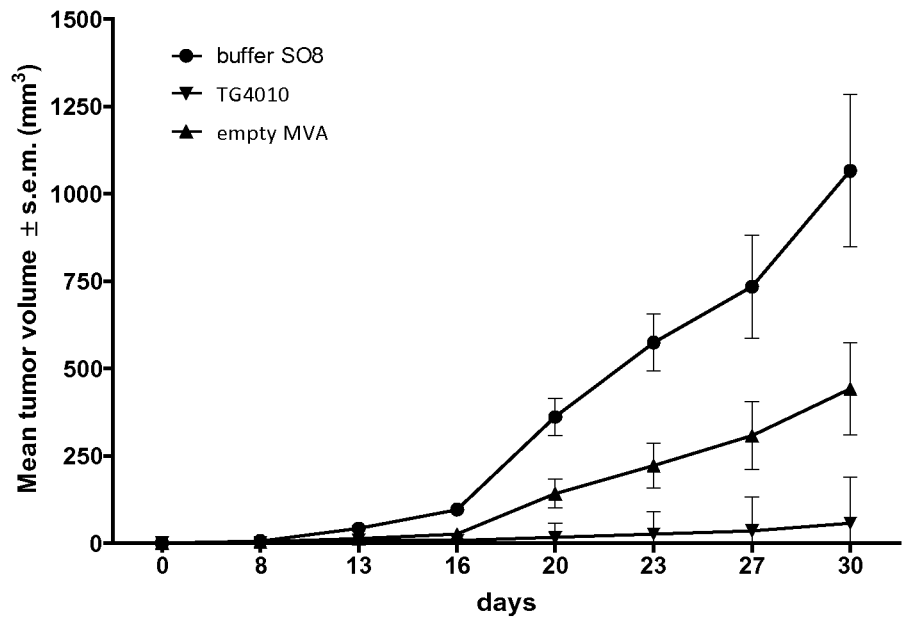

Therapeutic Efficacy of TG4010 in the CT26-MUC1 Tumor Model $2\cdot10^5$ CT26-MUC1 cells were injected s.c. or i.v. in BALB/c mice to generate sc tumors or lung tumors, respectively. On day 2 and 9 after tumor challenge, mice were treated s.c. or i.v., respectively, with $1\cdot10^7$ TG4010 or the empty control vector MVATGN33.1. Mean tumor volume or percent survival were monitored over time. TG4010 showed significant improvement of survival in the iv/iv lung tumor model (p=0.00642) and significant reduction of tumor growth in the sc/sc tumor model (see FIGS. 7A and 7B, respectively).

Therapeutic Efficacy of TG4010 in Combination with Anti-PD1 in the CT26-MUC1 Tumor Model BALB/c mice were injected s.c. with $2·10^5$ CT26.MUC1 cells. On days 2 and 9 after tumor implantation, mice were treated sc with TG4010 (also designated MVATG9931) or an empty control vector (MVATGN33.1) at the suboptimal dose of $1·10^6$ pfu. On days 10, 13, 15 and 17, mice received 250 µg anti PD-1 (RMP1.14, IgG2a, BioXCell). Mice were sacrificed when the tumors reached the size of 2,000 mm³. Tumor volume and animal survival were followed over time.

Figure 8A:
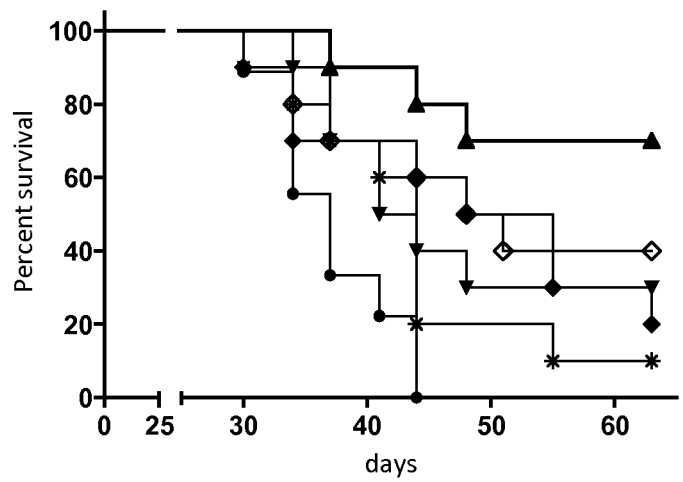
FIGS. 8A and 8B illustrates the effect on mice survival (FIG. 8A) and tumor volume (FIG. 8B) provided by TG4010 treatment in combination with anti PD-1 antibody in the CT26-MUC1 s.c. tumor model. BALB/c mice were injected s.c. with 2·10⁵ CT26-MUC1 cells. On days 2 and 9 after tumor implantation, mice were treated sc with TG4010 (also called MVATG9931) or an empty control vector at the suboptimal dose of 1·10⁶ pfu followed by i.p. administration of 250 ug anti PD-1 (RMP1.14, IgG2a, BioXCell) on days 10, 13, 15 and 17. Mice were sacrificed when the tumors reached the size of 2000 mm³. Percent survival and mean tumor volumes were monitored over time.
Figure 8B:
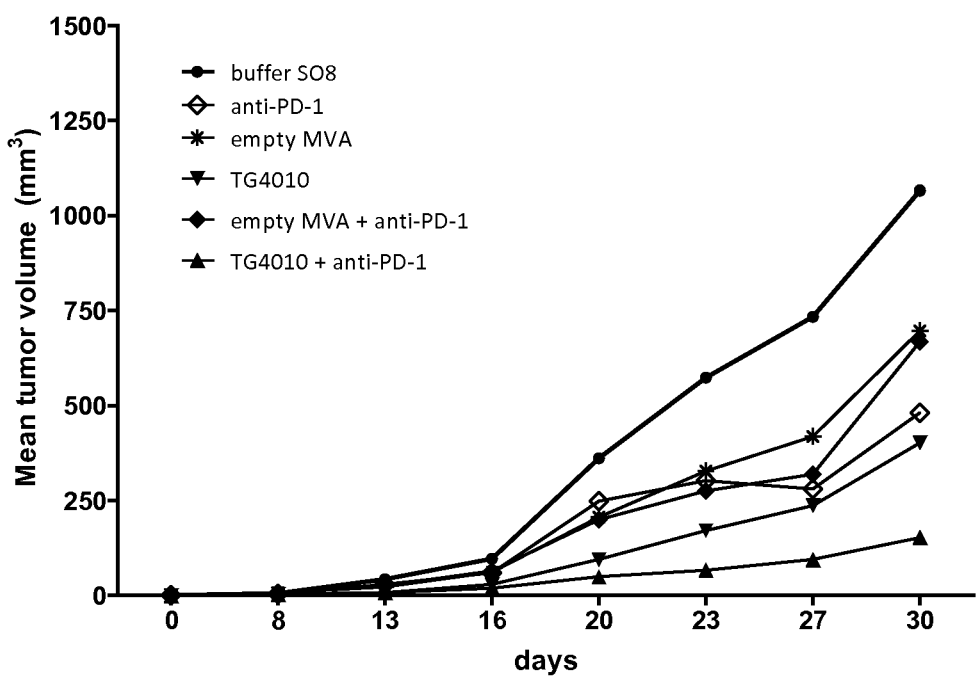

As illustrated in FIG. 8B, tumors started to grow at day 16 and tumor volume increased rapidly and regularly over time in control group receiving formulation buffer, as expected. A delay in tumour growth was observed in the groups receiving mPD-1 antibody, TG4010 alone and empty MVATGN33.1 alone or with anti-PD-1. In contrast, tumor growth was greatly reduced in the "combination" group injected with both TG4010 and mPD-1 antibody. Effects on mice survival are also observed as shown in FIG. 8A. Indeed, about 70% of mice treated with both TG4010 and mPD-1 antibody are still alive more than 60 days following tumor implantation while approximately 10% and 20% of animals treated with the empty control (without or with the anti-PD-1 antibody) remained alive. Only 30 and 40% of animals respectively treated with TG4010 alone or with anti-PD-1 antibody survived 2 months after tumor implantation. In contrast, control group treated with formulation buffer died within less than 45 days. The increased survival provided by the combinatorial treatment was maintained overtime (120 days after tumor implantation) (data not shown).

Figure 9:
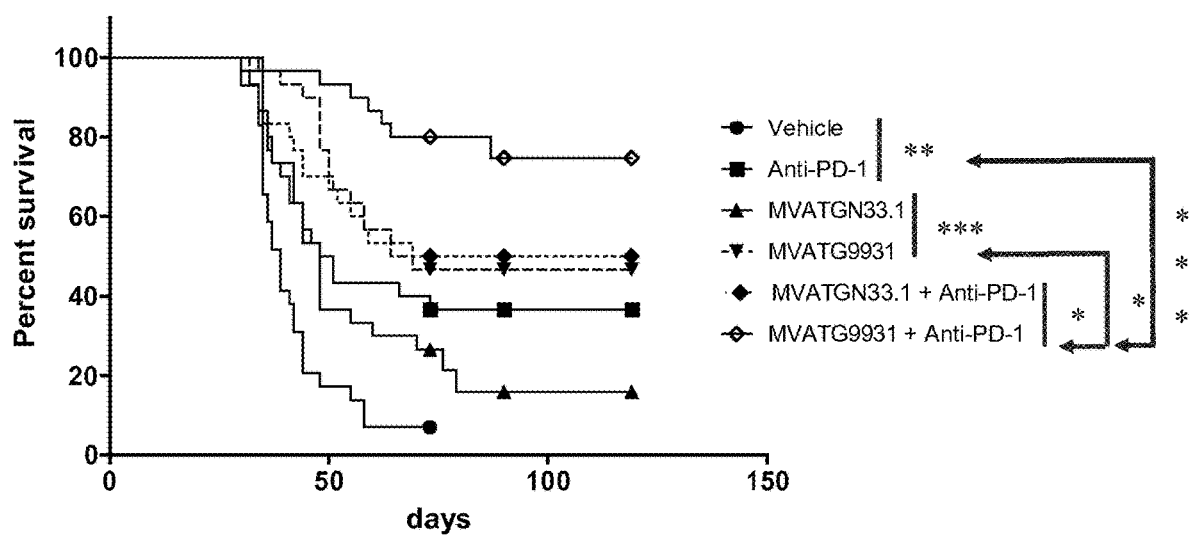
FIG. 9 illustrates the survival of BALB/C mice injected s.c. with CT26-MUC1 tumor cells and immunized with two injections of 1×10⁷ PFU of MVATGN33.1 or MVATG9931 on days D2 and D9 followed by i.p. administrations of 250 μg of anti-PD-1 Ab on days D10, D13, D15 and D17. (*:p<0.05; ::p<0.01; *:p<0.001)

The same experiment as above was also conducted except that mice were treated with 2 injections of $1·10^7$ pfu of MVATG9931 (i.e. TG4010) or the negative MVATGN33.1 control vector, optionally followed by four i.p. administrations of 250 µg of anti-PD1. As illustrated in FIG. 9, a substantial increase in median survival of 70 days for the combinatorial treatment is however noticeable in comparison to 46 and 49.5 days for the mice treated with MVATG9931 and anti-PD-1, respectively. Note also that the survival increase is significant (p=0.008) when the combination of MVATG9931 and anti-PD-1 treatments is compared to the control empty virus MVATGN33.1 and anti-PD-1 modalities, suggesting a MUC-1 specific interaction at this dose of virus. At the highest dose of $1×10^7$ PFU for MVATG9931, the best therapeutic activity among all the conditions tested is achieved for the combination with significance reached against each treatment modality alone (p=0.014 against MVATG9931 and p<0.001 against anti-PD-1; FIG. 9). In conclusion, the combination of MVATG9931 with an anti-PD-1 antibody allowed to obtain the best therapeutic index in the ectopic CT26-MUC1 model in comparison to each treatment alone which paves the way to the clinical evaluation of this combination therapy approach.

Those skilled in the art will recognize, or be able to ascertain using no more than routine experimentation, numerous equivalents to the specific method and reagents described herein, including alternatives, variants, additions, deletions, modifications and substitutions. Such equivalents are considered to be within the scope of this invention and are covered by the following claims.

The invention claimed is:

1. A method for treating a proliferative or an infectious disease comprising administering to a subject in need thereof an effective amount of a combination product comprising (i) a therapeutic vaccine and (ii) one or more immune checkpoint modulator(s);
wherein said therapeutic vaccine comprises a modified vaccinia virus Ankara (MVA) encoding membrane anchored Human papilloma Viruses 16 (HPV-16) non-oncogenic E6 and E7 antigens and encoding interleukin 2 (IL-2);
wherein said one or more immune checkpoint modulator(s) comprise(s) a modulator capable of antagonizing at least partially programmed cell death protein 1 (PD-1) pathway; and
wherein said administering of said therapeutic vaccine starts before said administering of said one or more immune checkpoint modulator(s) and
wherein said therapeutic vaccine is administered a first time in a first administration of said therapeutic vaccine separated by a period of time from a first administration of said one or more immune checkpoint modulator(s), and the period of time between the first administration of said therapeutic vaccine and the first administration of said one or more immune checkpoint modulator(s) is one day to eight week(s).

2. The method of claim 1, wherein said one or more immune checkpoint modulator(s) comprise(s) a modulator capable of antagonizing at least partially programmed death ligand 1 (PD-L1) or PD-1.

3. The method of claim 2, wherein said one or more immune checkpoint modulator(s) comprise(s) a modulator capable of antagonizing at least partially PD-L1.

4. The method of claim 1, wherein at least one of said one or more immune checkpoint modulator(s) is an antibody that recognizes human PD-L1.

5. The method of claim 4, wherein at least one of said one or more immune checkpoint modulator(s) is a human or humanized monoclonal antibody that specifically binds to PD-L1.

6. The method according to claim 1, wherein said proliferative disease is a cancer and wherein said infectious disease results from infection with a virus selected from the group consisting of herpes virus, papillomavirus, poxvirus, retrovirus, HCV, HBV and influenza virus.

7. The method according to claim 6, wherein said cancer is selected from the group consisting of renal cancer, prostate cancer, breast cancer, colorectal cancer, lung cancer, liver cancer, gastric cancer, bile duct carcinoma, endometrial cancer, pancreatic cancer and ovarian cancer.

8. The method according to claim 7, wherein said cancer is a non-small cell lung cancer (NSCL).

9. The method according to claim 6, wherein said cancer is selected from the group consisting of carcinoma, lymphoma, blastoma, sarcoma, leukemia, bone cancer, gastro-intestinal cancer, liver cancer, pancreatic cancer, gastric cancer, colorectal cancer, esophageal cancer, oro-pharyngeal cancer, laryngeal cancer, salivary gland carcinoma, thyroid cancer, lung cancer, non-small cell lung cancer, cancer of the head or neck, skin cancer, squamous cell cancer, melanoma, uterine cancer, cervical cancer, endometrial carcinoma, vulvar cancer, ovarian cancer, breast cancer, metastatic breast cancer, prostate cancer, cancer of the endocrine system, sarcoma of soft tissue, bladder cancer, kidney cancer, glioblastoma, cancer of the central nervous system, renal cancer, clear cell carcinoma, hormone refractory prostate adenocarcinoma, hepatocarcinoma, and bile duct carcinoma.

10. The method according to claim 1 which is carried out in association with one or more conventional therapeutic modalities.

11. The method according to claim 1, wherein said therapeutic vaccine and said one or more immune checkpoint modulator(s) are formulated for from 4 to 15 administrations of $10^7$ to $10^9$ pfu of said MVA at approximately 1 to 3 week intervals interspersed with 2 to 6 administrations of 3 to 10 mg/kg of said one or more immune checkpoint modulator(s) every 2 or 3 weeks.

12. The method of claim 1, wherein the period of time between the first administration of said therapeutic vaccine and the first administration of said one or more immune check point modulator(s) is one week to eight week(s).

13. The method of claim 1, wherein said administering of a therapeutic vaccine occurs more than once separated by a time interval between each said administering of a therapeutic vaccine that is from 2 days to 8 weeks; and said administering of immune check point modulator(s) occurs more than once separated by a time interval between each administration of immune check point modulator(s) that is from 2 days to 8 weeks.

14. The method of claim 1, wherein administration of said combination product results in at least one of:
  i. a prolonged survival;
  ii. a reduced mortality;
  iii. a reduction of a tumor size;
  iv. eliciting and/or stimulating and/or redirecting an immune response;
  v. eliciting and/or stimulating and/or redirecting an immune response specific to said antigens;
  vi. eliciting and/or stimulating and/or redirecting a CD4+ and/or CD8+ T cell response;
  vii. an increased IFN-gamma secretion; and
  viii. any combination of i. to vii;
in the treated subject.

* * * * *

SEQUENCE LISTING

```
Sequence total quantity: 6
SEQ ID NO: 1            moltype = AA  length = 557
FEATURE                 Location/Qualifiers
source                  1..557
                        mol_type = protein
                        organism = Homo sapiens
SEQUENCE: 1
MTPGTQSPFF LLLLLTVLTV VTGSGHASST PGGEKETSAT QRSSVPSSTE KNAVSMTSSV   60
LSSHSPGSGS STTQGQDVTL APATEPASGS AATWGQDVTS VPVTRPALGS TTPPAHDVTS  120
APDNKPAPSP GSTAPPAHGV TSAPDTRPAP GSTAPPAHGV TSAPDTRPAP GSTAPPAHGV  180
TSAPDTRPAP GSTAPPAHGV TSAPDTRPAP GSTAPPGHGV TSAPDTRPAP GSTAPPAHGV  240
TSAPDNRPAL GSTAPPVHNV TSASGSASGS ASTLVHNGTS ARATTTPASK STPFSIPSHH  300
SDTPTTLASH STKTDASSTH HSTVPPLTSS NHSTSPQLST GVSFFFLSFH ISNLQFNSSL  360
EDPSTDYYQE LQRDISEMFL QIYKQGGFLG LSNIKFRPGS VVVQLTLAFR EGTINVHDVE  420
TQFNQYKTEA ASRYNLTISD VSVSDVPFPF SAQSGAGVPG WGIALLVLVC VLVALAIVYL  480
IALAVCQCRR KNYGQLDIFP ARDTYHPMSE YPTYHTHGRY VPPSSTDRSP YEKVSAGNGG  540
SSLSYTNPAV AATSANL                                                 557

SEQ ID NO: 2            moltype = DNA  length = 1674
FEATURE                 Location/Qualifiers
source                  1..1674
                        mol_type = other DNA
                        organism = Homo sapiens
SEQUENCE: 2
atgacaccgg gcacccagtc tcctttcttc ctgctgctgc tcctcacagt gcttacagtt   60
gttacaggtt ctggtcatgc aagctctacc ccaggtggaa aaaggagac ttcggctacc  120
cagagaagtt cagtgcccag ctctactgag aagaatgctg tgagtatgac cagcagcgta  180
ctctccagcc acagccccgg ttcaggctcc tccaccactc agggacagga tgtcactctg  240
gccccggcca cggaaccagc ttcaggttca gctgccacct ggggacagga tgtcacctcg  300
gtcccagtca ccaggccagc cctgggctcc accacccgc cagcccacga tgtcacctca  360
gccccggaca caaagccagc cccatctcca ggctccaccg ccccccagc ccacggtgtc  420
acctcggccc cggacaccag gccggcacca ggaagcacag caccacctgc gcatggtgta  480
acatctgccc ctgatacacg tcctgctccc ggtagtactg cgccgcctgc acacgggtgc  540
acgtctgctc ccgacactcg gccggcgcct gggtcaacgg ctcctccggc acatggagtt  600
actttctgcgc cagacacgcg acccgctcca ggtagtacgg cgccaccggg gcatggagtg  660
acatctgcgc ccgatactag gccggcccg ggctccaccg cccccagc ccatggtgtc  720
```

```
acctcggccc  cggacaacag  gcccgccttg  ggctccaccg  cccctccagt  ccacaatgtc   780
acctcggcct  caggctctgc  atcaggctca  gcttctactc  tggtgcacaa  cggcacctct   840
gccagggcta  ccacaacccc  agccagcaag  agcactccat  tctcaattcc  agccaccac    900
tctgatactc  ctaccaccct  tgccagccat  agcaccaaga  ctgatgccag  tagcactcac   960
catagcacgg  tacctcctct  cacctcctcc  aatcacagca  cttctcccca  gttgtctact  1020
ggggtctctt  tcttttttcct  gtcttttcac  atttcaaacc  tccagtttaa  ttcctctctg  1080
gaagatccca  gcaccgacta  ctaccaagag  ctgcagagag  acatttctga  aatgtttttg  1140
cagatttata  aacaaggggg  ttttctgggc  ctctccaata  ttaagttcag  gccaggatct  1200
gtggtggtac  aattgactct  ggccttccga  gaaggtacca  tcaatgtcca  cgacgtggag  1260
acacagttca  atcagtataa  aacggaagca  gcctctcgat  ataacctgac  gatctcagac  1320
gtcagcgtga  gtgatgtgcc  atttcctttc  tctgcccagt  ctggggctgg  ggtgccaggc  1380
tggggcatcg  cgctgctggt  ctggtctgt   gttctggttg  cgctggccat  tgtctatctc  1440
attgccttgg  ctgtctgtca  gtgccgccga  aagaactacg  ggcagctgga  catctttcca  1500
gcccgggata  cctaccatcc  tatgagcgag  tacccccacct  accacaccca  tgggcgctat  1560
gtgccccta   gcagtaccga  tcgtagcccc  tatgagaagg  tttctgcagg  taatggtggc  1620
agcagcctct  cttacacaaa  cccagcagtg  gcagccactt  ctgccaactt  gtag         1674

SEQ ID NO: 3            moltype = AA  length = 1047
FEATURE                 Location/Qualifiers
source                  1..1047
                        mol_type = protein
                        organism = Escherichia coli
SEQUENCE: 3
MSFTLTNKNV IFVAGLGGIG LDTSKELLKR DPVVLQRRDW ENPGVTQLNR LAAHPPFASW  60
RNSEEARTDR PSQQLRSLNG EWRFAWFPAP EAVPESWLEC DLPEADTVVV PSNWQMHGYD  120
APIYTNVTYP ITVNPPFVPT ENPTGCYSLT FNVDESWLQE GQTRIIFDGV NSAFHLWCNG  180
RWVGYGQDSR LPSEFDLSAF LRAGENRLAV MVLRWSDGSY LEDQDMWRMS GIFRDVSLLH  240
KPTTQISDFH VATRFNDDFS RAVLEAEVQM CGELRDYLRV TVSLWQGETQ VASGTAPFGG  300
EIIDERGGYA DRVTLRLNVE NPKLWSAEIP NLYRAVVELH TADGTLIEAE ACDVGFREVR  360
IENGLLLLNG KPLLIRGVNR HEHHPLHGQV MDEQTMVQDI LLMKQNNFNA VRCSHYPNHP  420
LWYTLCDRYG LYVVDEANIE THGMVPMNRL TDDPRWLPAM SERVTRMVQR DRNHPSVIIW  480
SLGNESGHGA NHDALYRWIK SVDPSRPVQY EGGGADTTAT DIICPMYARV DEDQPFFPAVP  540
KWSIKKWLSL PGETRPLILC EYAHAMGNSL GGFAKYWQAF RQYPRLQGGF VWDWVDQSLI  600
KYDENGNPWS AYGGDFGDTP NDRQFCMNGL VFADRTPHPA LTEAKHQQQF FQFRLSGQTI  660
EVTSEYLFRH SDNELLHWMV ALDGKPLASG EVPLDVAPQG KQLIELPELP QPESAGQLWL  720
TVRVVQPNAT AWSEAGHISA WQQWRLAENL SVTLPAASHA IPHLTTSEMD FCIELGNKRW  780
QFNRQSGFLS QMWIGDKKQL LTPLRDQFTR APLDNDIGVS EATRIDPNAW VERWKAAGHY  840
QAEAALLQCT ADTLADAVLI TTAHAWQHQG KTLFISRKTY RIDGSGQMAI TVDVEVASDT  900
PHPARIGLNC QLAQVAERVN WLGLGPQENY PDRLTAACFD RWDLPLSDMY TPYVFPSENG  960
LRCGTRELNY GPHQWRGDFQ FNISRYSQQQ LMETSHRHLL HAEEGTWLNI DGFHMGIGGD  1020
DSWSPSVSAE LQLSAGRYHY QLVWCQK                                      1047

SEQ ID NO: 4            moltype = DNA  length = 114
FEATURE                 Location/Qualifiers
source                  1..114
                        mol_type = genomic DNA
                        organism = Vaccinia virus
SEQUENCE: 4
tttattctat acttaaaaaa tgaaaataaa tacaaaggtt cttgagggtt gtgttaaatt   60
gaaagcgaga aataatcata aattatttca ttatcgcgat atccgttaag tttg         114

SEQ ID NO: 5            moltype = DNA  length = 46
FEATURE                 Location/Qualifiers
misc_feature            1..46
                        note = PCR primer for LacZ cloning
source                  1..46
                        mol_type = other DNA
                        organism = synthetic construct
SEQUENCE: 5
ccaccttaat taagccgcca ccatgtcgtt tactttgacc aacaag             46

SEQ ID NO: 6            moltype = DNA  length = 43
FEATURE                 Location/Qualifiers
misc_feature            1..43
                        note = PCR primer for LacZ cloning
source                  1..43
                        mol_type = other DNA
                        organism = synthetic construct
SEQUENCE: 6
accaactcga gagaaaaatt attttttgaca ccagaccaac tgg               43
```